United States Patent [19]

Hashimoto et al.

[11] Patent Number: 5,398,062
[45] Date of Patent: Mar. 14, 1995

[54] VIDEO CAMERA AND CAMERA SYSTEM HAVING AN ELECTRONIC VIEWFINDER PORTRAYING IMAGE INFORMATION

[75] Inventors: Hiroyuki Hashimoto, Souka; Haruo Saito, Kuki, both of Japan

[73] Assignee: AIWA Co., Ltd., Tokyo, Japan

[21] Appl. No.: 896,059

[22] Filed: Jun. 9, 1992

[30] Foreign Application Priority Data

| Jun. 10, 1991 | [JP] | Japan | 3-138012 |
| Jun. 11, 1991 | [JP] | Japan | 3-139160 |
| Jun. 11, 1991 | [JP] | Japan | 3-139172 |
| Jun. 11, 1991 | [JP] | Japan | 3-139181 |
| Jun. 11, 1991 | [JP] | Japan | 3-139207 |
| Jun. 13, 1991 | [JP] | Japan | 3-142143 |
| Aug. 29, 1991 | [JP] | Japan | 3-218548 |
| Aug. 29, 1991 | [JP] | Japan | 3-218549 |

[51] Int. Cl.$^6$ .................................................. H04N 5/225
[52] U.S. Cl. .................................... 348/334; 348/358
[58] Field of Search .............. 358/224, 225, 209, 909; H04N 5/225; 348/341, 333, 334, 358, 207, 240

[56] References Cited

U.S. PATENT DOCUMENTS

| 4,148,072 | 3/1979 | Vockenhuber | 358/224 |
| 4,432,014 | 2/1984 | Roos et al. | 358/224 |
| 4,527,201 | 7/1985 | Cappels | 358/224 |
| 4,978,983 | 12/1990 | StAlfors | 358/225 |
| 5,161,025 | 11/1992 | Nakao | 358/224 |

FOREIGN PATENT DOCUMENTS 3921983 1/1990 Germany .
4-139970 5/1992 Japan ............................ H04N 5/225

OTHER PUBLICATIONS

Patent Abstracts of Japan, vol. 13, No. 185 (P-865), May 2, 1989 JP (A) 10-13530 (abstract).
Patent Abstracts of Japan, vol. 14, No. 303 (P-1070), Jun. 29 1990 JP (A) 20-97928 (abstract).

Primary Examiner—Michael T. Razavi
Assistant Examiner—Wendy R. Greening
Attorney, Agent, or Firm—Dellett and Walters

[57] ABSTRACT

A video camera having a zoom function and a camera system are provided, wherein a ratio of view fields of the video camera and a photographic camera is calculated based on information about zooming powers of imaging lenses, and an image frame of the photographic cameras is displayed in a variable size at an electronic viewfinder in accordance with the ratio of the view fields and based on a picked-up image of fixed size, or a picked-up image is displayed in a variable size on the basis of the image frame of the photographic camera. View angles of the video camera and the photographic camera are obtained from the information about the zooming powers of the imaging lenses, and zoom adjustment is carried out with the view angles coinciding with each other, or the zooming power of one of the video camera and the photographic camera is adjusted such that the view angles become equal to each other. Accordingly, the view field of the photographic camera can be accurately recognized even if the zooming power is changed.

6 Claims, 41 Drawing Sheets

FIG. 4

|    | a | b | c | d | e |
|----|---|---|---|---|---|
| A1 | Cy+G | Ye+Mg | Cy+G | Ye+Mg | Cy+G |
| B1 | G+Cy | Mg+Ye | G+Cy | Mg+Ye | G+Cy |
| A2 | Cy+Mg | Ye+G | Cy+Mg | Ye+G | Cy+Mg |
| B2 | Mg+Cy | G+Ye | Mg+Cy | G+Ye | Mg+Cy |

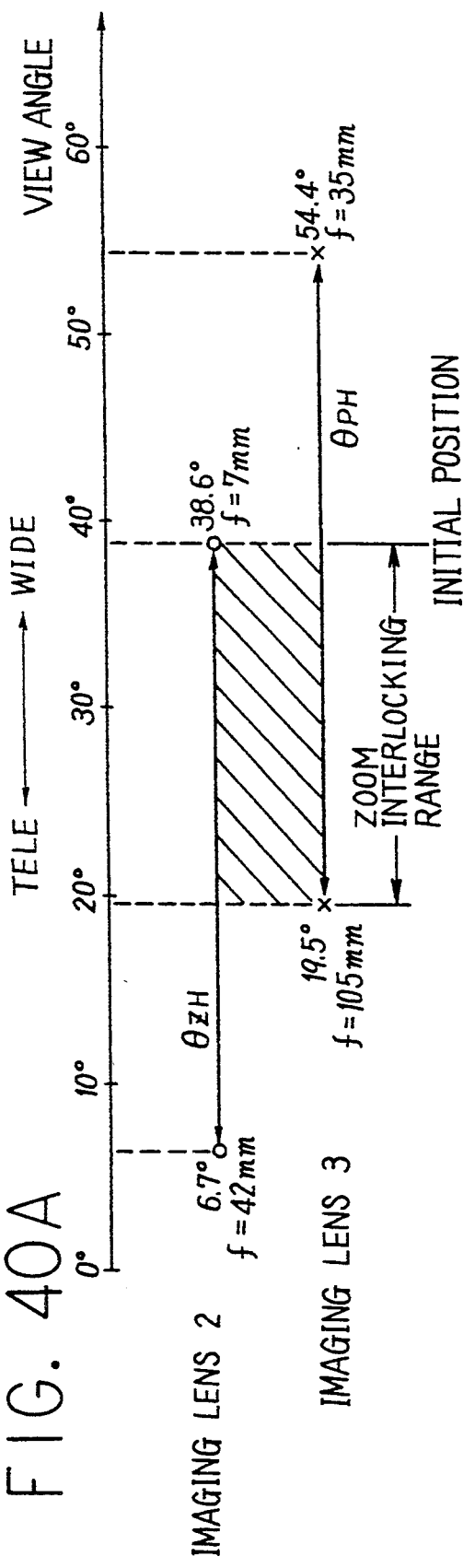
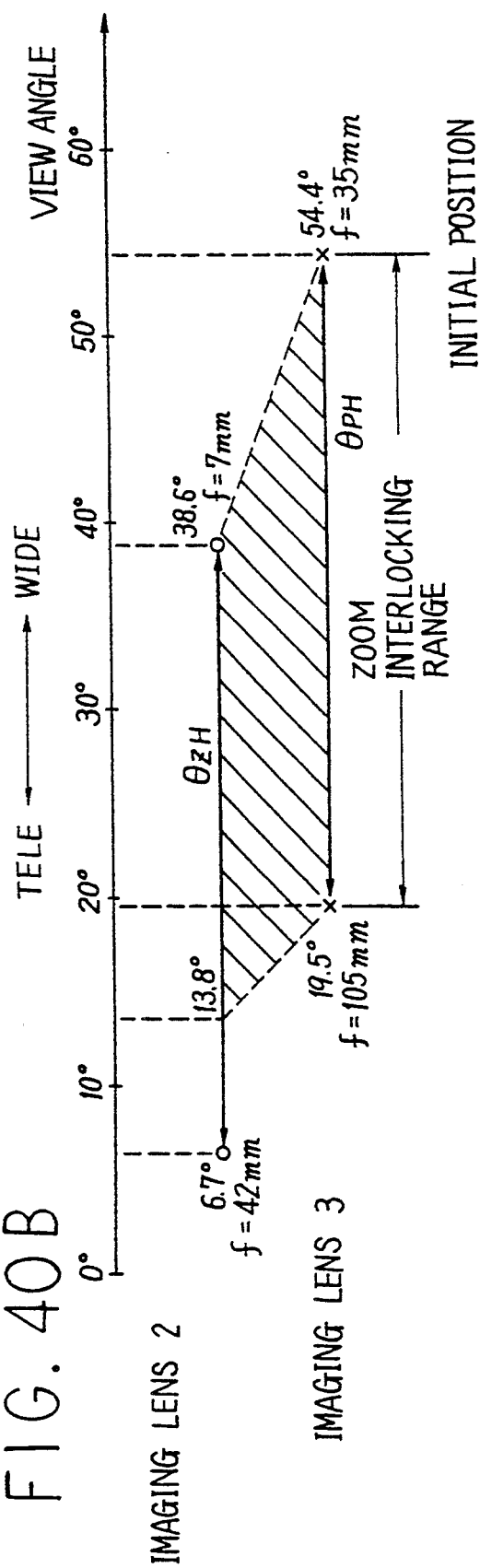

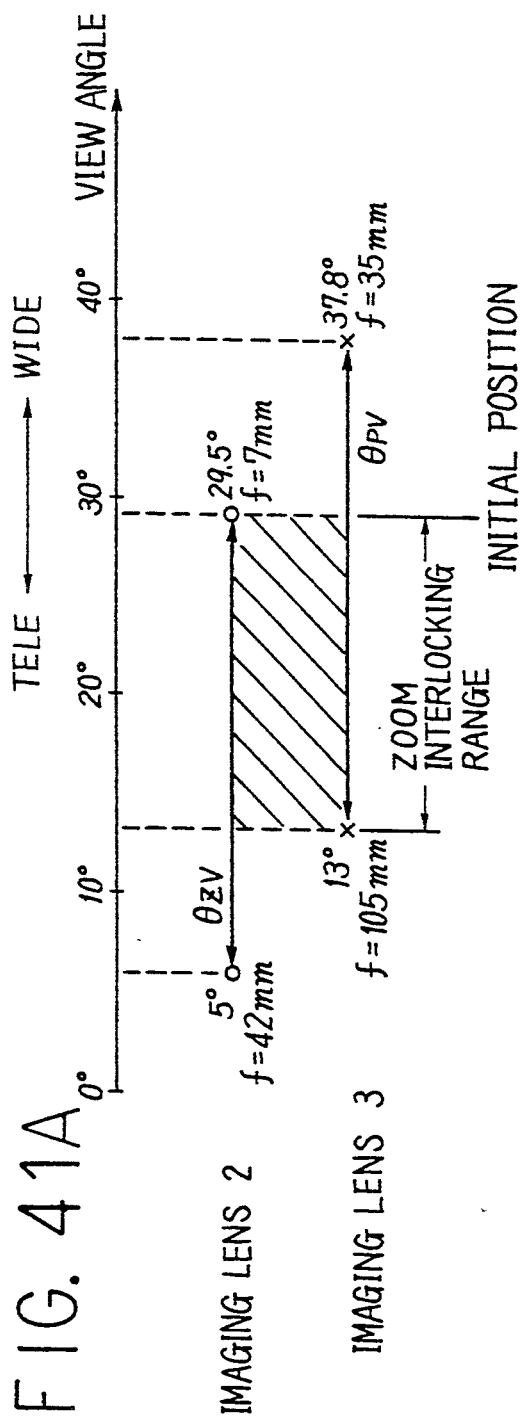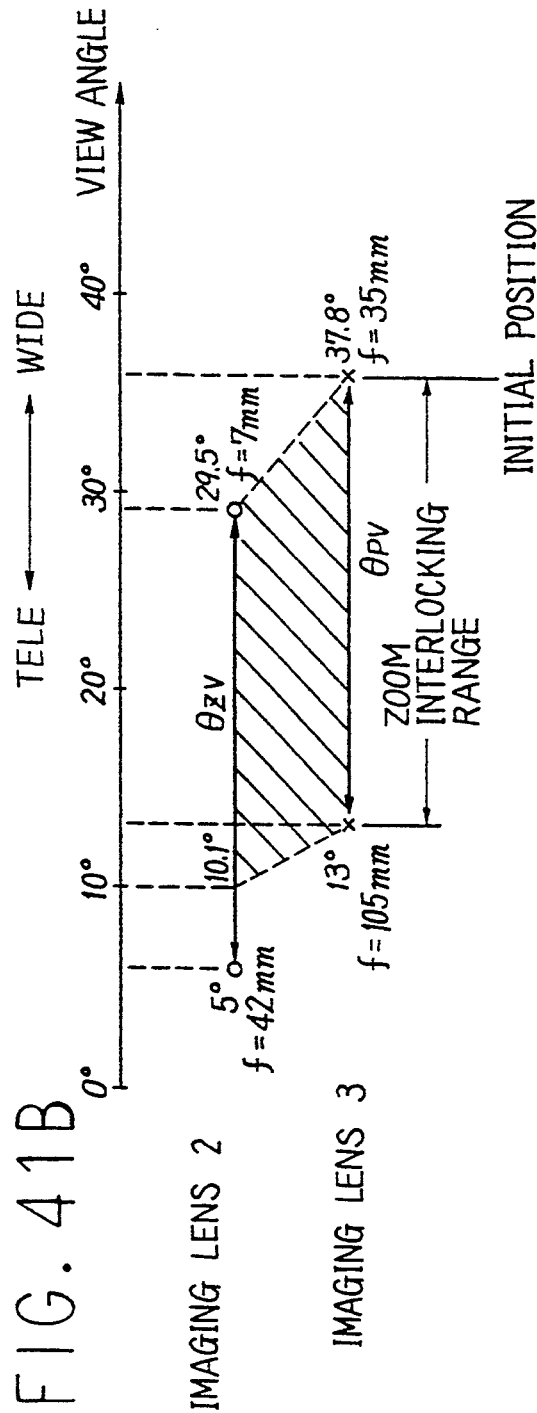

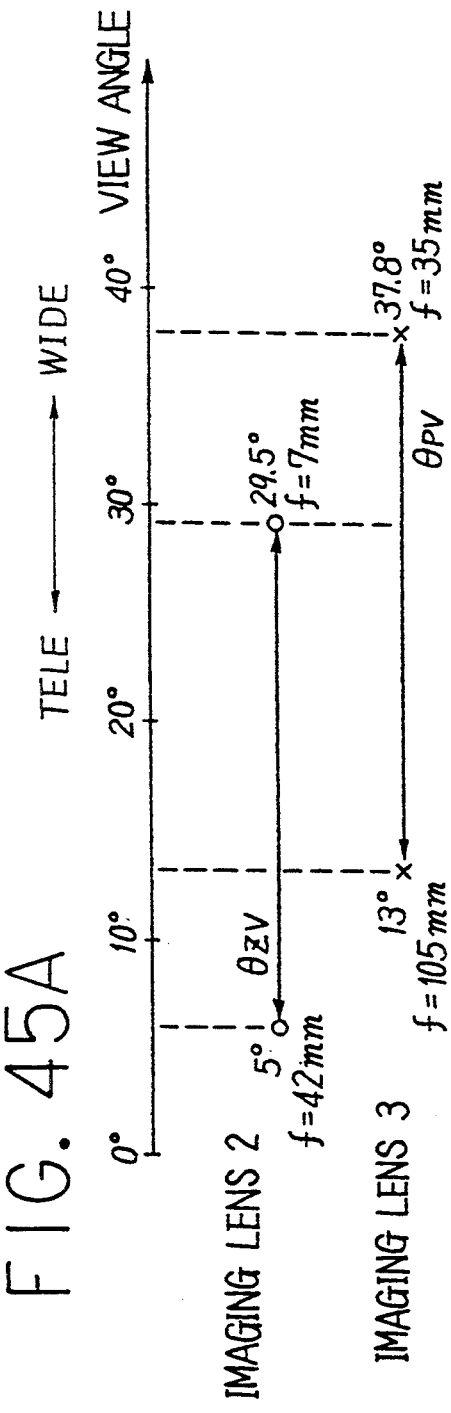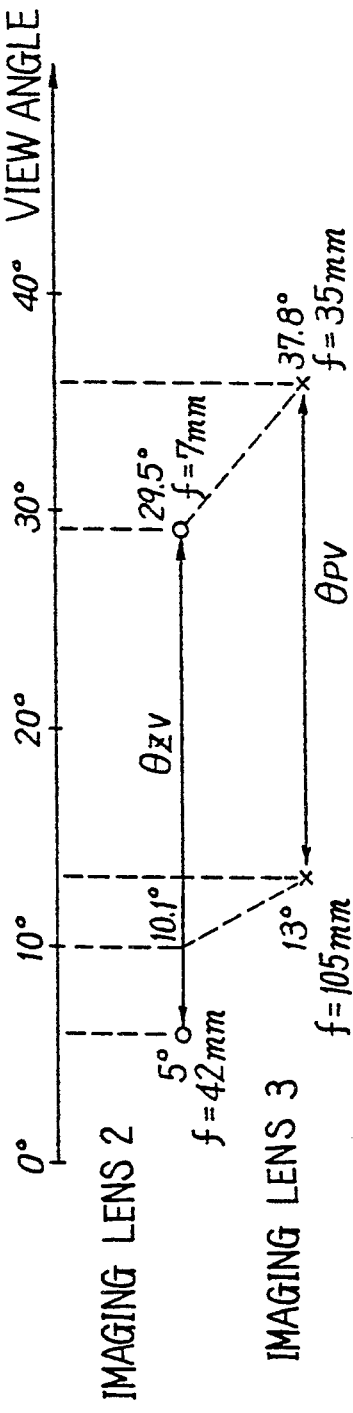

VIDEO CAMERA AND CAMERA SYSTEM HAVING AN ELECTRONIC VIEWFINDER PORTRAYING IMAGE INFORMATION

BACKGROUND OF THE INVENTION

This invention relates to a video camera having a zoom function and including an electronic viewfinder.

Using a video camera permits both a still image and a dynamic image to be obtained. Since the resolution of video cameras is lower than that of photographic cameras (film cameras), however, there is a demand for a combined use of a video camera and a photographic camera. For example, a photographic camera may be firmly fixed to a video camera so that the shutter of the photographic camera can be operated while a dynamic image is recorded by the video camera.

In video cameras having a zoom function, the angle of view of a picked-up image changes as the zooming power is changed. This is the case with photographic cameras having a zoom function.

Accordingly, when operating the shutter of the photographic camera while viewing an electronic viewfinder of the video camera, the field of view of the video camera cannot be accurately recognized, and thus the shutter cannot be correctly released.

An object of this invention is, therefore, to provide a video camera which permits the view field of a photographic camera to be accurately recognized even if the zooming power is changed. Another object of this invention Is to provide a video camera in which the height-to-width ratio of an image derived from an output video signal of the video camera can be made coincident with that of an image obtained by a photographic camera.

SUMMARY OF THE INVENTION

According to one aspect of this invention, there is provided a video camera having a zoom function and including an electronic viewfinder, which comprises image frame signal generating means for generating an image frame signal for displaying an image frame of a photographic camera, image frame position changing means for changing a position of the image frame of the photographic camera in accordance with a change in an angle of view of a picked-up image caused by a change of a zooming power, and signal composition means for combining an image video signal with the image frame signal. The picked-up image is displayed at a fixed location on a screen of the electronic viewfinder, and the image frame of the photographic camera is displayed on the screen on the basis of the picked-up image.

According to another aspect of this invention, there is provided a video camera having a zoom function and including an electronic viewfinder, which comprises image frame displaying means for displaying an image frame of a photographic camera on a screen of the electronic viewfinder, and display size changing means for changing a size of a picked-up image at the electronic viewfinder in accordance with a change in an angle of view of the picked-up image caused by a change of a zooming power. The picked-up image is displayed on the screen of the electronic viewfinder on the basis of the image frame of the photographic camera.

According to still another aspect of this invention, there is provided a video camera having a zoom function and including an electronic viewfinder, which comprises zoom adjusting means for adjusting a zooming power, and mode changing means for setting a photographic camera mode. In the photographic camera mode, the zooming power is adjusted by the zoom adjusting means such that an angle of view of a picked-up image coincides with that of the photographic camera.

According to a further aspect of this invention, there is provided a video camera having a zoom function and including an electronic viewfinder, which comprises image frame signal generating means for generating an Image frame signal for displaying an image frame of a photographic camera having a zoom function, image frame position changing means for changing a position of the image frame of the photographic camera in accordance with a change in an angle of view caused by a change of a zooming power, and signal composition means for combining an image video signal with the image frame signal. A picked-up image is displayed at a fixed location on a screen of the electronic viewfinder, and the image frame of the photographic camera is displayed on the screen on the basis of the picked-up image.

According to another aspect of this invention, there is provided a video camera having a zoom function and including an electronic viewfinder, which comprises image frame displaying means for displaying an image frame of a photographic camera having a zoom function on a screen of the electronic viewfinder, and display size changing means for changing a display size of a picked-up image at the electronic viewfinder in accordance with a change in an angle of view caused by a change of a zooming power. The picked-up image is displayed on the screen of the electronic viewfinder on the basis of the image frame of the photographic camera.

According to still another aspect of this invention, there is provided a video camera comprising photographic camera mode setting means, blanking zone setting means for setting a blanking zone such that a height-to-width ratio of a picked-up image corresponds to that of an image plane of the photographic camera, and blanking means for blanking an output video signal. When a photographic camera mode is set by the photographic camera mode setting means, the blanking means carries out a blanking of the output video signal in accordance with the blanking zone set by the blanking zone setting means.

According to a further aspect of this invention, there is provided a camera system including a video camera and a photographic camera, each having a zoom function, which comprises zoom control means for adjusting zooming powers of the video camera and the photographic camera in an interlocked manner with a ratio of view angles thereof maintained at a fixed value.

According to another aspect of this invention, there is provided a camera system including a video camera and a photographic camera, each having a zoom function, which comprises zoom control means for adjusting only one of zooming powers of the video camera and the photographic camera such that a ratio of view angles of the video camera and the photographic camera becomes equal to a predetermined value.

According to this invention, the image frame of the photographic camera is displayed at the electronic viewfinder on the basis of a picked-up image of fixed size, or the picked-up image is displayed at the electronic viewfinder on the basis of the fixed-size image frame of the photographic camera. Accordingly, the view field of the photographic camera can be accurately recognized, whereby the user can correctly operate the shutter of the photographic camera while viewing the display screen of the electronic viewfinder.

Further, in the photographic camera mode, the view angle of the picked-up image is made coincident with that of the photographic camera, and the picked-up image corresponding to the view field of the photographic camera is displayed at the electronic viewfinder. Therefore, the user can correctly release the shutter of the photographic camera while viewing the display screen of the electronic viewfinder.

Furthermore, in the photographic camera mode, the blanking zone is set such that the height-to-width ratio of the picked-up image corresponds to that of the image plane of the photographic camera, and blanking of the output video signal is carried out in accordance with the thus-set blanking zone. Accordingly, when a photograph is compared with a reproduced image during a reproduction of the video signal on the VTR, their compatibility is ensured because the height-to-width ratios are in agreement.

Moreover, according to this invention, zoom adjustment of both the video camera and the photographic camera is carried out in an interlocked manner with the ratio of the view angles thereof set at a fixed value, or zoom adjustment of one of the video camera and the photographic camera is carried out such that the ratio of the view angles of the video camera and the photographic camera becomes equal to a predetermined value. Therefore, the view fields of the video camera and the photographic camera are in a fixed relationship, and thus the view field of the photographic camera, for example, can be accurately recognized based on the picked-up image displayed at the electronic viewfinder of the video camera, whereby the shutter operation can be correctly carried out.

The objects, advantages and novel features of the present invention will be apparent from the following detailed description when read in conjunction with the appended claims and attached drawings.

BRIEF DESCRIPTION OF THE DRAWINGS

FIG. 4 is a diagram showing an output of a horizontal output register of the imaging device;

FIGS. 40A-B are a diagram illustrating an zoom interlocked adjustment;

FIGS. 41A-B are a diagram also illustrating the zoom interlocked adjustment;

FIGS. 45A-B are a diagram also illustrating the image frame setting operation.

DETAILED DESCRIPTION OF THE INVENTION

One embodiment of this invention will be described with reference to the drawings. The embodiment comprises an integral combination of a video camera and a photographic camera.

Figure 1:
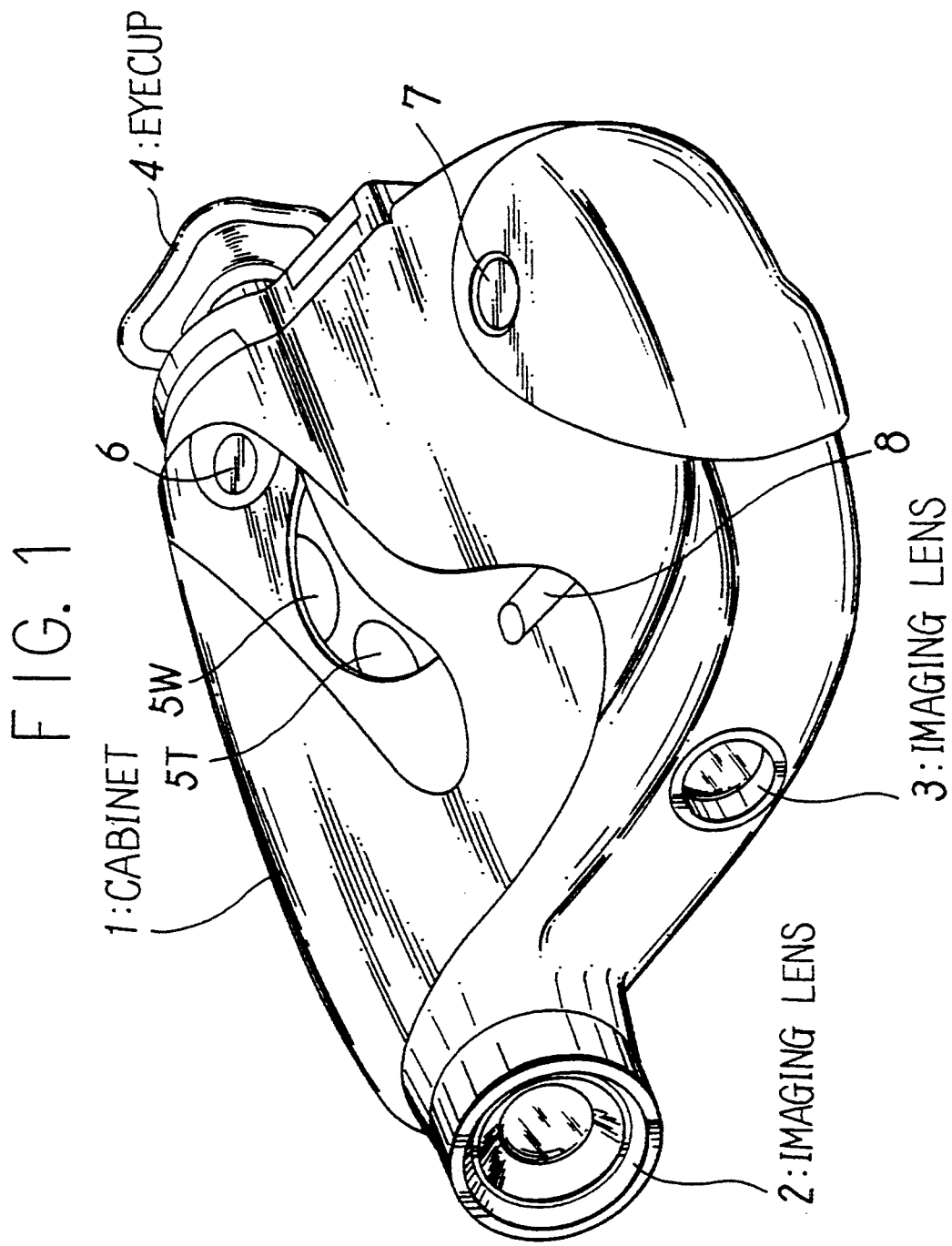
FIG. 1 is a perspective view showing an external appearance of an embodiment according to this invention.

FIG. 1 is a perspective view showing an entire arrangement, wherein reference numeral 1 denotes a cabinet which has a built-in video camera section including an imaging device, a signal processing circuit, etc., and a built-in photographic camera section including a film loading mechanism, a film drive mechanism, etc., none of which are shown.

Reference numeral 2 denotes an imaging lens of the video camera section, and 3 denotes an imaging lens of the photographic camera section. Namely, an optical system for the video camera section is separate from that for the photographic camera section. A 6-power zoom lens having a focal length f of 7 to 42 mm is used for the imaging lens 2, and a fixed-focus lens having a focal length f of 55 mm is used for the imaging lens 3.

In this embodiment, an electronic viewfinder comprising a small-sized CRT is arranged in the cabinet 1, for displaying an image picked up by the video camera section through the imaging lens 2. Reference numeral 4 represents an eyecup. There is provided no finder permitting a direct observation of an image to be photographed by the photographic camera section through the imaging lens 3.

Further, 5T and 5W denote zoom buttons for a zooming operation in a TELE direction and a WIDE direction, respectively, 6 denotes a record button for recording a video signal output from the video camera section in a VTR, 7 denotes a shutter button of the photographic camera section, and 8 denotes a film rewind button.

Figure 2:
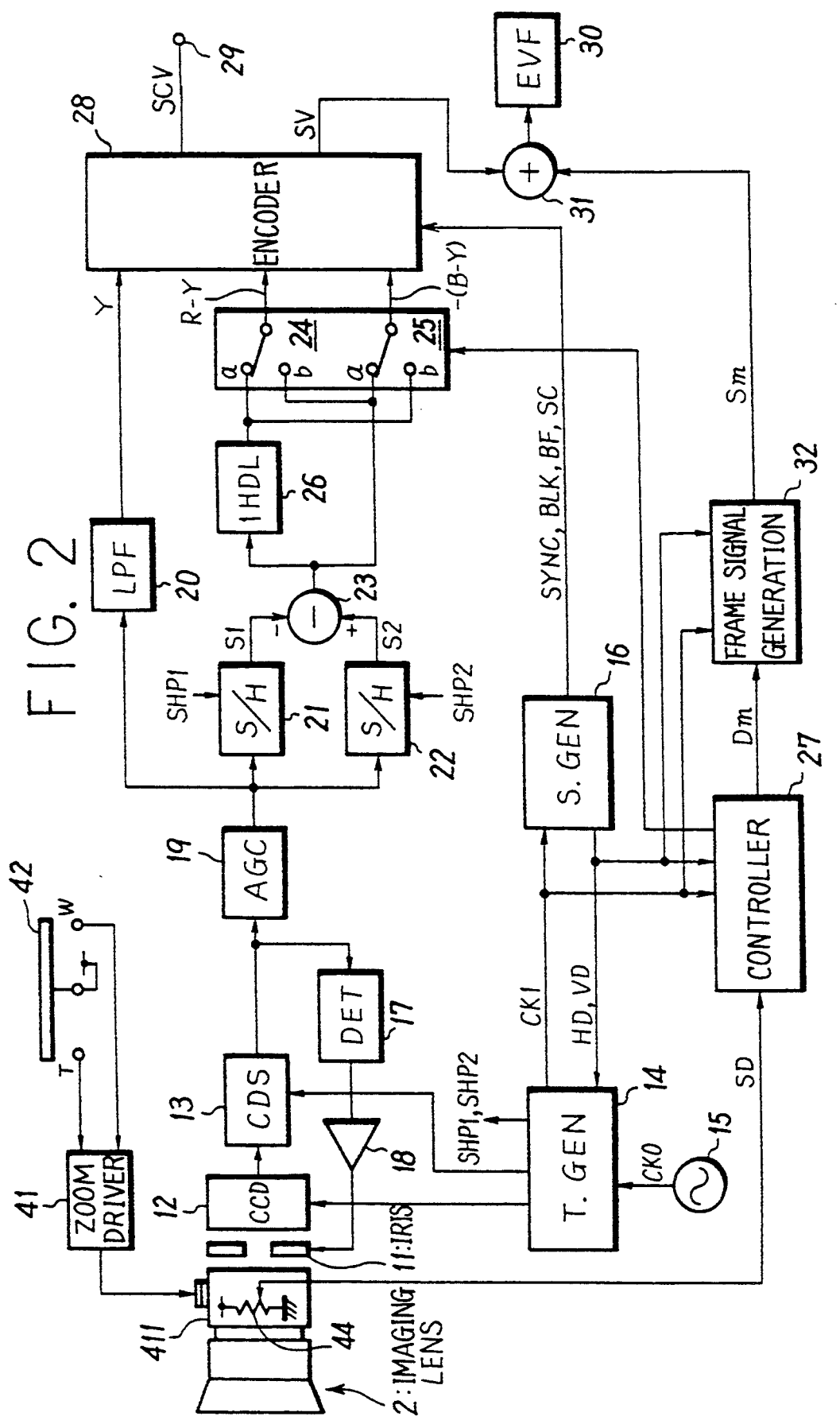
FIG. 2 is a block diagram showing the arrangement of a video camera section.

FIG. 2 is a block diagram showing the arrangement of the video camera section. An image light from an object enters through the imaging lens 2 and an iris 11 and falls upon a single-plate CCD solid-state imaging device 12 having a complementary checkered color filter.

Figure 3:
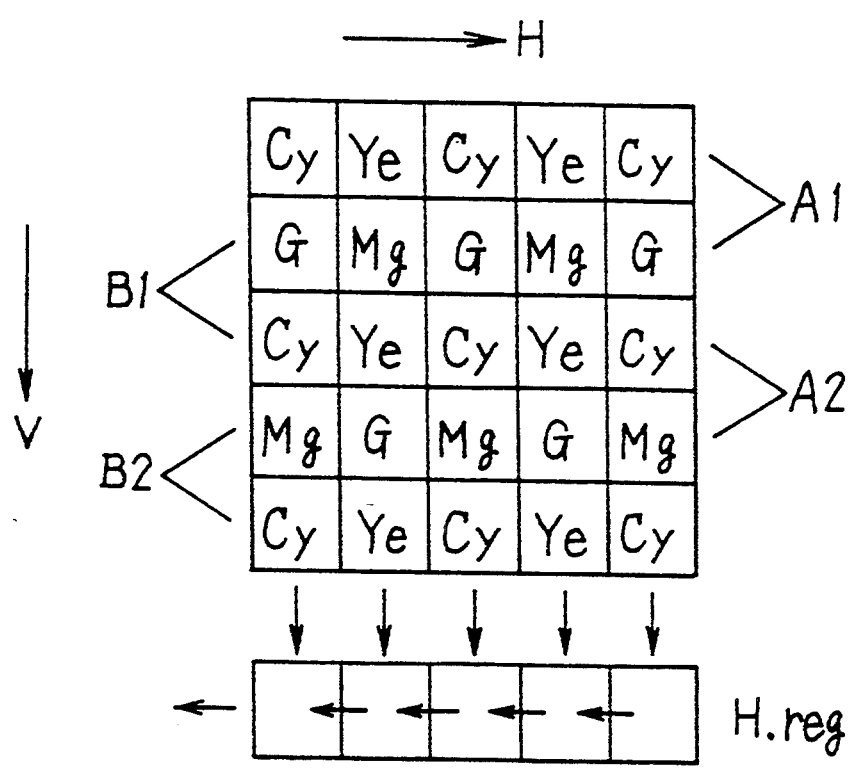
FIG. 3 is a schematic diagram showing a color coding of an imaging device.

FIG. 3 is a schematic diagram showing a color coding of the imaging device 12, and as illustrated, a field readout is carried out. In A field, charges are mixed in pairs, such as a pair of A1 and A2, and in B field, charges are mixed in pairs such as a pair of B1 and B2. For the A field, charges are output in the order of A1, A2, ..., and for the B field in the order of B1, B2, ..., from a horizontal shift register Hreg.

As shown in FIG. 4, the order of charges a, b, ..., is (Cy+G), (Ye+Mg), ... in A1 line, (Cy+Mg), (Ye+G), ... in A2 line, (G+Cy), (Mg+Ye), ... in B1 line, and (Mg+Cy), (G+Ye), ... in B2 line.

The charges output from the imaging device 12 in the aforementioned manner are supplied to a CDS circuit (correlation double sampling circuit) 13 and are extracted thereby to obtain an image signal. By using the CDS circuit 13, it is possible to reduce reset noise, as is known in the art.

Timing pulses needed by the imaging device 12 and the CDS circuit 13 are produced by a timing generator 14. The timing generator 14 is supplied with reference clock pulses CK0 at 8 fsc (fsc represents the color subcarrier frequency) from an oscillator 15, as well as horizontal and vertical synchronizing signals HD and VD from a synchronizing generator 16. The synchronizing generator 16 is supplied with clock pulses CK1 at 4 fsc from the timing generator 14.

An image signal output from the CDS circuit 13 is supplied to a level detecting circuit 17, which outputs a signal to an iris driver 18. The iris driver 18 automatically controls the aperture of the iris 11.

A process for obtaining a luminance signal Y and a chroma signal (color differential signal) from the image signal output from the CDS circuit 13 will be explained.

The luminance signal Y is obtained by adding adjacent signals together. Namely, referring to FIG. 4, summation signals are produced in the sequence of a+b, b+c, c+d, d+e, ...

For example, the A1 line can be approximated as shown in the following equation:

$$Y = \{(Cy + G) + (Ye + Mg)\} \times \tfrac{1}{2}$$
$$= (2B + 3G + 2R) \times \tfrac{1}{2}$$

where Cy=B+G, Ye=R+G, and Mg=B+R.

The A2 line can be approximated as follows:

$$Y = \{(Cy + Mg) + (Ye + G)\} \times \tfrac{1}{2}$$
$$= (2B + 3G + 2R) \times \tfrac{1}{2}$$

The other lines in the A field and the lines in the B field can be approximated in a similar manner.

The chroma signal is obtained by subjecting adjacent signals to a subtraction.

For example, the A1 line can be approximated as shown in the following equation:

$$R - Y = (Ye + Mg) - (Cy + G)$$
$$= (2R - G)$$

The A2 line can be approximated as follows:

$$-(B - Y) = (Ye + G) - (Cy - Mg)$$
$$= -(2B - G)$$

Similarly, for the other lines in the A field and the lines in the B field, a red differential signal R−Y and a blue differential signal −(B−Y) are alternately derived in a line sequential manner.

Referring again to FIG. 2, the image signal output from the CDS circuit 13 is supplied to a low-pass filter 20 constituting a luminance processing unit through an AGC circuit 19. The low-pass filter 20 carries out an addition (averaging) of adjacent signals, and accordingly, a luminance signal Y is output therefrom.

The image signal output from the AGC circuit 19 is supplied to sample holding circuits 21 and 22 forming a chroma processing unit. The sample holding circuits 21 and 22 are supplied with sampling pulses SHP1 and SHP2 (shown in FIGS. 5E-F and 6E-F), respectively, from the timing generator 14.

Figure 5:
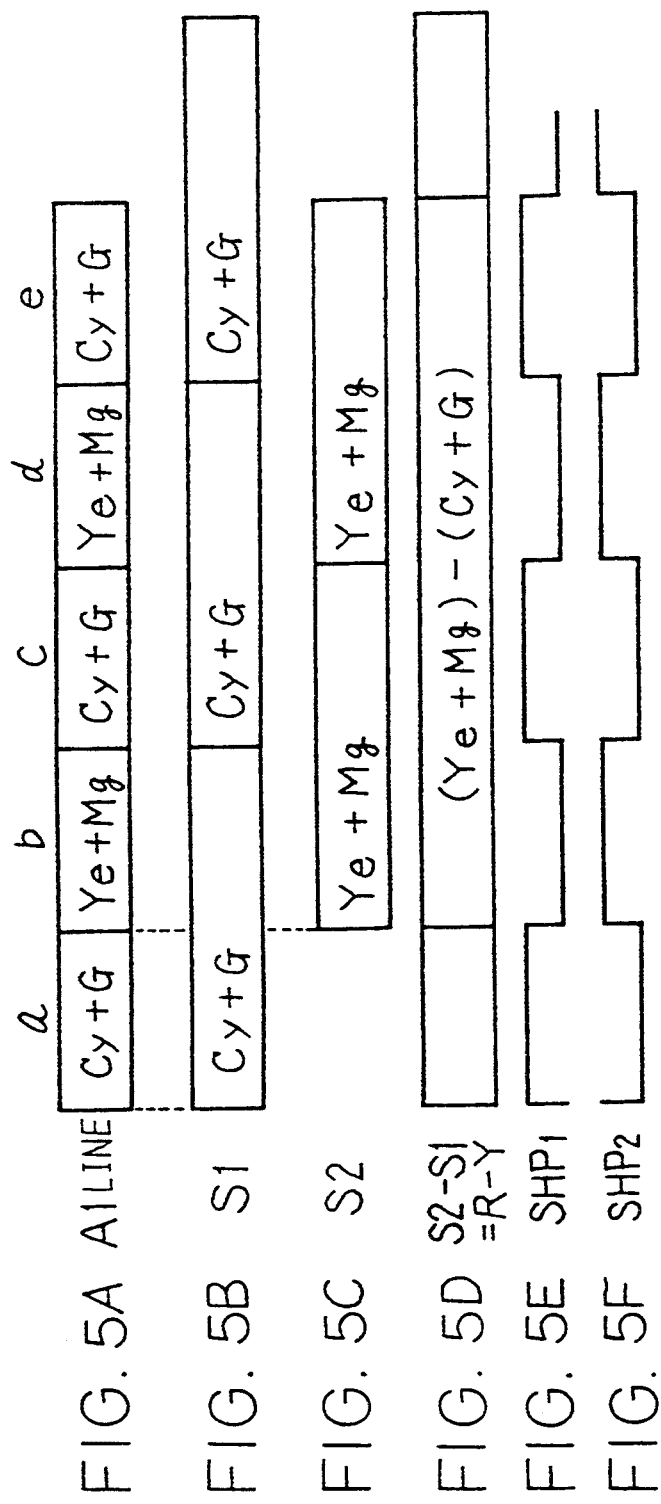
FIGS. 5A-F are a diagram illustrating a chrominance signal processing.
Figure 6:
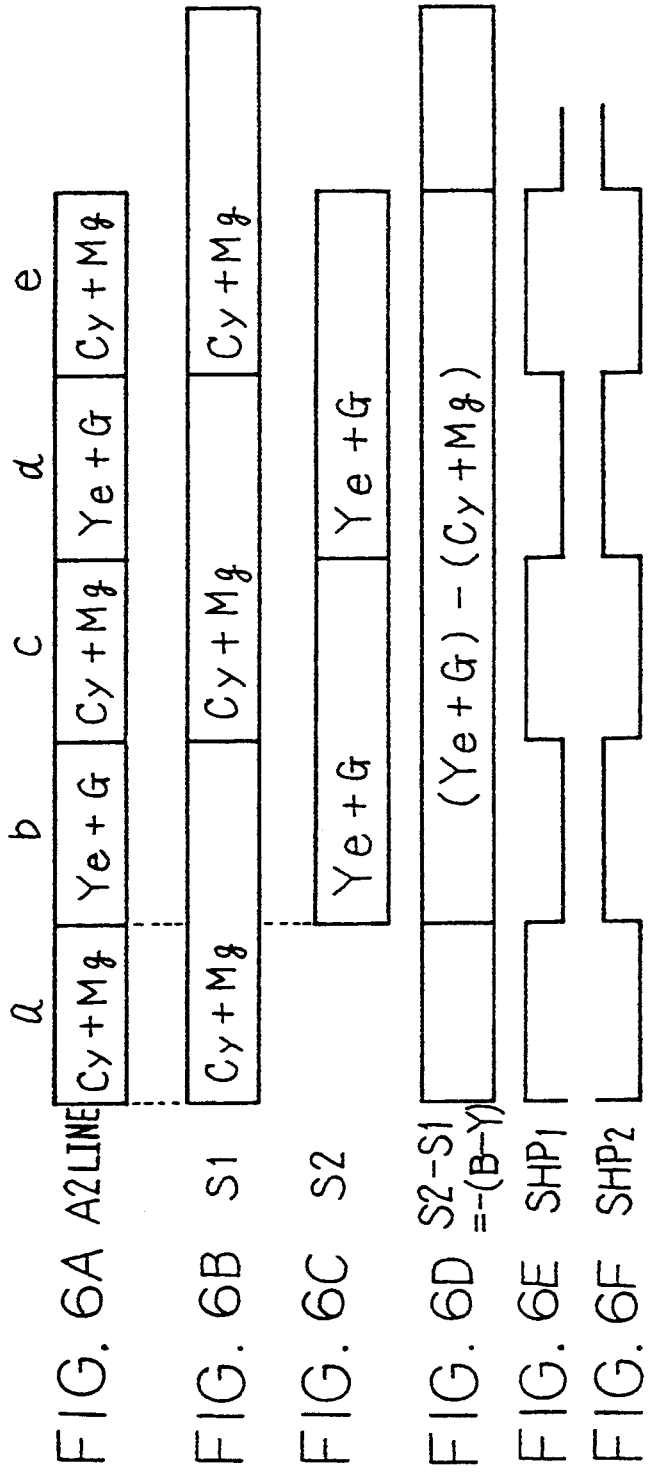
FIGS. 6A-F are a diagram also illustrating the chrominance signal processing.

The sample holding circuit 21 outputs a continuous signal S1 of (Cy+G) or (Cy+Mg) to a subtracter 23 (see FIGS. 5B and 6B), and the sample holding circuit 22 outputs a continuous signal S2 of (Ye+Mg) or (Ye+G) to the subtracter 23 (see FIGS. 5C and 6C).

The subtracter 23 subtracts the signal S1 from the signal S2, whereby a red differential signal R−Y and a blue differential signal —(B−Y) are alternately output therefrom in a line sequential manner (as shown in FIGS. 5D and 6D).

The color differential signals output from the subtracter 23 are supplied directly to a fixed terminal b of a changeover switch 24 and a fixed terminal a of a changeover switch 25, and also supplied to a fixed terminal a of the changeover switch 24 and a fixed terminal b of the changeover switch 25 via a delay circuit 26 having a delay time corresponding to one horizontal period.

The switching operation of the changeover switches 24 and 25 is controlled by a controller 27. Specifically, the switches connect to the respective terminals b during a horizontal period in which the red differential signal R−Y is output from the subtracter 23, and connect to the respective terminals a during a horizontal period in which the blue differential signal —(B−Y) is output. The controller 27 is supplied with the synchronizing signals HD and VD as reference synchronizing signals from the synchronizing generator 16, and the clock pulses CK1 from the timing generator 14.

Since the changeover switches 24 and 25 are operated in the aforementioned manner, a red differential signal R−Y is output from the changeover switch 24 in each horizontal period and a blue differential signal —(B−Y) is output from the changeover switch 25 in each horizontal period.

The luminance signal Y output from the low-pass filter 20 and the color differential signals (R−Y) and —(B−Y) output from the changeover switches 24 and 25 are supplied to an encoder 28. The encoder 28 is further supplied with a composite synchronizing signal SYNC, a blanking signal BLK, a burst flag signal BF, and a color subcarrier signal SC from the synchronizing generator 16.

In the encoder 28, as is conventionally known, the luminance signal Y is combined with the synchronizing signal SYNC, and the color differential signals are subjected to quadrature two-phase modulation to form a carrier chrominance signal C and further combined with a color burst signal. The luminance signal Y and the carrier chrominance signal C are added together to form, e.g., a color video signal SCV according to the NTSC system. The color video signal SCV thus generated by the encoder 28 appears at an output terminal 29.

The encoder 28 also generates a monochromatic video signal SV (i.e., the luminance signal Y combined with the synchronizing signal SYNC), which is supplied to an electronic viewfinder 30 through an adder 31. Thus, a picked-up image is displayed at the small-sized CRT constituting the electronic viewfinder 30.

Figure 7:
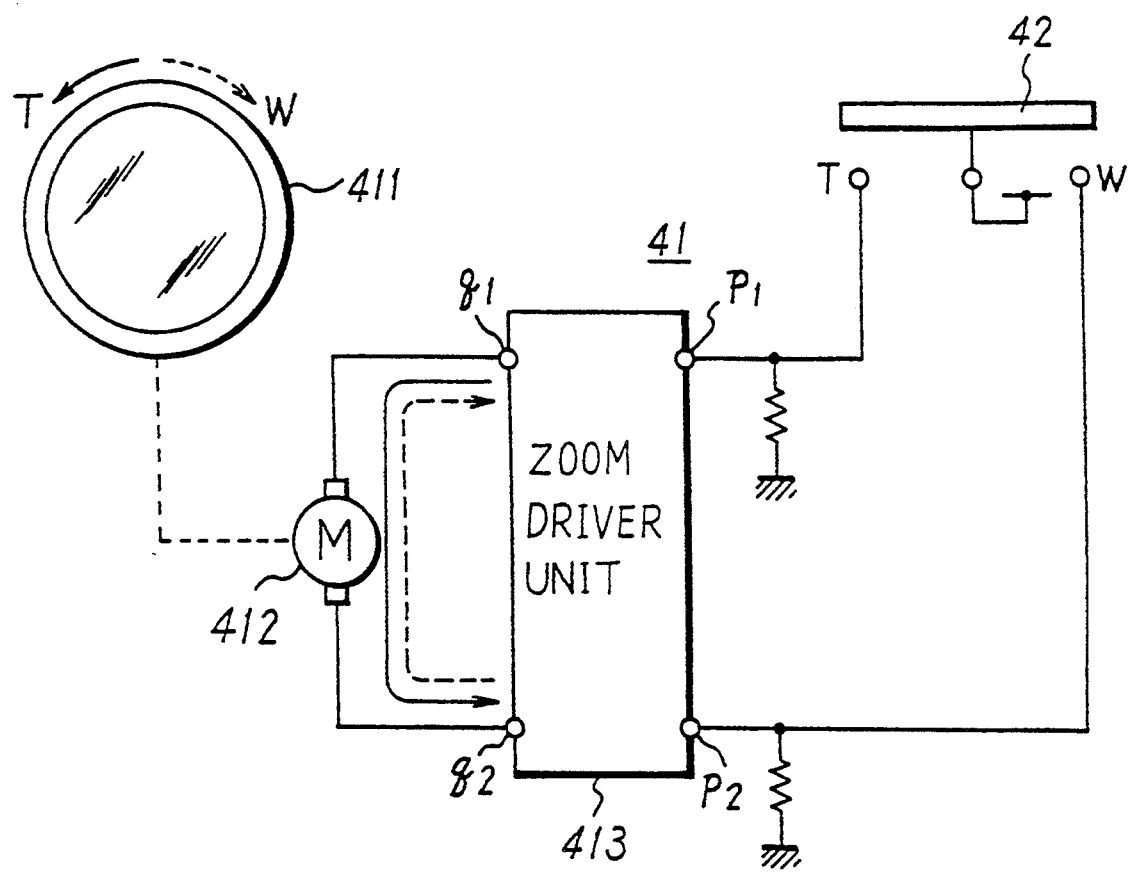
FIG. 7 is a schematic diagram showing the arrangement of a zoom driver.

The zooming power of the imaging lens 2 is adjusted by a zoom driver 41. FIG. 7 shows in detail the arrangement of the zoom driver 41, wherein reference numeral 411 denotes a lens constituting the imaging lens 2 for adjusting the zooming power. The lens 411 can be moved back and forth when rotated, whereby the zooming power is adjusted. For example, if the lens 411 is rotated in a direction T, the zooming power changes in the TELE direction; if the lens is rotated in a direction W, then the zooming power changes in the WIDE direction.

The lens 411 is rotated by a DC motor 412, which is connected to output terminals q1 and q2 of a zoom driver unit 413. Input terminals p1 and p2 of the zoom driver unit 413 are respectively connected to fixed terminals T and W of a zoom switch 42.

In this arrangement, when a high-level "H" signal is supplied to the terminal p1, a current flows through the motor 412 from the terminal q1 to the terminal q2 (as indicated by the solid line), and the lens 411 is rotated in the direction T. On the other hand, when a high-level "H" signal is supplied to the terminal p2, a current flows through the motor 412 from the terminal q2 to the terminal q1 (as indicated by the dashed arrow), and the lens 411 is rotated in the direction W. When neither the terminal p1 nor the terminal p2 is supplied with a high-level "H" signal, no current flows through the motor 412, and accordingly, the lens 411 is not rotated in either direction and the position thereof remains unchanged.

A movable terminal of the zoom switch 42 is connected to a power supply terminal. When the operating button 5T or 5W of the aforementioned cabinet 1 is pressed, the zoom switch 42 is connected to the terminal T or W, and a high-level "H" signal is supplied to the terminal p1 or p2 of the zoom driver unit 413, whereby the zooming power is adjusted in the TELE or WIDE direction.

Figure 8:
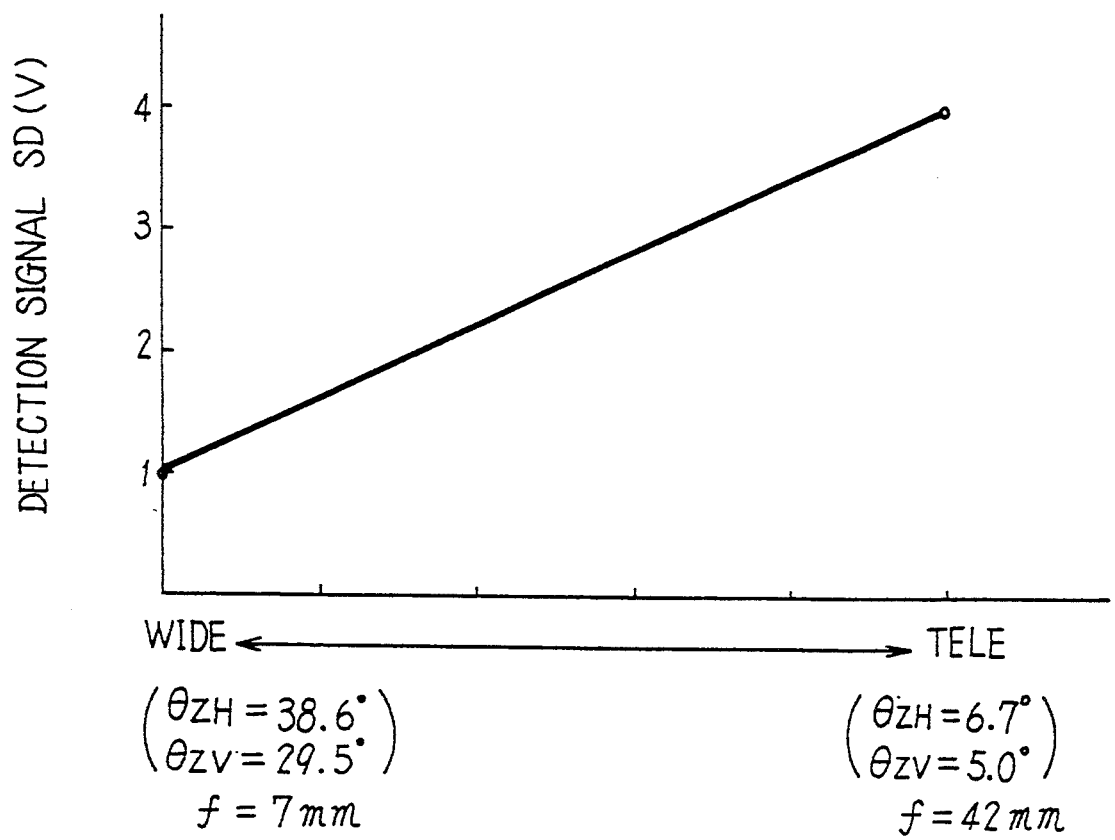
FIG. 8 is a graph showing the relationship between a zoomed view angle and a detection signal.

Further, as shown in FIG. 2, a variable resistor 44 constituting a potentiometer is arranged at a location where the lens 411 of the imaging lens 2 is mounted. The variable resistor 44 is constructed such that the position of a movable terminal thereof is shifted with a rotation of the lens 411, whereby a voltage corresponding to the zooming power builds up at the movable terminal and is applied to the controller 27 as a detection signal SD. As shown in FIG. 8, the detection signal SD is set such that it is 1 V at the WIDE end (f=7 mm) and 4 V at the TELE end (f=42 mm).

In this embodiment, a picked-up image is displayed at a fixed position on the screen of the small-sized CRT of the electronic viewfinder 30, and at the same time an image frame of the photographic camera is displayed on the same screen. The angle of view of a picked-up image changes in accordance with the zooming power, and thus the view field thereof changes accordingly. To display an image frame of the photographic camera on the screen of the small-sized CRT, the ratio of the view fields of the photographic camera and the picked-up image must be obtained.

Figure 9:
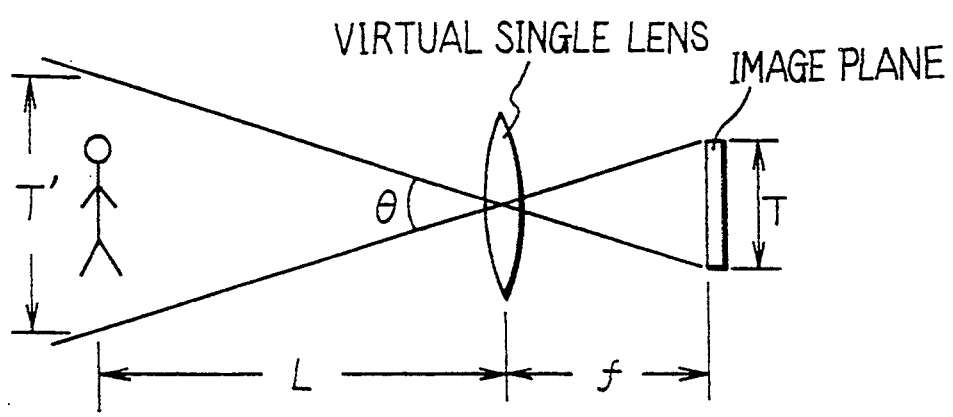
FIG. 9 is a diagram illustrating a procedure for obtaining an angle of view.

Here, the angle of view will be explained with reference to FIG. 9. The angle of view, θ, can be obtained from an image plane size T and the value f (focal length), as shown in equation (1) below. In FIG. 9, T' denotes the view field, and L denotes the distance to an object.

$$\theta = 2\tan^{-1} T/2f \qquad (1)$$

Figure 10:
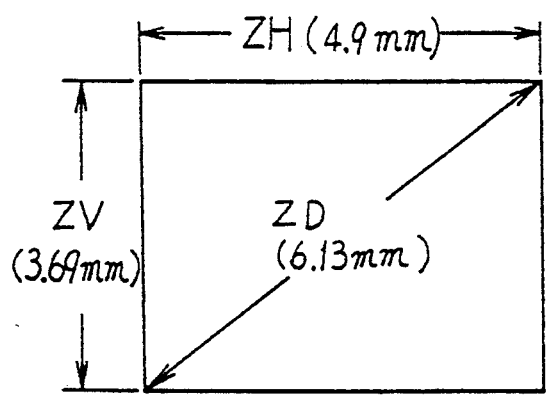
FIG. 10 is a diagram showing an image plane size of a ½-inch CCD solid-state imaging device.

The imaging lens 2 is a 6-power zoom lens having a focal length f of 7 to 42 mm, and where the imaging device 12 is a ⅓-inch type, the image plane having a horizontal size ZH of 4.9 mm, a vertical size ZV of 3.69 mm and a diagonal size ZD of 6.13 mm (see FIG. 10).

Therefore, angles θZH, θZV and θZD of view in the horizontal, vertical and diagonal directions at the WIDE end (f=7 mm) are 38.6°, 29.5°, and 47.3°, respectively, and angles $\theta ZH$, $\theta ZV$ and $\theta ZD$ of view in the horizontal, vertical and diagonal directions at the TELE end (f=42 mm) are 6.7°, 5.0°, and 8.3°, respectively.

Figure 11:
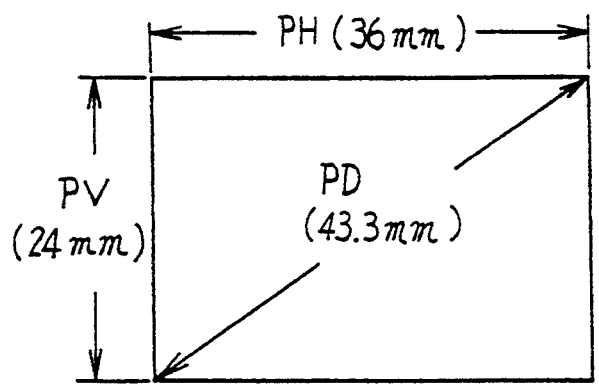
FIG. 11 is a diagram showing an image plane size of a 35 mm film.

The imaging lens 3 is a fixed-focus lens having a focal length f of 55 mm, and where the film used is a 35 mm type, the image plane having a horizontal size PH of 36 mm, a vertical size PV of 24 mm, and a diagonal size PD of 43.3 mm (see FIG. 11). Therefore, angles $\theta PH$, $\theta PV$ and $\theta PD$ of view in the horizontal, vertical and diagonal directions are 36.2°, 24.6°, and 43.0°, respectively.

From the above, the relationship between the angles of view of the imaging lens 2, which is a zoom lens, and the angles of view of the imaging lens 3, which is a fixed-focus lens, can be summarized as shown in Table 1 below.

TABLE 1

|  | Picked-up image WIDE - TELE | Photographic camera |
|---|---|---|
| Horizontal direction | $\theta ZH$ = 38.6 to 6.7° | $\theta PH$ = 36.2° |
| Vertical direction | $\theta ZV$ = 29.5 to 5.0° | $\theta PV$ = 24.6° |
| Diagonal direction | $\theta ZD$ = 47.3 to 8.3° | $\theta PD$ = 43.0° |

The ratio of the view fields of the photographic camera and picked-up image will be now explained. From FIG. 9, the view field T' is given by the following equation (2):

$$T' = 2\tan\theta/2 \qquad (2)$$

Provided that the distances L from an object to both the imaging lenses 2 and 3 of the video camera section and the photographic camera section are the same, the view field ratio is found to vary as a function of view angle $\theta$.

From the horizontal and vertical view angles $\theta ZH$ and $\theta ZV$ of the picked-up image shown in Table 1, view fields T'ZH and T'ZV in the horizontal and vertical directions at the WIDE end are 0.7 L and 0.53 L, respectively, and view fields T'ZH and T'ZV in the horizontal and vertical directions at the TELE end are 0.12 L and 0.09 L, respectively.

View angles $\theta ZH$ and $\theta ZV$ of the picked-up image at any point between the WIDE and TELE ends can be obtained from the detection signal SD, using the following equations (3):

$$\theta ZH = 38.6° - (38.6° - 6.7°)(SD-1)/3$$

$$\theta ZV = 29.5° - (29.5° - 5.0°)(SD-1)/3 \qquad (3)$$

By substituting the view angles $\theta ZH$ and $\theta ZV$ obtained by equations (3) individually for $\theta$ in equation (2), the view fields T'ZH and T'ZV can be obtained.

From the horizontal and vertical view angles $\theta PH$ and $\theta PV$ of the photographic camera shown in Table 1, view fields T'PH and T'PV in the horizontal and vertical directions are 0.65 L and 0.44 L, respectively.

Figure 12:
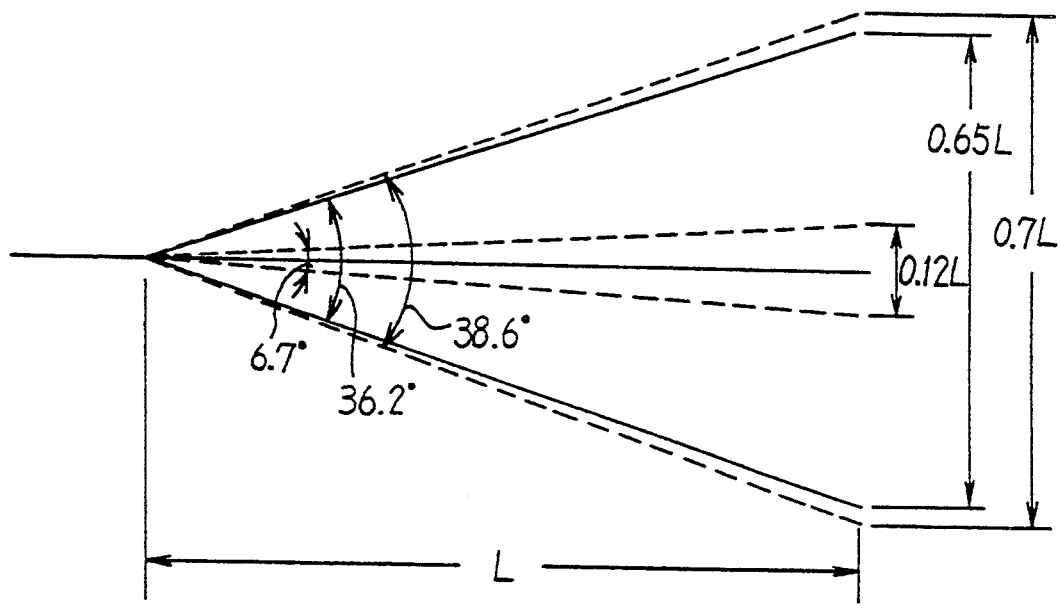
FIG. 12 is a diagram showing fields of view (horizontal direction) of a picked-up image and a photographic camera.
Figure 13:
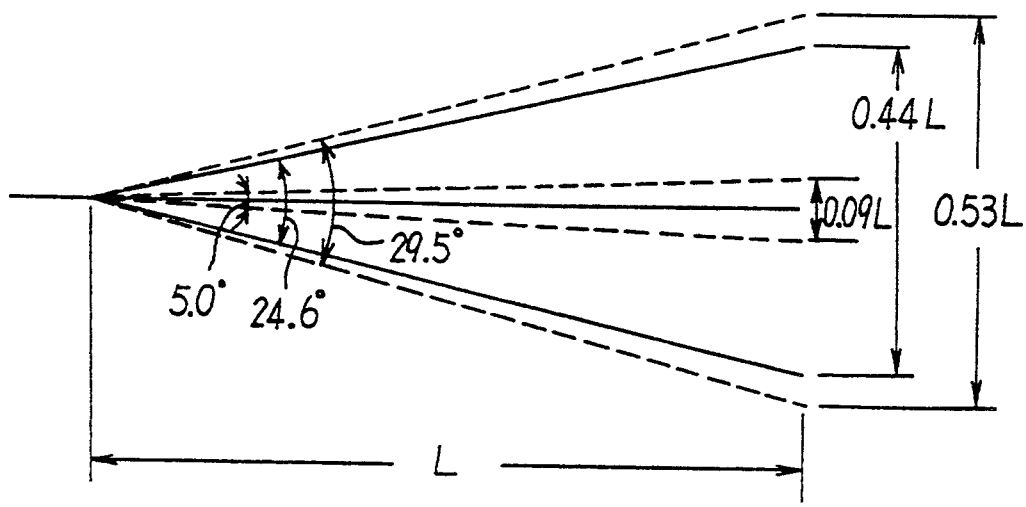
FIG. 13 is a diagram showing fields of view (vertical direction) of the picked-up image and the photographic camera.

Based on the foregoing, the relationship between the view fields of the picked-up image and those of the photographic camera can be summarized as shown in Table 2 below. FIG. 12 shows the relationship of the horizontal view fields, and FIG. 13 shows the relationship of the vertical view fields.

TABLE 2

|  | Picked-up image WIDE - TELE | Photographic camera |
|---|---|---|
| Horizontal direction | T'ZH = 0.7L to 0.12L | T'PH = 0.65L |
| Vertical direction | T'ZV = 0.53L to 0.09L | T'PV = 0.44L |

Table 3 shows view field ratios T'PH/T'ZH and T'PV/T'ZV in the horizontal and vertical directions, respectively.

TABLE 3

|  | Picked-up image WIDE - TELE |
|---|---|
| View field ratio T'PH/T'ZH in horizontal direction | 0.93 to 5.42 |
| View field ratio T'PV/T'ZV in vertical direction | 0.83 to 4.89 |

From FIG. 9, the view field T' can also be obtained as shown in equation (4).

$$T' = L \times T/f \qquad (4)$$

The focal length f can be obtained from the detection signal SD, using the following equation (5):

$$f = 7\,mm + (42\,mm - 7\,mm)(SD-1)/3 \qquad (5)$$

The focal length f, obtained by equation (5), is substituted into equation (4) and the horizontal and vertical sizes ZH and ZV of the image plane are substituted individually for T in equation (4), whereby the horizontal and vertical view fields T'ZH and T'ZV are obtained.

Referring again to FIG. 2, the controller 27 generates image frame data Dm for displaying the image frame of the photographic camera at a position corresponding to the horizontal and vertical view field ratios T'PH/T'ZH and T'PV/T'ZV.

Figure 14:
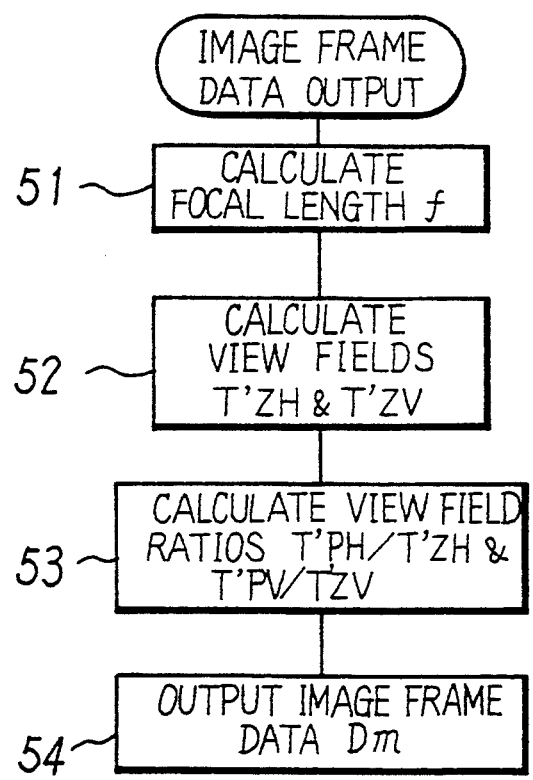
FIG. 14 is a flowchart showing an image frame data output process.

FIG. 14 is a flowchart showing an image frame data output process executed by the controller 27. First, the focal length f is computed from the detection signal SD, using equation (5) (Step 51).

Subsequently, the focal length f is substituted into equation (4), and the horizontal and vertical sizes ZH and ZV of the image plane are substituted individually for T in equation (4), to thereby obtain horizontal and vertical view fields T'ZH and T'ZV of the picked-up image (Step 52).

Then, using the view fields T'ZH and T'ZV, ratios T'PH/T'ZH and T'PV/T'ZV of the view field of the photographic camera to that of the picked-up image in the horizontal and vertical directions are calculated (Step 53).

Next, image frame data Dm corresponding to the view field ratios T'PH/T'ZH and T'PV/T'ZV is output (Step 54). The image frame data Dm is used, e.g., for an image frame signal to indicate horizontal and vertical positions. In this case, the image frame data Dm is generated based on the horizontal and vertical display lengths of a picked-up image of fixed size such that the horizontal and vertical lengths of the image frame are substantially equal to the corresponding lengths specified by the view field ratios T'PH/T'ZH and T'PV/T'ZV. The horizontal length of the image frame is adjusted in units of pixel pitch, and the vertical length of the same is adjusted in units of line pitch.

The image frame data Dm output from the controller 27 is supplied to a frame signal generating circuit 32. The frame signal generating circuit 32 is also supplied with the synchronizing signals HD and VD from the synchronizing generator 16, and the clock pulses CK1 from the timing generator 14. The frame signal generating circuit 32 outputs, e.g., a white peak level signal at times corresponding to the horizontal and vertical positions specified by the image frame data Dm, and this signal is supplied to the adder 31 as a frame signal Sm to be added to the monochromatic video signal SV.

Figure 15:
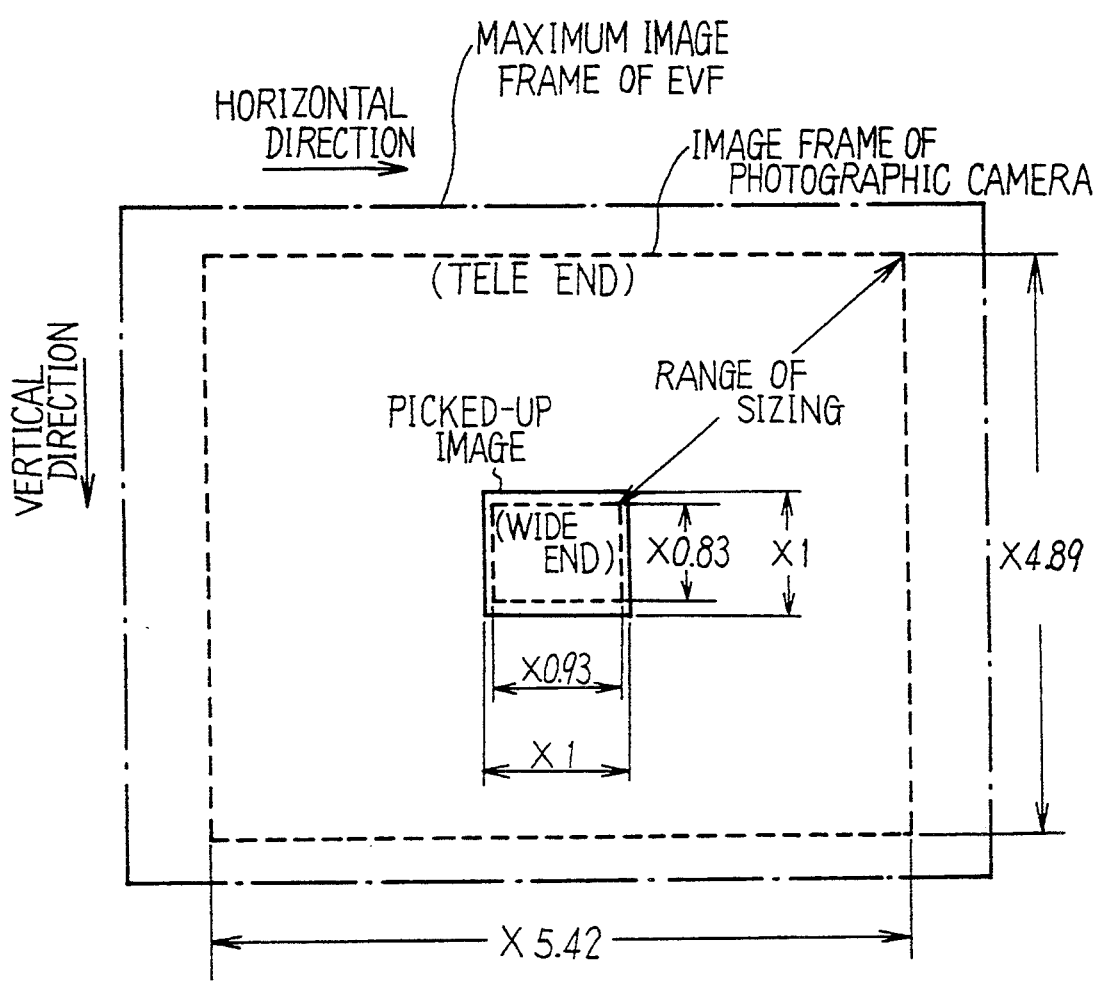
FIG. 15 is a diagram showing a display screen of an electronic viewfinder.

Accordingly, a picked-up image as shown in FIG. 15 and the image frame of the photographic camera are displayed on the screen of the small-sized CRT of the electronic viewfinder 30. In tills case, while the size of the picked-up image is fixed, the image frame of the photographic camera is displayed at a location corresponding to the zooming power.

The size of the picked-up image is previously reduced to such an extent that the image frame of the photographic camera at the TELE end can be displayed, and the picked-up image is shown at the center of the screen of the small-sized CRT. A time base compressing process for such an image reduction is executed, e.g., by the encoder 28.

In this embodiment, since the image frame of the photographic camera is displayed on the screen of the small-sized CRT of the electronic viewfinder 30 on the basis of the picked-up image of fixed size, the view field of the photographic camera can be accurately recognized even if the zooming power is changed. Accordingly, the user can correctly release the shutter of the photographic camera while viewing the display screen of the electronic viewfinder 30.

Although, in this embodiment, the video camera and the photographic camera are integrally combined, this invention can be applied to a video camera to which a separate photographic camera is firmly fixed. In this case, input means for inputting, e.g., data representing the view fields T'PH and T'PV of the photographic camera (or data of the view angles θPH and θPV, or data representing the focal length f and the image plane size, PH and PV, of the film used) to the controller 27 may be provided, whereby the invention can be applied to any type of photographic cameras.

Figure 16:
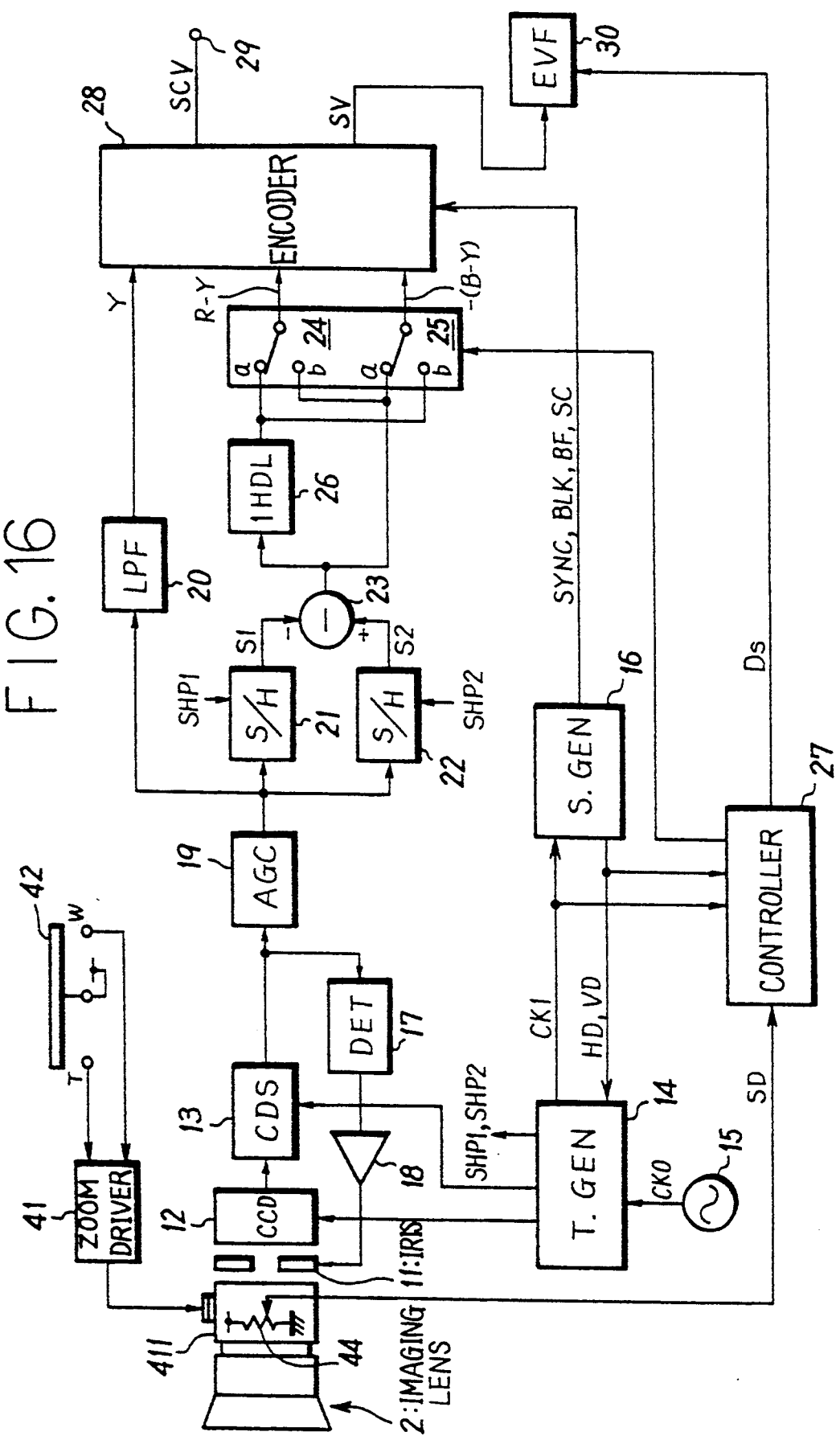
FIG. 16 is a block diagram showing the arrangement of another video camera section.

Another embodiment of this invention will be now described with reference to the drawings. FIG. 16 is a block diagram showing the arrangement of a video camera section according to this embodiment. In FIG. 16, the same reference numerals are used to denote corresponding parts in FIG. 2, and a detailed description thereof is omitted.

As shown in FIG. 16, a monochromatic video signal SV output from an encoder 28 is supplied to an electronic viewfinder 30, and a picked-up image is displayed at a small-sized CRT constituting the electronic viewfinder 30.

Figure 18:
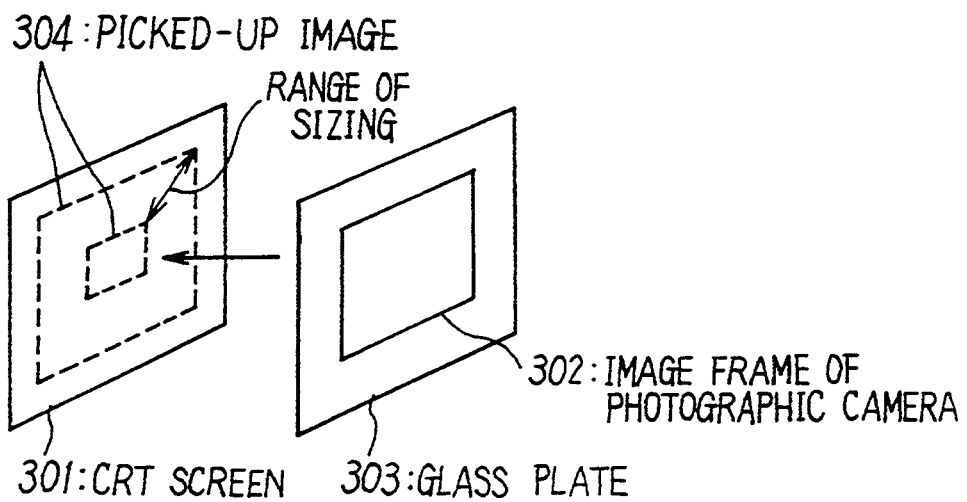
FIG. 18 is a schematic diagram showing a glass plate for frame indication.

A glass plate 303 having an image frame 302 of the photographic camera marked thereon (see FIG. 18) is arranged in close contact with a screen 301 of the small-sized CRT of the viewfinder 30. A picked-up image 304 is displayed on the basis of the image frame 302 of the photographic camera. In this case, since the angle of view of the picked-up image, and thus the view field thereof, changes in accordance with the zooming power, the size of the picked-up image 304 changes with a change in the zooming power. To change the display size, the ratio of the view fields of the picked-up image and photographic camera must be obtained.

From the above Table 2 showing the relationship between the view field of the picked-up image and that of the photographic camera, view field ratios T'ZH/T'PH and T'ZV/T'PV in the horizontal and vertical directions can be summarized as shown in Table 4.

TABLE 4

|  | Picked-up image WIDE - TELE |
| --- | --- |
| View field ratio T'ZH/T'PH in horizontal direction | 1.08 to 0.18 |
| View field ratio T'ZV/T'PV in vertical direction | 1.20 to 0.20 |

Referring again to FIG. 16, the controller 27 generates size data Ds for sizing the picked-up image 304 displayed on the screen 301 of the small-sized CRT of the viewfinder 30 in accordance with the horizontal and vertical view field ratios T'ZH/T'PH and T'ZV/T'PV.

Figure 17:
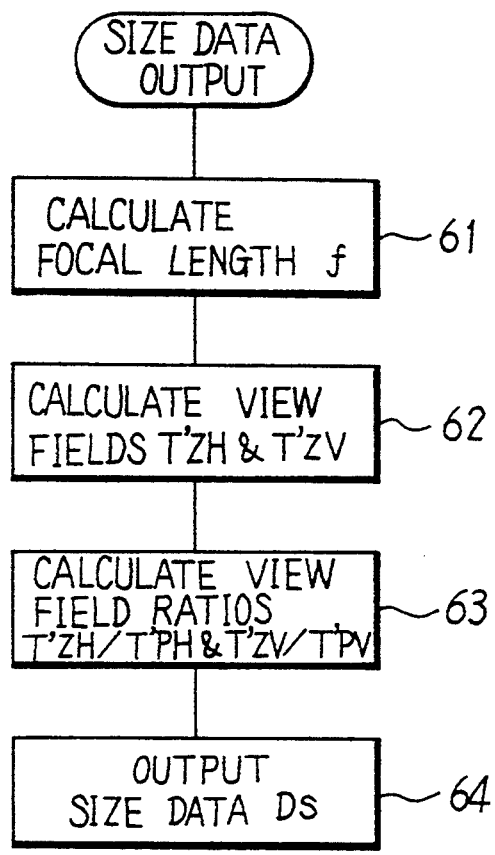
FIG. 17 is a flowchart showing a size data output process.

FIG. 17 is a flowchart showing a size data output process executed by the controller 27. First, the focal length f is calculated based on the detection signal SD, using equation (5) (Step 61).

Then, the focal length f is substituted into equation (4) and the horizontal and vertical sizes ZH and ZV of the image plane are substituted individually for T in equation (4), to thereby obtain the horizontal and vertical view fields T'ZH and T'ZV of the picked-up image (Step 62).

Subsequently, using the view fields T'ZH and T'ZV, the ratios T'ZH/T'PH and T'ZV/T'PV of the view field of the picked-up image to that of the photographic camera in the horizontal and vertical directions are computed (Step 63).

Then, size data Ds corresponding to the view field ratios T'ZH/T'PH and T'ZV/T'PV is output (Step 64). The size data Ds is used to control the angles of deflection in the horizontal and vertical directions of the small-sized CRT of the viewfinder 30.

The size data Ds output from the controller 27 is supplied to the viewfinder 30. The horizontal and vertical display dimensions of the picked-up image 304 are adjusted on the basis of the image frame 302 of the photographic camera such that they are equal to the corresponding lengths specified by the view field ratios T'ZH/T'PH and T'ZV/T'PV.

In this case, the vertical length of the image is controlled by, e.g., changing the amplitude of a saw-tooth wave signal by a vertical drive circuit to thereby change the amplitude of a current flowing through a vertical deflection coil. On the other hand, the horizontal length of the image is controlled by changing the capacitance of a resonant capacitor of a horizontal output circuit and thereby changing the amplitude of a current flowing through a horizontal deflection coil.

If the angles of deflection in the horizontal and vertical directions are reduced, the scanning width of an electron beam in the CRT is shortened while the scanning period remains the same, which results in an increase of the energy at the fluorescent screen. Accordingly, measures are taken such that the contrast is lowered to thereby protect the fluorescent screen, though not described in detail.

Figure 19:
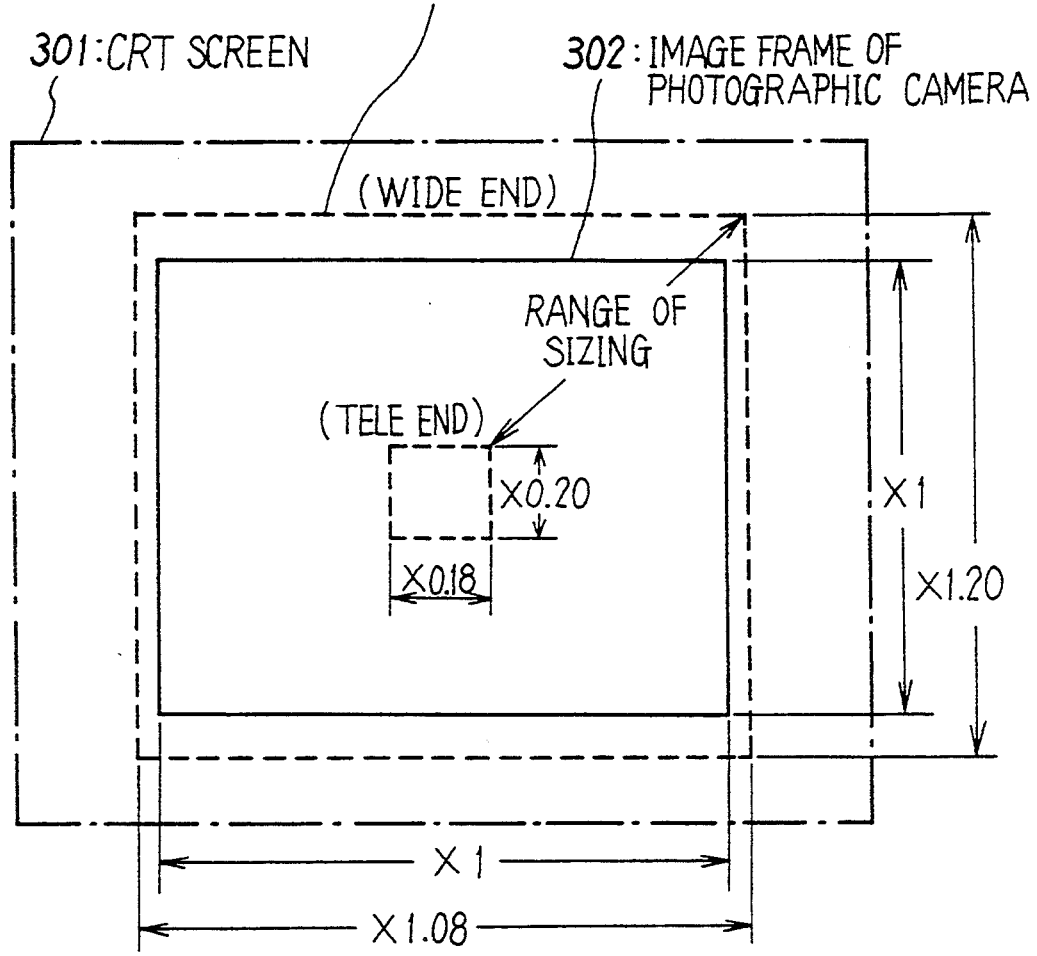
FIG. 19 is a diagram showing a display screen of an electronic viewfinder.

FIG. 19 shows the screen 301 of the small-sized CRT of the viewfinder 30, wherein, while the image frame 302 of the photographic camera is fixed in size, the picked-up image 304 is displayed using an area corresponding to the zooming power.

In this embodiment, since the picked-up image 304 is displayed on the screen 301 of the small-sized CRT of the viewfinder 30 on the basis of the fixed-size image frame 302 of the photographic camera, the view field of the photographic camera can be accurately recognized even if the zooming power is changed. Accordingly, the user can correctly release the shutter of the photographic camera while viewing the display screen of the viewfinder 30.

Although, in this embodiment, the video camera and the photographic camera are integrally combined, this invention can be applied to a video camera to which a separate photographic camera is firmly fixed. In this case, input means for inputting data, e.g., data representing the view fields T'PH and T'PV of the photographic camera (or data of the view angles θPH and θPV, or data representing the focal length f and the image plane size, PH and PV, of the film used) to the controller 27 may be provided, whereby the invention can be applied to any type of photographic camera.

Further, in the above embodiment, the glass plate 303 is disposed in close contact with the screen 301 of the CRT to show the image frame 302 of the photographic camera. Alternatively, the image frame 302 may be marked directly on the screen 301.

Figure 20:
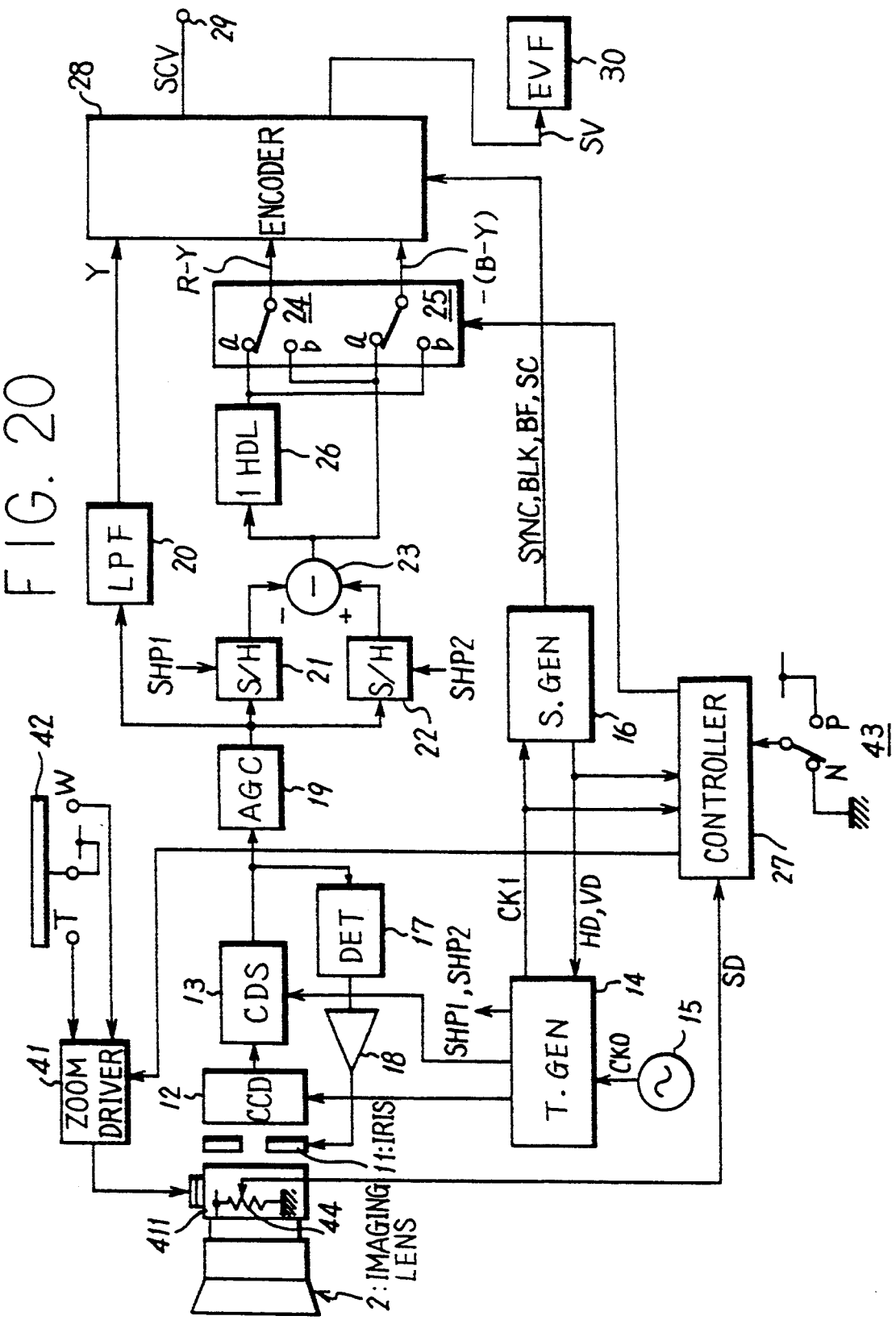
FIG. 20 is a block diagram showing the arrangement of still another video camera section.

Still another embodiment of this invention will be described with reference to the drawings. FIG. 20 is a block diagram showing the arrangement of a video camera section according to this embodiment. In FIG. 20, the same reference numerals are used to denote corresponding parts in FIG. 2, and a detailed description thereof is omitted.

As shown in FIG. 20, a monochromatic video signal SV output from an encoder 28 is supplied to an electronic viewfinder 30, and a picked-up image is displayed at a small-sized CRT constituting the electronic viewfinder 30.

Figure 21:
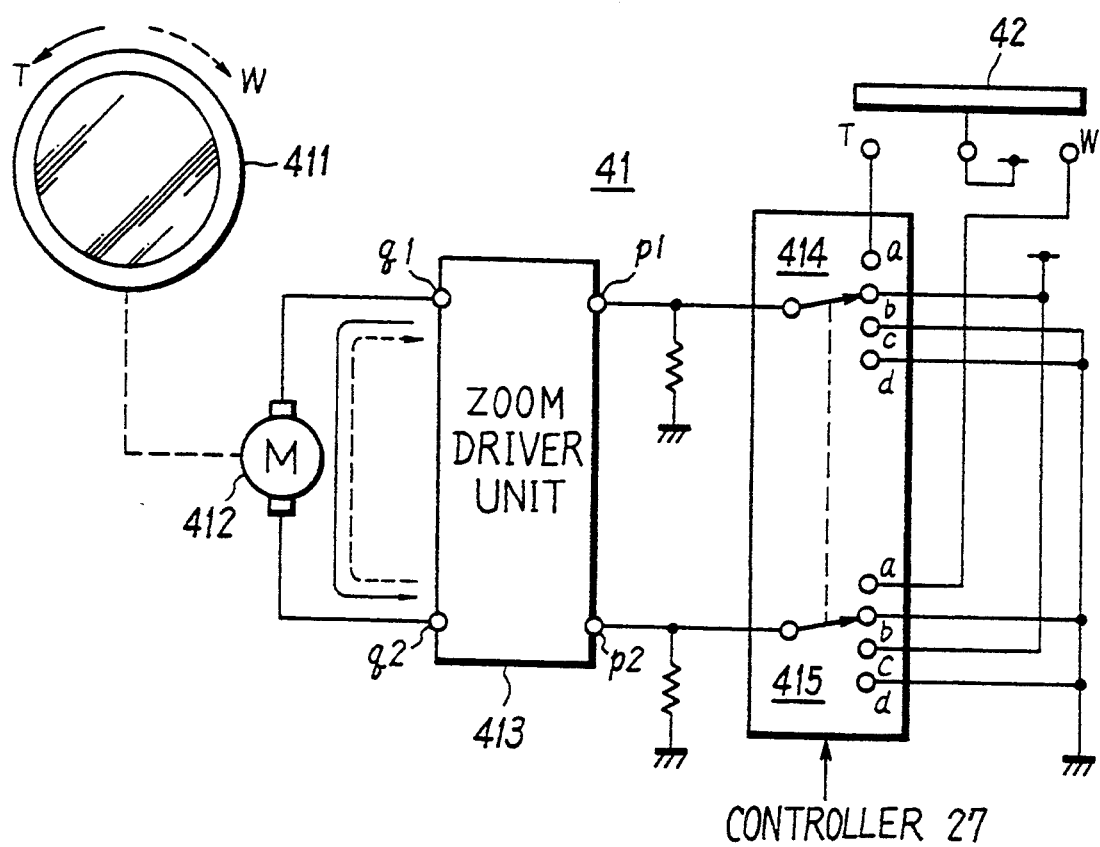
FIG. 21 is a schematic diagram showing the arrangement of a zoom driver.

A zoom driver 41 in FIG. 20 has an arrangement shown in FIG. 21. In the figure, reference numeral 411 represents a lens which constitutes an imaging lens 2 and is used to adjust the zooming power. The lens 411 can be moved back and forth when rotated, whereby the zooming power is adjusted. For example, if the lens 411 is rotated in a direction T, the zooming power changes in the TELE direction; if the lens is rotated in a direction W, then the zooming power changes in the WIDE direction.

The lens 411 is rotated by a DC motor 412, which is connected to output terminals q1 and q2 of a zoom driver unit 413. Input terminals p1 and p2 of the zoom driver unit 413 are respectively connected to movable terminals of changeover switches 414 and 415.

In this arrangement, when a high-level "H" signal is supplied to the terminal p1, a current flows through the motor 412 from the terminal q1 to the terminal q2 (as indicated by the solid line), and the lens 411 is rotated in the direction T. On the other hand, when a high-level "H" signal is supplied to the terminal p2, a current flows through the motor 412 from the terminal q2 to the terminal q1 (as indicated by the dashed arrow), and the lens 411 is rotated in the direction W. When neither the terminal p1 nor p2 is supplied with a high-level "H" signal, no current flows through the motor 412, and therefore, the lens 411 is not rotated in either direction and the position thereof is maintained.

The changeover switch 414 has a fixed terminal a connected to a fixed terminal T of a zoom switch 42, a fixed terminal b connected to a power supply terminal, and fixed terminals c and d grounded. The changeover switch 415 has a fixed terminal a connected to a fixed terminal W of the zoom switch 42, fixed terminals b and d grounded, and a fixed terminal c connected to the power supply terminal.

A movable terminal of the zoom switch 42 is connected to a power supply terminal. When the operating button 5T or 5W of the aforementioned cabinet 1 is pressed, the zoom switch 42 is connected to the terminal T or W.

Figure 22:
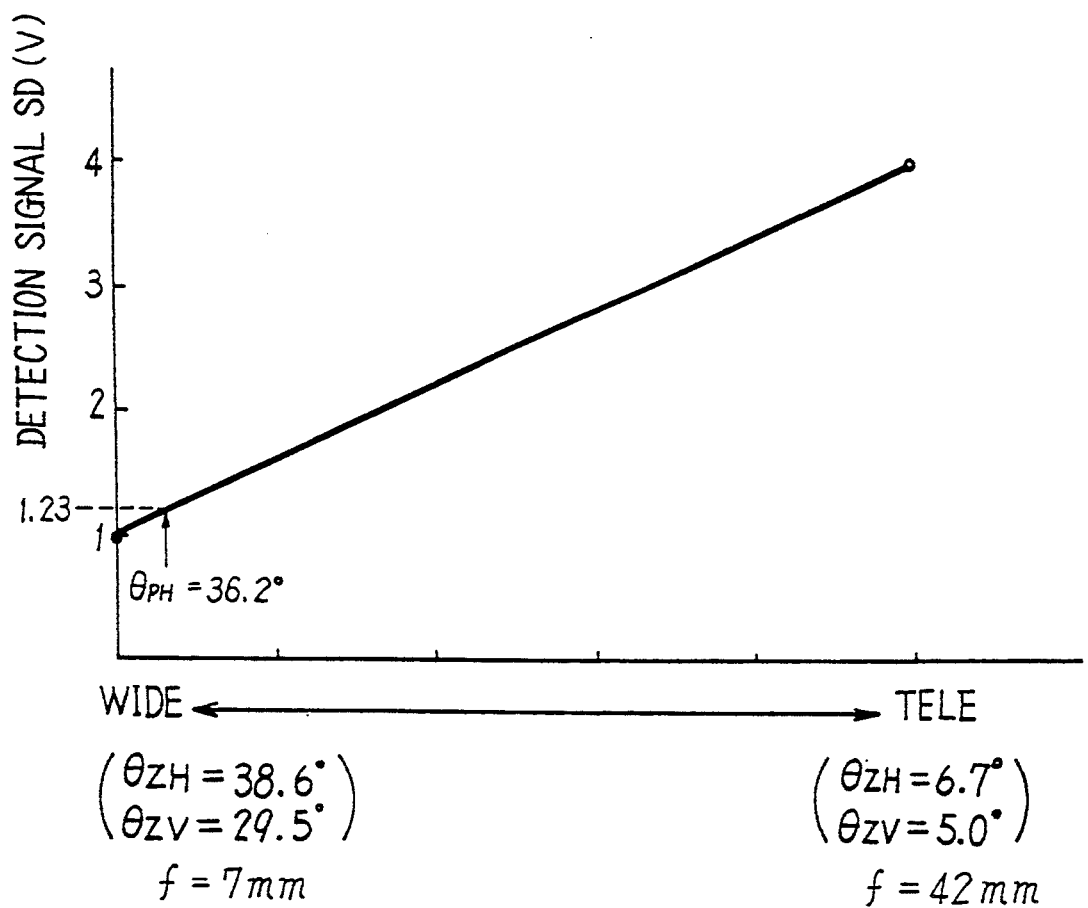
FIG. 22 is a graph showing the relationship between the zoomed view angle and a detection signal.

As in the foregoing embodiment and as shown in FIG. 20, a variable resistor 44 constituting a potentiometer is arranged at a location where the lens 411 of the imaging lens 2 is mounted. The variable resistor 44 is constructed such that the position of a movable terminal thereof is shifted with a rotation of the lens 411, whereby a voltage corresponding to the zooming power builds up at the movable terminal and is applied to the controller 27 as a detection signal SD. As shown in FIG. 22, the detection signal SD is set such that it is 1 V at the WIDE end (f=7 mm) and 4 V at the TELE end (f=42 mm).

Reference numeral 43 denotes a mode changeover switch having a movable terminal connected to the controller 27, a fixed terminal N grounded, and a fixed terminal P connected to a power supply terminal. The changeover switch 43 is connected to the terminal N to set a normal mode, and is connected to the terminal P to set a photographic camera mode.

The switching operation of the changeover switches 414 and 415 is carried out in an interlocked manner and is controlled by the controller 27.

In the normal mode wherein the changeover switch 43 is connected to the terminal N, the changeover switches 414 and 415 are connected to the respective terminals a. While in this state, if the zoom switch 42 is connected to the terminal T or W, a high-level "H" signal is supplied to the terminal p1 or p2 of the zoom driver unit 413, whereby the zooming capacity is adjusted in the TELE or WIDE direction.

In the photographic camera mode wherein the changeover switch 43 is connected to the terminal P, the changeover switches 414 and 415 are connected to a suitable one of the respective terminals b-d such that the angle of view of the picked-up image coincides with that of the photographic camera.

The relationship of view angle between the imaging lens 2, which is a zoom lens, and the imaging lens 3, which is a fixed-focus lens, is shown in the above Table 1.

According to this embodiment, in the photographic camera mode, control is carried out such that the horizontal view angle θZH of the picked-up image coincides with the horizontal view angle θPH (=36.2°) of the photographic camera. Namely, FIG. 8 shows that, when the horizontal view angle θZH is 36.2°, the detection signal SD is 1.23 V (see FIG. 22), and therefore, the controller 27 adjusts the zooming power, with the changeover switches 414 and 415 connected to the terminal b or c, until the detection signal SD becomes equal to 1.23 V, and when the detection signal SD becomes 1.23 V, the changeover switches 414 and 415 are finally connected to the terminal d. Accordingly, the horizontal view angle θZH of the picked-up image can be maintained at an angle coinciding with the horizontal view angle θPH of the photographic camera. In this case, since the view angles are the same, the view fields T' are also identical to each other, and therefore, the view fields change with a change in the view angles on condition that the distances L to the object are identical.

According to this embodiment, in the photographic camera mode in which the changeover switch 43 is connected to the terminal P, the horizontal view angle θZH of the picked-up image can be made coincident with the horizontal view angle θPH of the photographic camera. Accordingly, a picked-up image corresponding to the view field of the photographic camera is displayed on the screen of the small-sized CRT of the electronic viewfinder 30 (since the vertical view angles are not made coincident with each other, the vertical length of the picked-up image is not in agreement with the view field of the photographic camera), whereby the user can correctly release the shutter of the photographic camera while viewing the display screen of the electronic viewfinder 30.

Although, in the above embodiment, the horizontal view angle θZH is changed to be coincident with the horizontal view angle θPH in the photographic camera mode, the vertical view angle θZV may alternatively be controlled.

Further, although in the above embodiment, the video camera and the photographic camera are integrally combined, this invention can be applied to a video camera to which a separate photographic camera is firmly fixed. In this case, input means for inputting, e.g., data representing the angle of view of the photographic camera (or data representing the focal length f and the image plane size of the film used) to the controller 27 may be provided, so that the controller 27 can calculate a value of the detection signal SD to be generated when the angle of view of the picked-up image coincides with that of the photographic camera, whereby the invention can be applied to any type of photographic camera.

Figure 23:
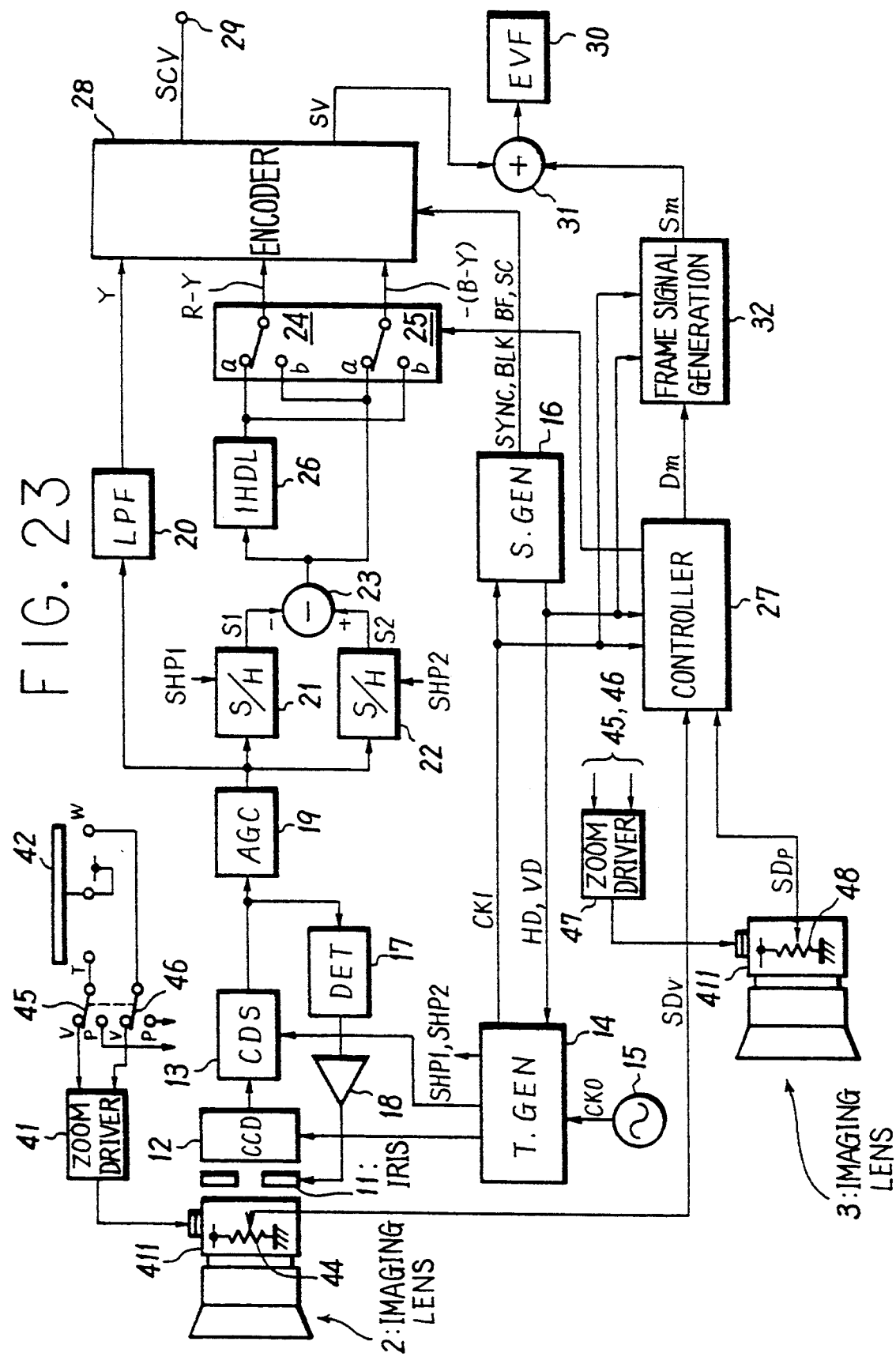
FIG. 23 is a block diagram showing the arrangement of a video camera section.

A further embodiment of this invention will be described with reference to the drawings. FIG. 23 is a block diagram showing the arrangement of a video camera section according to this embodiment. In FIG. 23, the same reference numerals are used to denote corresponding parts in FIG. 2, and a detailed description thereof is omitted.

As shown in FIG. 23, a monochromatic video signal SV output from an encoder 28 is supplied to an electronic viewfinder 30 through an adder 31, and a picked-up image is displayed at a small-sized CRT constituting the electronic viewfinder 30.

Figure 24:
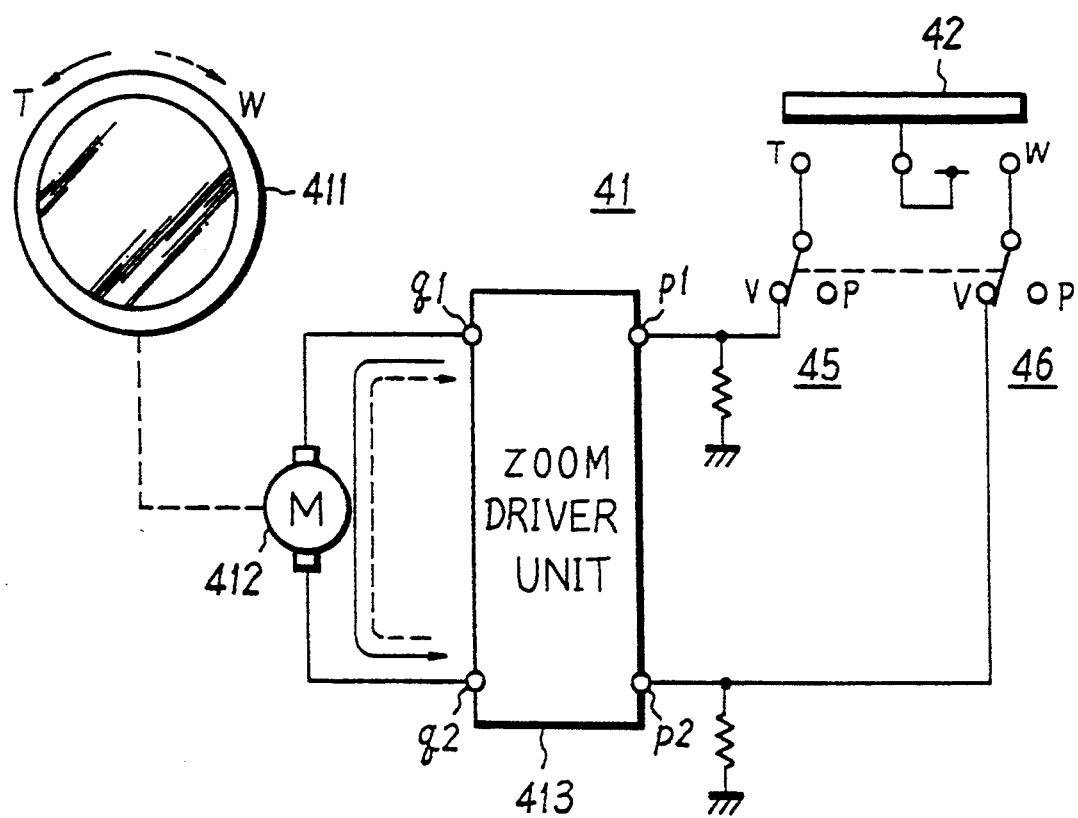
FIG. 24 is a schematic diagram showing the arrangement of a zoom driver.

A zoom driver 41 in FIG. 23 has an arrangement shown in FIG. 24. In the figure, reference numeral 411 represents a lens which constitutes an imaging lens 2 and is used to adjust the zooming power. The lens 411 can be moved back and forth when rotated, whereby the zooming power is adjusted. For example, when the lens 411 is rotated in a direction T, the zooming power changes in the TELE direction; when the lens is rotated in a direction W, the zooming power changes in the WIDE direction.

The lens. 411 is rotated by a DC motor 412, which is connected to output terminals q1 and q2 of a zoom driver unit 413. Input terminals p1 and p2 of the zoom driver unit 413 are connected, respectively, to fixed terminals T and W of a zoom switch 42 through terminals v of respective changeover switches 45 and 46.

The switching of the changeover switches 45 and 46 is carried out by a zoom selection button (not shown in FIG. 1) arranged in the cabinet 1. For example, when the zoom selection button is not pressed, the switches 45 and 46 are connected to the respective terminals v, and when the button is pressed, the switches are connected to respective terminals p.

When a high-level "H" signal is supplied to the terminal p1 of the zoom driver unit 413, a current flows through the motor 412 from the terminal q1 to the terminal q2 (as indicated by the solid line), and the lens 411 is rotated in the direction T. On the other hand, when a high-level "H" signal is supplied to the terminal p2, a current flows through the motor 412 from the terminal q2 to the terminal q1 (as indicated by the dashed arrow), and the lens 411 is rotated in the direction W. When neither the terminal p1 nor p2 is supplied with a high-level "H" signal, no current flows through the motor 412, and therefore, the lens 411 is not rotated in either direction and the position thereof is maintained.

A movable terminal of the zoom switch 42 is connected to a power supply terminal. When the operating button 5T or 5W of the cabinet 1 is pressed, the zoom switch 42 is connected to the terminal T or W. When the operating button 5T or 5W is pressed with the zoom selection button released, a high-level "H" signal is supplied to the terminal p1 or p2 of the zoom driver unit 413, whereby the zooming power is adjusted in the TELE or WIDE direction.

Figure 25:
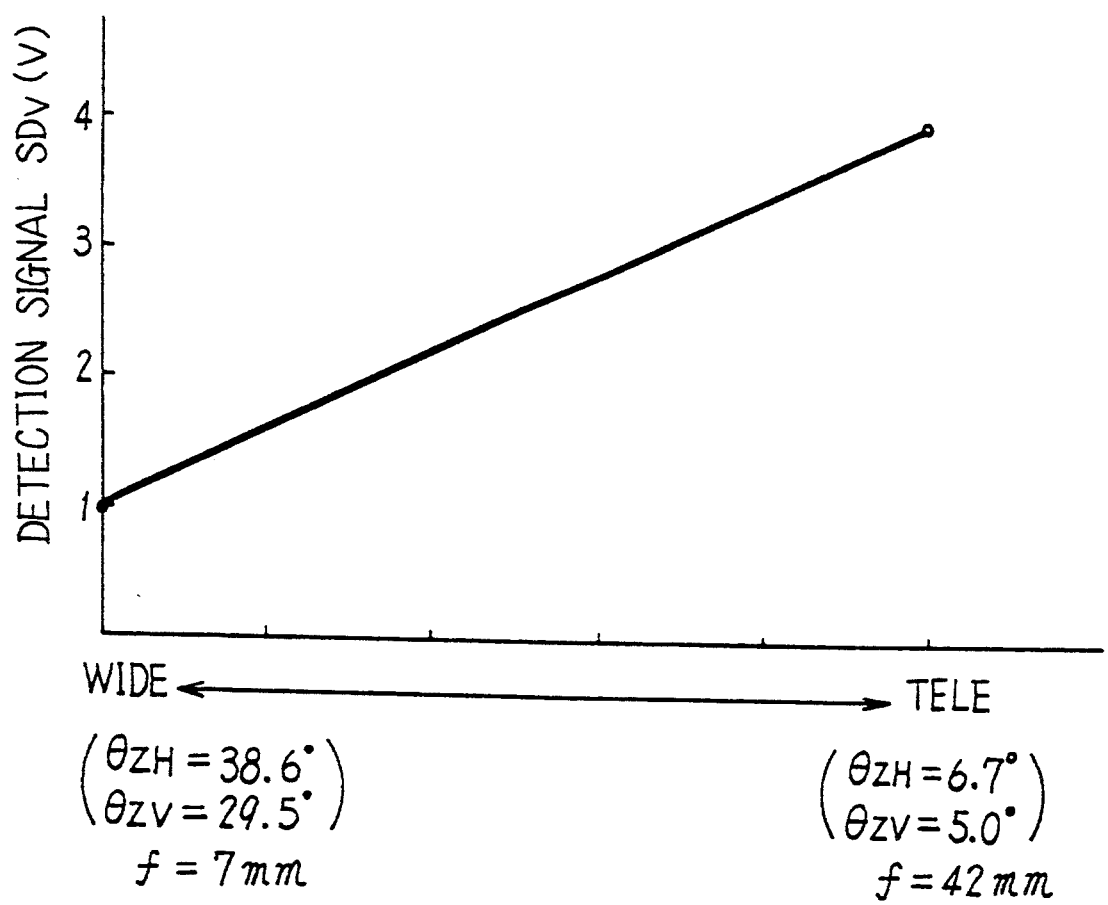
FIG. 25 is a graph showing the relationship between the zoomed view angle and a detection signal.

As shown in FIG. 23, a variable resistor 44 constituting a potentiometer is arranged at a location where the lens 411 of the imaging lens 2 is mounted. The variable resistor 44 is constructed such that the position of a movable terminal thereof is shifted as the lens 411 is rotated, whereby a voltage corresponding to the zooming power appears at the movable terminal and is applied to the controller 27 as a detection signal SDv. As shown in FIG. 25, the detection signal SDv is set such that it is 1 V at the WIDE end (f=7 mm) and 4 V at the TELE end (f=42 mm).

Figure 26:
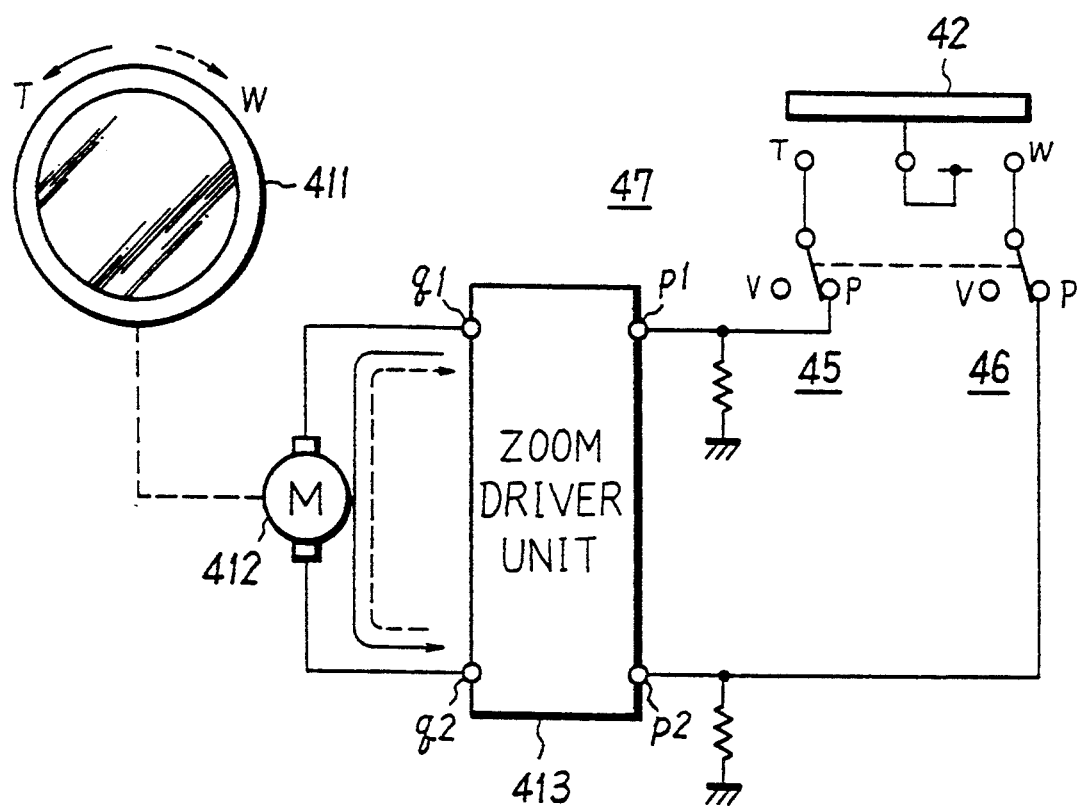
FIG. 26 is a schematic diagram showing the arrangement of a zoom driver.

In this embodiment, a 3-power zoom lens having a focal length f of 35 to 105 mm is used for the imaging lens 3 of the photographic camera section, and the zooming power of the imaging lens 3 is adjusted by a zoom driver 47. FIG. 26 shows the arrangement of the zoom driver 47 in detail. This zoom driver 47 has an arrangement similar to that of the aforementioned zoom driver 41, and therefore, the same reference numerals are used to represent corresponding parts and a detailed description thereof is omitted.

Input terminals p1 and p2 of a zoom driver unit 413 of the zoom driver 47 are connected to fixed terminals T and W of a zoom switch 42 through terminals p of changeover switches 45 and 46, respectively.

When the operating button 5T or 5W of the cabinet 1 is pressed, the zoom switch 42 is connected to the terminal T or W. When the operating button 5T or 5W is pressed with the zoom selection button held down, a high-level "H" signal is supplied to the terminal p1 or p2 of the zoom driver unit 413, whereby the zooming power is adjusted in the TELE or WIDE direction.

Figure 27:
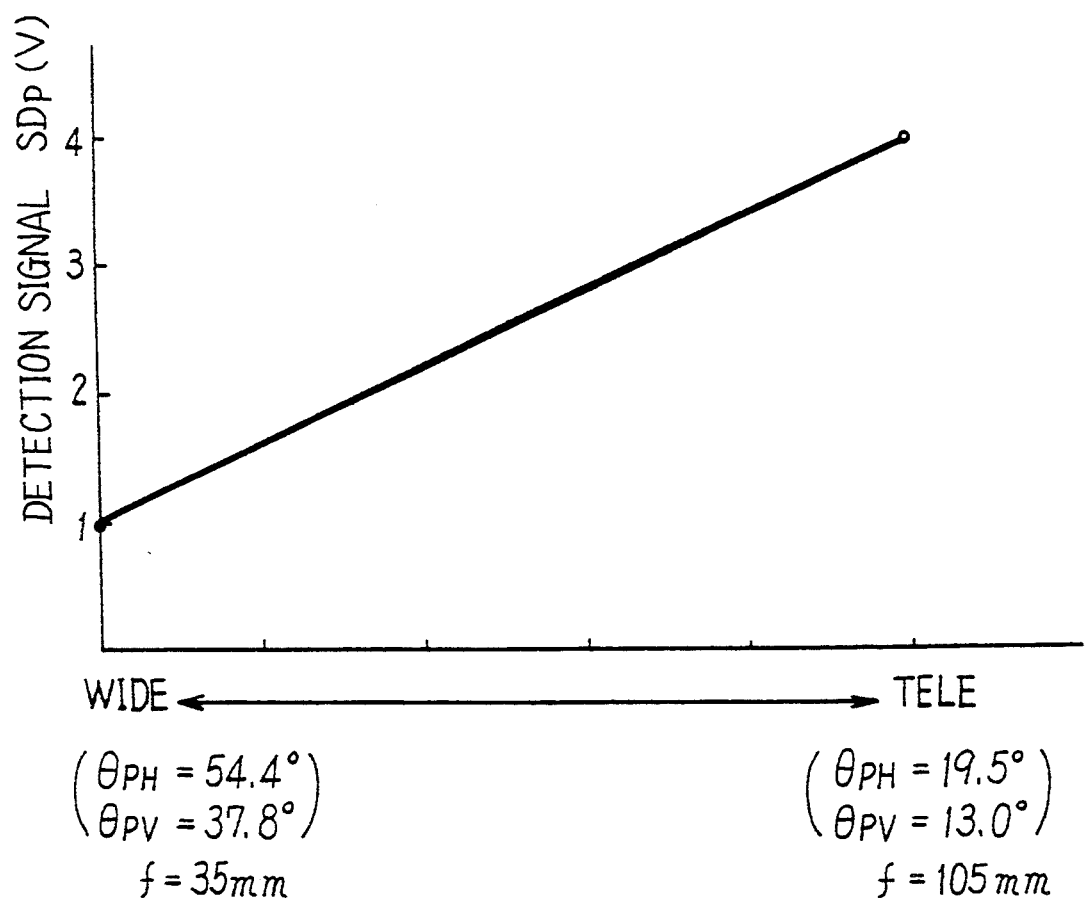
FIG. 27 is a graph showing the relationship between the zoomed view angle and a detection signal.

As shown in FIG. 23, a variable resistor 48 constituting a potentiometer is arranged at a location where the lens 411 of the imaging lens 3 is mounted. The variable resistor 48 is constructed such that the position of a movable terminal thereof is shifted as the lens 411 is rotated, whereby a voltage corresponding to the zooming power appears at the movable terminal and is applied to the controller 27 as a detection signal SDp. As shown in FIG. 27, the detection signal SDp is set such that it is 1 V at the WIDE end (f=35 mm) and 4 V at the TELE end (f=105 mm).

In this embodiment, a picked-up image is displayed at a fixed position on the screen of the small-sized CRT of the electronic viewfinder 30, and at the same time, an image frame of the photographic camera is displayed on the same screen. The angles of view of the video camera and the photographic camera change in accordance with the zooming power, and thus the view fields thereof change accordingly. To display an image frame of the photographic camera on the screen of the small-sized CRT, the ratio of the view fields of the picked-up image and the photographic camera must be obtained.

The view angle $\theta$ can be obtained from the image plane size T and the value f (focal length), using the above equation (1) and based on FIG. 9.

The imaging lens 2 is a 6-power zoom lens having an f value of 7 to 42 mm. In the case wherein the imaging device 12 is a ½-inch type, the image plane has a horizontal size ZH of 4.9 mm, a vertical size ZV of 3.69 mm and a diagonal size ZD of 6.13 mm (see FIG. 10).

Therefore, the view angles $\theta ZH$ and $\theta ZV$ in the horizontal and vertical directions at the WIDE end (f=7 mm) are 38.6° and 29.5°, respectively. The view angles $\theta ZH$ and $\theta ZV$ in the horizontal and vertical directions at the TELE end (f=42 mm) are 6.7° and 5.0°, respectively.

The imaging lens 3 is a 3-power zoom lens having an f value of 35 to 105 mm. Where the film used is a 35 mm type, the image plane has a horizontal size PH of 36 mm, a vertical size PV of 24 mm, and a diagonal size PD of 43.3 mm (see FIG. 11).

Therefore, the view angles $\theta PH$ and $\theta PV$ in the horizontal and vertical directions at the WIDE end (f=35 mm) are 54.4° and 37.8°, respectively, and the view angles $\theta PH$ and $\theta PV$ in the horizontal and vertical directions at the TELE end (f=105 mm) are 19.5° and 13.0°, respectively.

From the above, the relationship between the view angles of the imaging lenses 2 and 3, which each comprise a zoom lens, can be summarized as shown in Table 5 below.

TABLE 5

|  | Picked-up image WIDE - TELE | Photographic camera WIDE - TELE |
| --- | --- | --- |
| Horizontal direction | $\theta ZH$ = 38.6 to 6.7° | $\theta PH$ = 54.4 to 19.5° |
| Vertical direction | $\theta ZV$ = 29.5 to 5.0° | $\theta PV$ = 37.8 to 13.0° |

The ratio of the view fields of the photographic camera and the picked-up image will be now explained. From FIG. 9, the view field T' can be obtained by the aforementioned equation (2).

Provided that the distances L from the object to both the imaging lenses 2 and 3 of the video camera section and the photographic camera section are the same, the view field ratio is found to vary as a function of view angle $\theta$.

From the horizontal and vertical view angles $\theta ZH$ and $\theta ZV$ of the picked-up image shown in Table 5, view fields T'ZH and T'ZV in the horizontal and vertical directions at the WIDE end are 0.7 L and 0.53 L, respectively, and view fields T'ZH and T'ZV in the horizontal and vertical directions at the TELE end are 0.12 L and 0.09 L, respectively.

View angles $\theta ZH$ and $\theta ZV$ of the picked-up image at any point between the WIDE and TELE ends can be obtained from the detection signal SDv, using the following equations (6):

$$\theta ZH = 38.6° - (38.6° - 6.7°)(SDv - 1)/3$$

$$\theta ZV = 29.5° - (29.5° - 5.0°)(SDv - 1)/3 \qquad (6)$$

By substituting the view angles $\theta ZH$ and $\theta ZV$ obtained by equations (6) individually for $\theta$ in equation (2), the view fields T'ZH and T'ZV can be obtained.

From the horizontal and vertical view angles $\theta PH$ and $\theta PV$ of the photographic camera shown in Table 5, view fields T'PH and T'PV in the horizontal and vertical directions at the WIDE end are 1.03 L and 0.69 L, respectively, and view fields T'PH and T'PV in the horizontal and vertical directions at the TELE end are 0.34 L and 0.23 L, respectively.

View angles $\theta PH$ and $\theta PV$ of the photographic camera at any point between the WIDE and TELE ends can be obtained from the detection signal SDp, using the following equations (7):

$$\theta PH = 54.4° - (54.4° - 19.5°)(SDp - 1)/3$$

$$\theta PV = 37.8° - (37.8° - 13.0°)(SDp - 1)/3 \qquad (7)$$

By substituting the view angles $\theta PH$ and $\theta PV$ obtained by equations (7) individually for $\theta$ in equation (2), the view fields T'PH and T'PV can be obtained.

Figure 28:
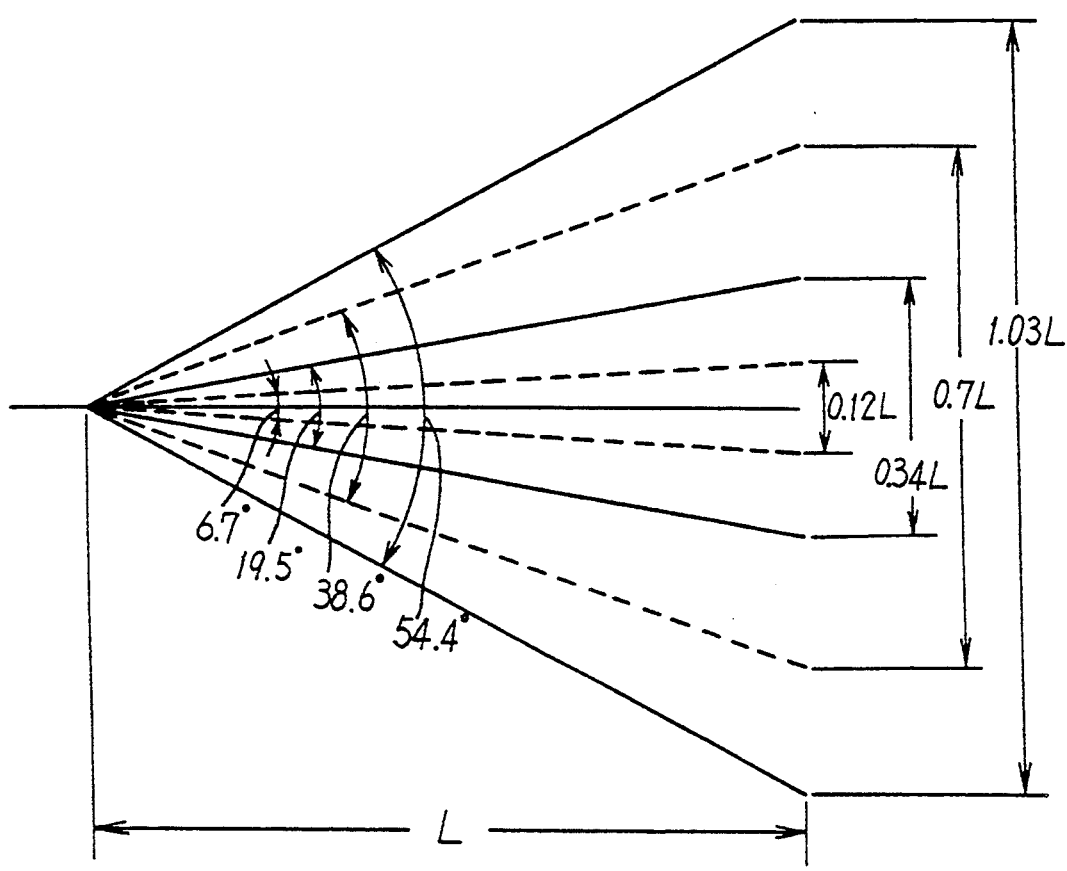
FIG. 28 is a diagram showing the view fields (horizontal direction) of a picked-up image and a photographic camera.
Figure 29:
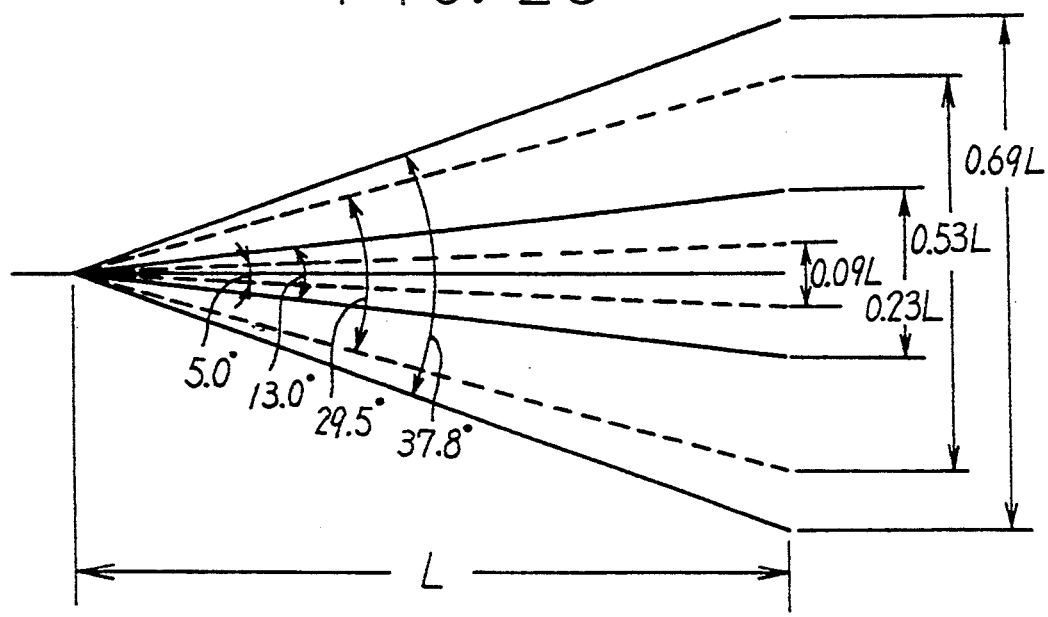
FIG. 29 is a diagram showing the view fields (vertical direction) of the picked-up image and the photographic camera.

From the foregoing, the relationship between the view field of the picked-up image and that of the photographic camera can be summarized as shown in Table 6 below. FIG. 28 shows the relationship of the view fields in the horizontal direction, and FIG. 29 shows the relationship of the view fields in the vertical direction.

TABLE 6

|  | Picked-up image WIDE - TELE | Photographic camera WIDE - TELE |
| --- | --- | --- |
| Horizontal direction | T'ZH = 0.7L to 0.12L | T'PH = 1.03L to 0.34L |
| Vertical direction | T'ZV = 0.53L to 0.09L | T'PV = 0.69L to 0.23L |

Further, view field ratios T'PH/T'ZH and T'PV/T'ZV in the horizontal and vertical directions become as shown in Table 7.

TABLE 7

| View field ratio T'PH/T'ZH in horizontal direction | 0.49 to 8.58 |
| --- | --- |
| View field ratio T'PV/T'ZV in vertical direction | 0.43 to 7.67 |

From FIG. 9, the view field T' can also be obtained as shown in the aforementioned equation (4).

The focal length f of the imaging lens 2 can be obtained from the detection signal SDv, using the following equation (8):

$$f = 7 \text{ mm} + (42 \text{ mm} - 7 \text{ mm})(SDv - 1)/3 \qquad (8)$$

The focal length f, obtained by equation (8), is substituted into equation (4) and the horizontal and vertical sizes ZH and ZV of the image plane are substituted individually for T in equation (4), whereby the horizontal and vertical view fields T'ZH and T'ZV are obtained.

The focal length f of the imaging lens 3 can be obtained from the detection signal SDp, using the following equation (9):

$$f = 35 \text{ mm} + (105 \text{ mm} - 35 \text{ mm})(SDp - 1)/3 \quad (9)$$

By substituting the focal length f obtained by equation (9) into equation (4) and substituting the horizontal and vertical sizes PH and PV of the image plane individually for T in equation (4), the horizontal and vertical view fields T'PH and T'PV can be obtained.

Referring again to FIG. 23, the controller 27 generates image frame data Dm for displaying the image frame of the photographic camera at a location on the display screen corresponding to the horizontal and vertical view field ratios T'PH/T'ZH and T'PV/T'ZV.

Figure 30:
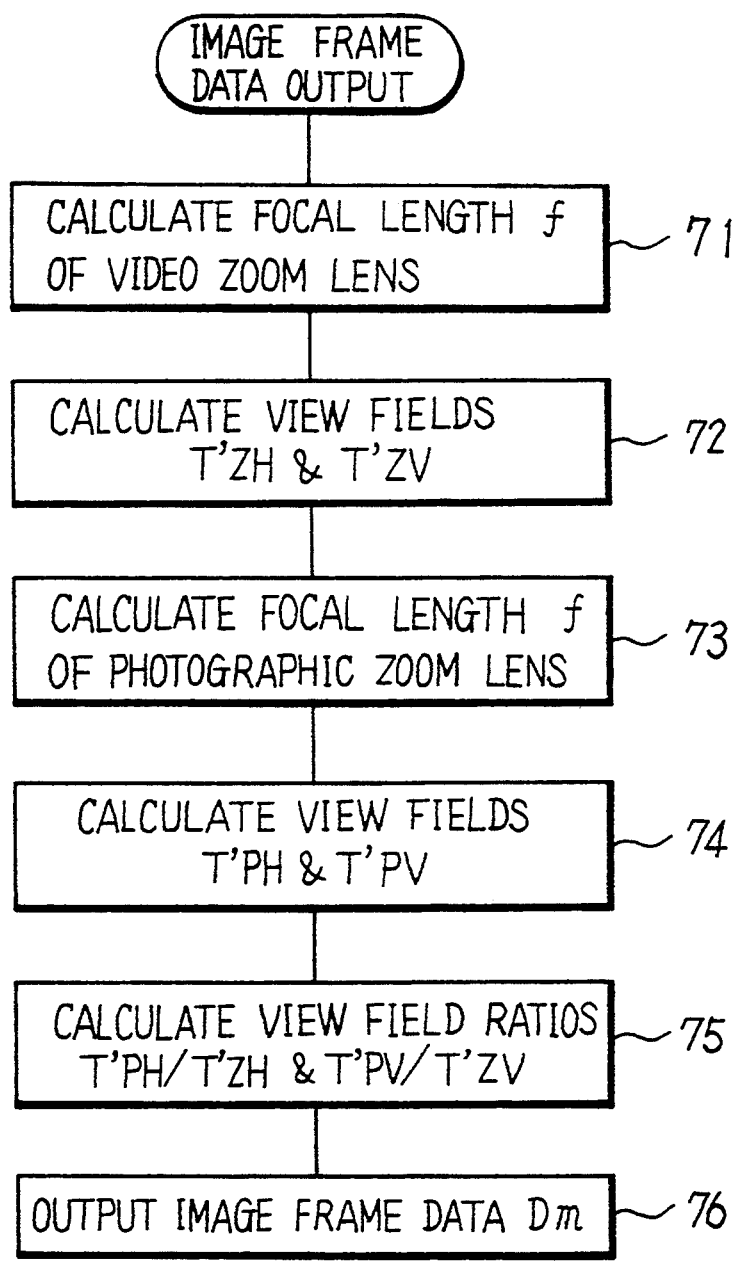
FIG. 30 is a flowchart showing an image frame data output process.

FIG. 30 is a flowchart showing an Image frame data output process executed by the controller 27. First, the focal length f of the imaging lens 2 is computed from the detection signal SDv, using equation (8) (Step 71).

Subsequently, the obtained Focal length f is substituted into equation (4), and the horizontal and vertical sizes ZH and ZV of the image plane are substituted individually for T in equation (4), to thereby obtain horizontal and vertical view fields T'ZH and T'ZV of the video camera (Step 72).

The focal length f of the imaging lens 3 is then calculated from the detection signal SDp, using equation (9) (Step 73).

Next, the thus-obtained focal length f is substituted into equation (4), and the horizontal and vertical sizes PH and PV of the image plane are substituted individually for T in equation (4), to thereby obtain horizontal and vertical view fields T'PH and T'PV of the photographic camera (Step 74).

Then, using the view fields T'ZH, T'ZV, T'PH and T'PV, ratios T'PH/T'ZH and T'PV/T'ZV of the view field of the photographic camera to that of the picked-up image in the horizontal and vertical directions are calculated (Step 75).

Next, image frame data Dm corresponding to the view field ratios T'PH/T'ZH and T'PV/T'ZV is output (Step 76). The image frame data Dm is used, e.g., for an image frame signal to indicate horizontal and vertical positions. In this case, the image frame data Dm is generated based on the horizontal and vertical display lengths of a picked-up image of fixed size such that the horizontal and vertical lengths of the image frame are substantially equal to the corresponding lengths determined by the view field ratios T'PH/T'θZH and T'PV/T'ZV. The horizontal length of the image frame is adjusted in units of pixel pitch, and the vertical length of same is adjusted in units of line pitch.

Referring again to FIG. 23, the image frame data Dm output from the controller 27 is supplied to a frame signal generating circuit 32. The frame signal generating circuit 32 is also supplied with synchronizing signals HD and VD from the synchronizing generator 16, and clock pulses CK1 from the timing generator 14. The frame signal generating circuit 32 outputs, e.g., a white peak level signal at times corresponding to the horizontal and vertical positions specified by the image frame data Dm, and this signal is supplied to an adder 31 as a frame signal Sm to be added to a monochromatic video signal SV.

Figure 31:
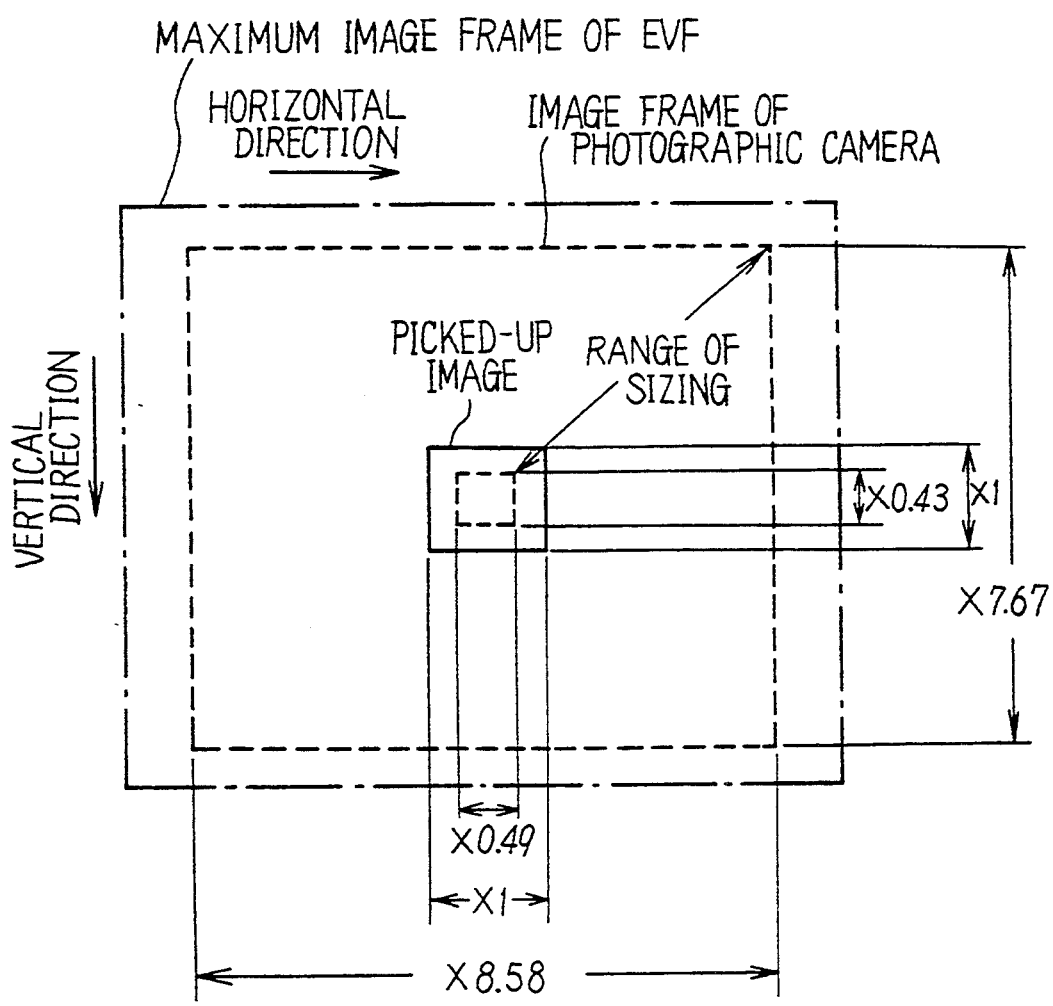
FIG. 31 is a diagram showing a display screen of an electronic viewfinder.

Accordingly, a picked-up image as shown in FIG. 31 and the image frame of the photographic camera are displayed on the screen of the small-sized CRT of the electronic viewfinder 30. In this case, while the size of the picked-up image is fixed, the image frame of the photographic camera is displayed at a location corresponding to the zooming power.

The size of the picked-up image is previously reduced to such an extent that the image frame of the photographic camera at the TELE end can be displayed, and the picked-up image is shown at the center of the screen of the small-sized CRT. A time base compressing process for such an image reduction is executed, e.g., by an encoder 28.

In this embodiment, since the image frame of the photographic camera is displayed on the screen of the small-sized CRT of the electronic viewfinder 30 on the basis of the picked-up image of fixed size, the view field of the photographic camera can be accurately recognized even if the zooming power of the video camera or that of the photographic camera is changed. Accordingly, the user can correctly release the shutter of the photographic camera while viewing the display screen of the electronic viewfinder 30.

Although, in this embodiment, the video camera and the photographic camera are integrally combined, this invention can be applied to a video camera to which a separate photographic camera is firmly fixed. In this case, input means for inputting, e.g., data representing the view fields T'PH and T'PV of the photographic camera (or data of the view angles θPH and θPV, or data representing the focal length f and the image plane size, PH and PV, of the film used) to the controller 27 may be provided, whereby the invention can be applied to any type of photographic cameras.

Further, in the above embodiment, the zoom buttons 5T and 5W (zoom switch 42) are used for changing the zooming power of both the imaging lenses 2 and 3, but separate operating buttons may be provided for the purpose.

Figure 32:
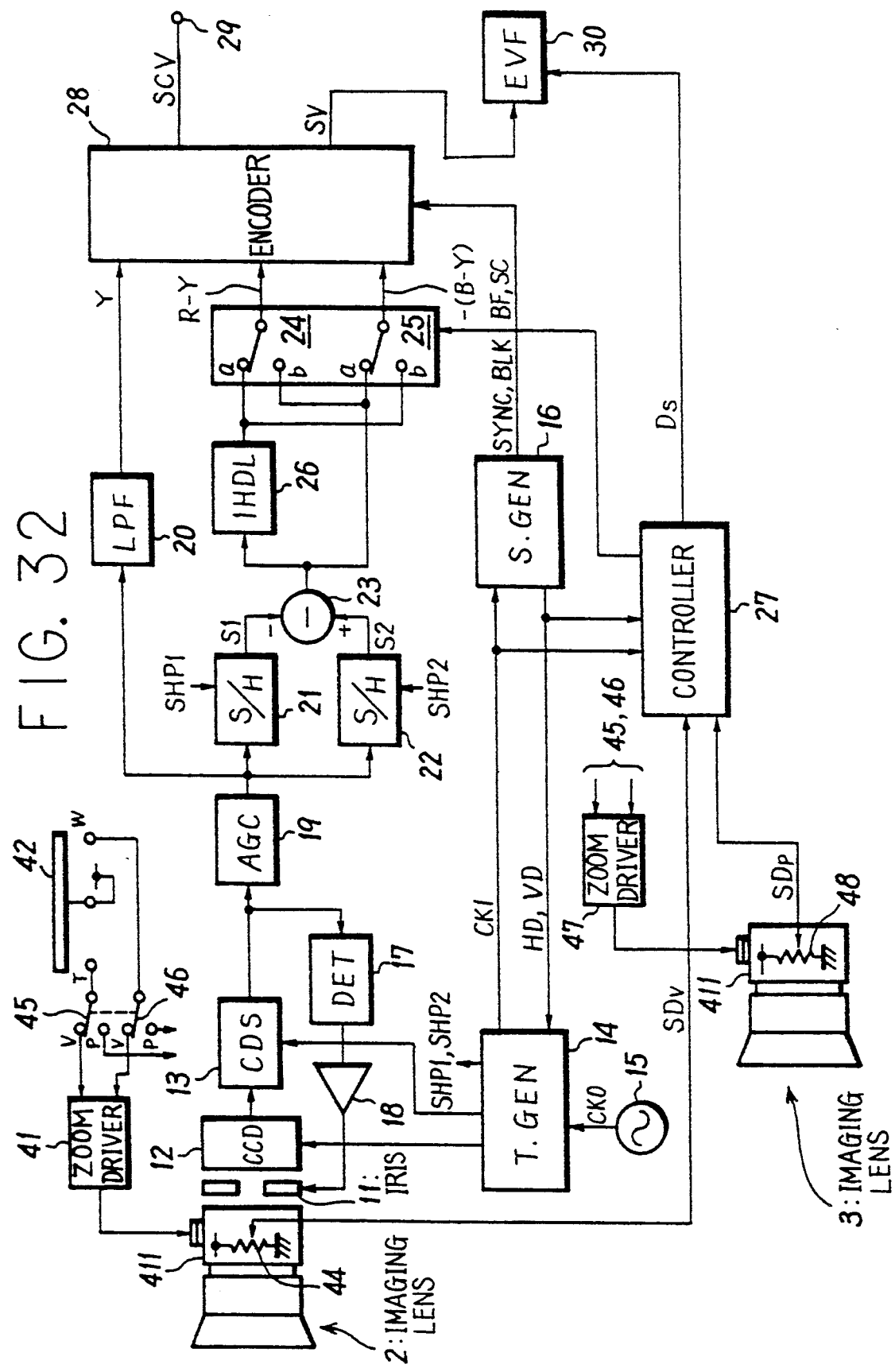
FIG. 32 is a block diagram showing the arrangement of another video camera section.

Still another embodiment of this invention will be now described with reference to the drawings. FIG. 32 is a block diagram showing the arrangement of a video camera section according to this embodiment. In FIG. 32, the same reference numerals are used to denote corresponding parts in FIGS. 2 and 23, and a detailed description thereof is omitted.

As shown in FIG. 32, a monochromatic video signal SV output from an encoder 28 is supplied to an electronic viewfinder 30, and a picked-up image is displayed at a small-sized CRT constituting the electronic viewfinder 30.

In this embodiment, a glass plate 303 having an image frame 302 of the photographic camera marked thereon (see FIG. 18) is arranged in close contact with a screen 301 of the small-sized CRT of the viewfinder 30. A picked-up image 304 is displayed on the basis of the image frame 302 of the photographic camera. In this case, since the view angles of the video camera and photographic camera, and thus the view fields thereof, change in accordance with the zooming power, the size of the picked-up image 304 is changed with a change in the zooming power. To change the display size, the ratio of the view fields of the picked-up image and photographic camera must be obtained.

From the aforementioned Table 6 showing the relationship between the view fields of the picked-up image and the photographic camera, horizontal and vertical view field ratios T'ZH/T'PH and T'ZV/T'PV can be summarized as shown in Table 8.

TABLE 8

| View field ratio T'ZH/T'PH in horizontal direction | 2.06 to 0.12 |
|---|---|
| View field ratio T'ZV/T'PV in vertical direction | 2.30 to 0.13 |

Referring again to FIG. 32, the controller 27 generates size data Ds for sizing the picked-up image 304 on the display screen 301 of the small-sized CRT of the viewfinder 30 in accordance with the horizontal and vertical view field ratios T'ZH/T'PH and T'ZV/T'PV.

Figure 33:
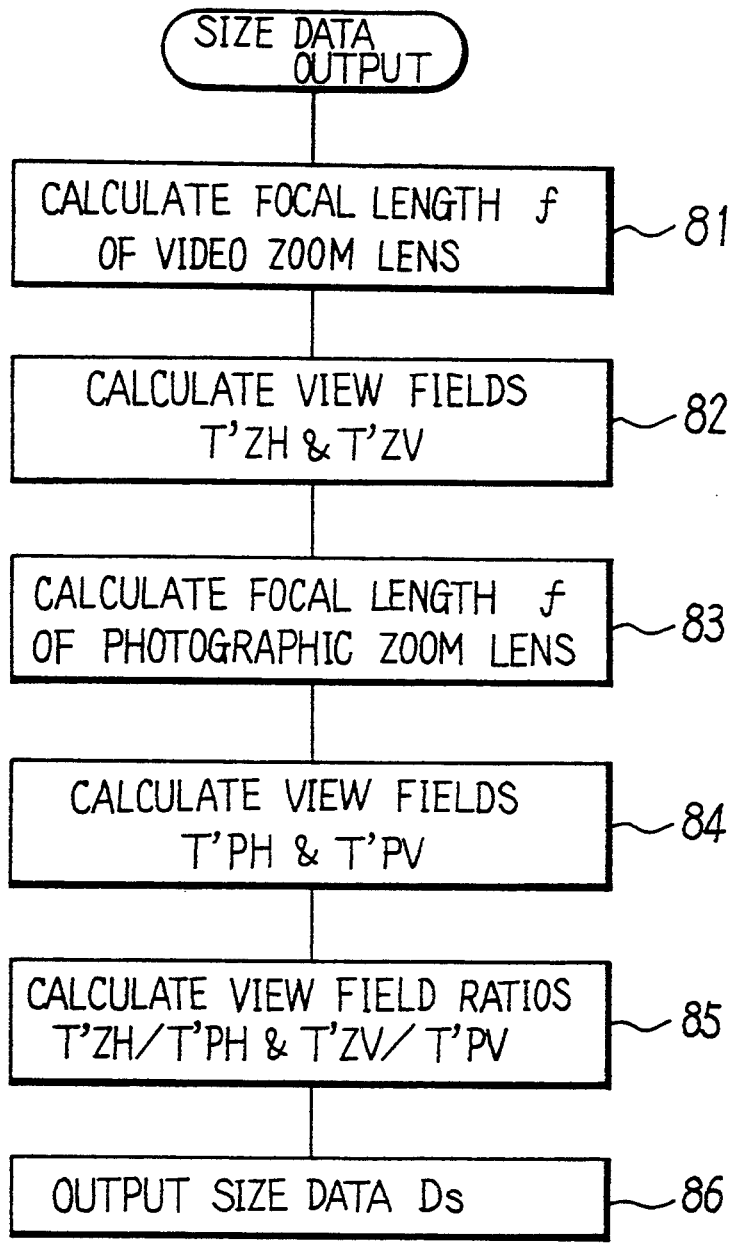
FIG. 33 is a flowchart showing a size data output process.

FIG. 33 is a flowchart showing a size data output process executed by the controller 27. First, the focal length f of the imaging lens 2 is calculated based on the detection signal SDv, using equation (8) (Step 81).

Then, the obtained focal length f is substituted into equation (4) and the horizontal and vertical sizes ZH and ZV of the image plane are substituted individually for T in equation (4), to thereby obtain the horizontal and vertical view fields T'ZH and T'ZV of the picked-up image (Step 82).

Next, the focal length f of the imaging lens 3 is calculated based on the detection signal SDp, using equation (9) (Step 83).

This focal length f is then substituted into equation (4) and the horizontal and vertical sizes PH and PV of the image plane are substituted individually for T in equation (4), to thereby obtain the horizontal and vertical view fields T'PH and T'PV of the photographic camera (Step 84).

Subsequently, using the view fields T'ZH, T'ZV, T'PH and T'PV, ratios T'ZH/T'PH and T'ZV/T'PV of the view field of the picked-up image to that of the photographic camera in the horizontal and vertical directions are computed (Step 85).

Then, size data Ds corresponding to the view field ratios T'ZH/T'PH and T'ZV/T'PV is output (Step 86). The size data Ds is used to control the angles of deflection in the horizontal and vertical directions of the small-sized CRT of the viewfinder 30.

The size data Ds output from the controller 27 is supplied to the viewfinder 30. The horizontal and vertical display sizes of the picked-up Image 304 are adjusted on the basis of the image frame 302 of the photographic camera such that they are equal to the corresponding sizes specified by the view field ratios T'ZH/T'PH and T'ZV/T'PV.

In this case, the vertical display size of the picked-up image is controlled by, e.g., changing the amplitude of a saw-tooth wave signal by a vertical drive circuit to thereby change the amplitude of a current flowing through a vertical deflection coil. On the other hand, the horizontal display size is controlled by changing the capacitance of a resonant capacitor of a horizontal output circuit and thereby changing the amplitude of a current flowing through a horizontal deflection coil.

If the angles of deflection in the horizontal and vertical directions are reduced, the scanning width of an electron beam In the CRT is shortened while the scanning period remains the same, thus increasing the energy at the fluorescent screen. Accordingly, measures are taken such that the contrast is lowered to thereby protect the fluorescent screen, though not described in detail.

Figure 34:
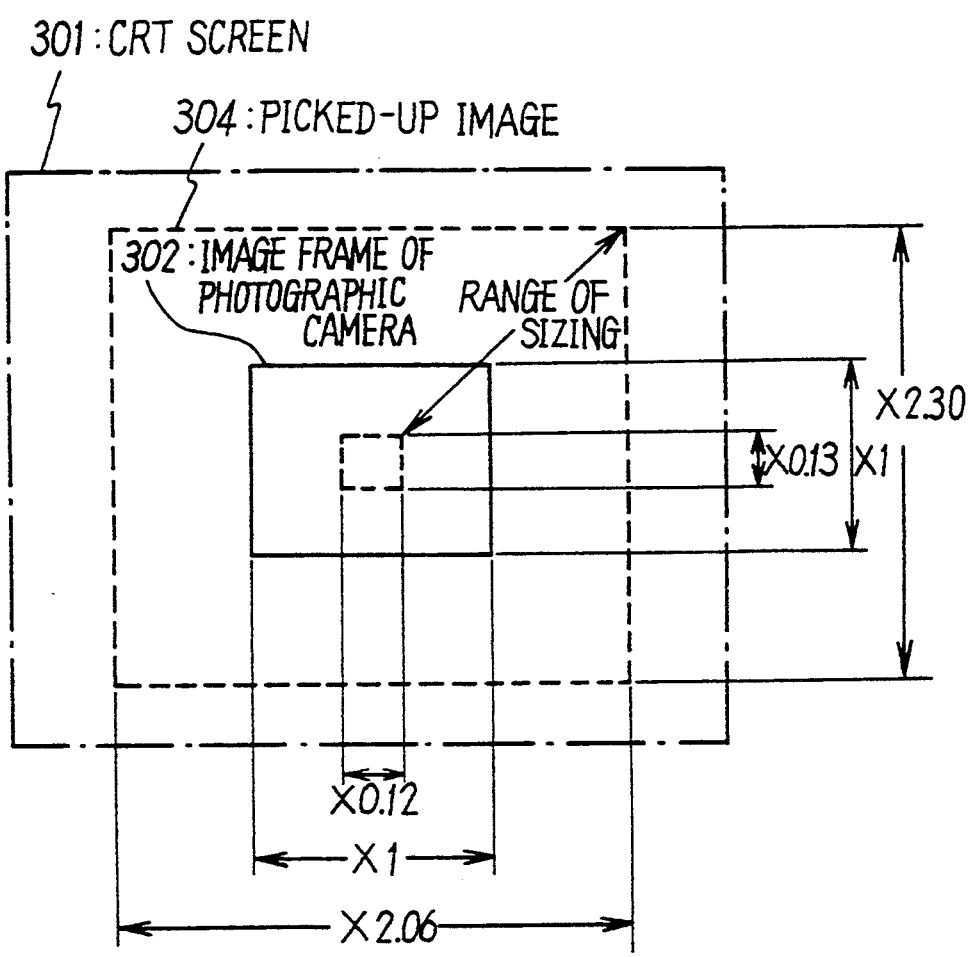
FIG. 34 is a diagram showing a display screen of an electronic viewfinder.

FIG. 34 shows the screen 301 of the small-sized CRT of the viewfinder 30, wherein, while the image frame 302 of the photographic camera is fixed in size, the picked-up image 304 is displayed using an area corresponding to the zooming power.

Thus, in this embodiment, since the picked-up image 304 is displayed on the screen 301 of the small-sized CRT of the viewfinder 30 on the basis of the fixed-size image frame 302 of the photographic camera, the view field of the photographic camera can be accurately recognized even if the zooming power is changed. Accordingly, the user can correctly release the shutter of the photographic camera while viewing the display screen of the viewfinder 30.

Although, in this embodiment, the video camera and the photographic camera are integrally combined, this invention can be applied to a video camera to which a separate photographic camera is firmly fixed. In this case, Input means for inputting, e.g., data representing the view fields T'PH and T'PV of the photographic camera (or data of the view angles $\theta$PH and $\theta$PV, or data representing the focal length f and the image plane size, PH and PV, of the film used) to the controller 27 may be provided, whereby the invention can be applied to any type of photographic camera.

Although, in the above embodiment, the zoom buttons 5T and 5W (zoom switch 42) are used for changing the zooming power of both the imaging lenses 2 and 3, separate operating buttons may be provided for the purpose.

Further, in the above embodiment, the glass plate 303 is disposed In close contact with the screen 301 of the CRT to show the image frame 302 of the photographic camera. Alternatively, the image frame 302 may be marked directly on the screen 301.

Figure 35:
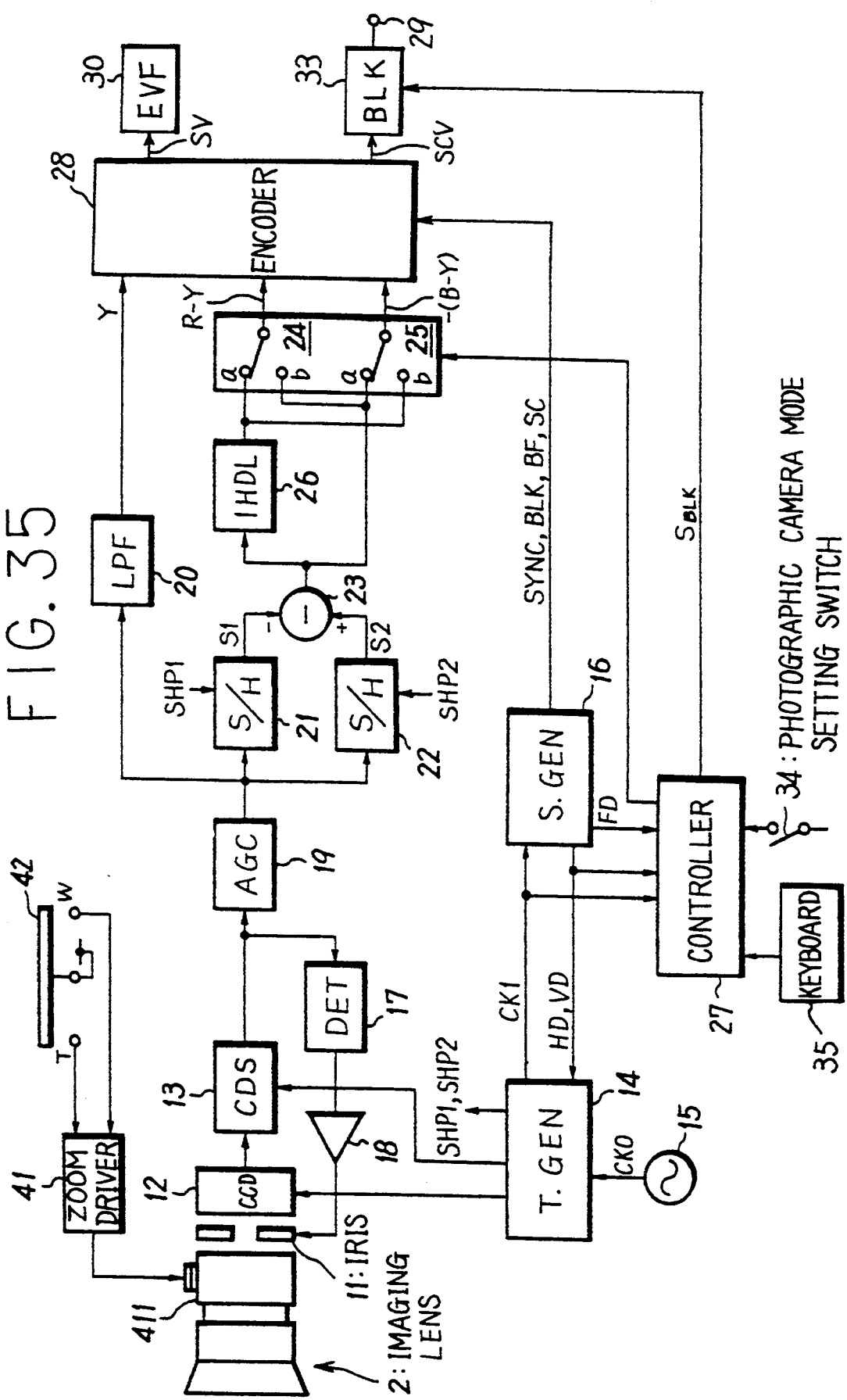
FIG. 35 is a block diagram showing the arrangement of a video camera section.

A further embodiment of this invention will be described with reference to the drawings. FIG. 35 is a block diagram showing the arrangement of a video camera section according to this embodiment. In FIG. 35, the same reference numerals are used to denote corresponding parts in FIG. 2, and a detailed description thereof is omitted.

In this embodiment, a color video signal SCV output from an encoder 28 is supplied to an output terminal 29 through a blanking circuit 33.

A monochromatic video signal SV output from the encoder 28 is supplied to an electronic viewfinder 30, and a picked-up image is displayed at a small-sized CRT.

The operation of the blanking circuit 33 is controlled by a controller 27, and a switch 34 for setting a photographic camera mode is connected to the controller 27.

When the switch 34 is turned on to set the photographic camera mode, the controller 27 generates a blanking signal SBLK and supplies same to the blanking circuit 33. In this case, a blanking zone is set such that the height-to-width ratio of a picked-up image is substantially identical with that of an image plane of a film in the photographic camera. The size data representing the image plane size of the film is input to the controller 27 through an operation of a keyboard 35.

Figure 36:
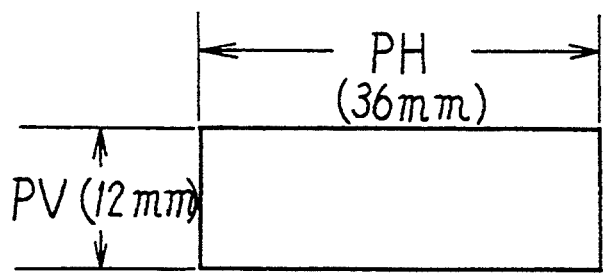
FIG. 36 is a diagram showing an image plane size of a film for photographing panoramic pictures.

In the case wherein a ½-inch type imaging device 12 is used, the image plane thereof has a horizontal size ZH of 4.9 mm and a vertical size ZV of 3.69 mm (see FIG. 10), and the image plane of, e.g., a film (35 mm film) for panoramic pictures has a horizontal size PH of 36 mm and a vertical size PV of 12 mm (see FIG. 36). Thus, the height-to-width ratio of the image plane of the film for panoramic pictures is 1:3.

Figure 37:
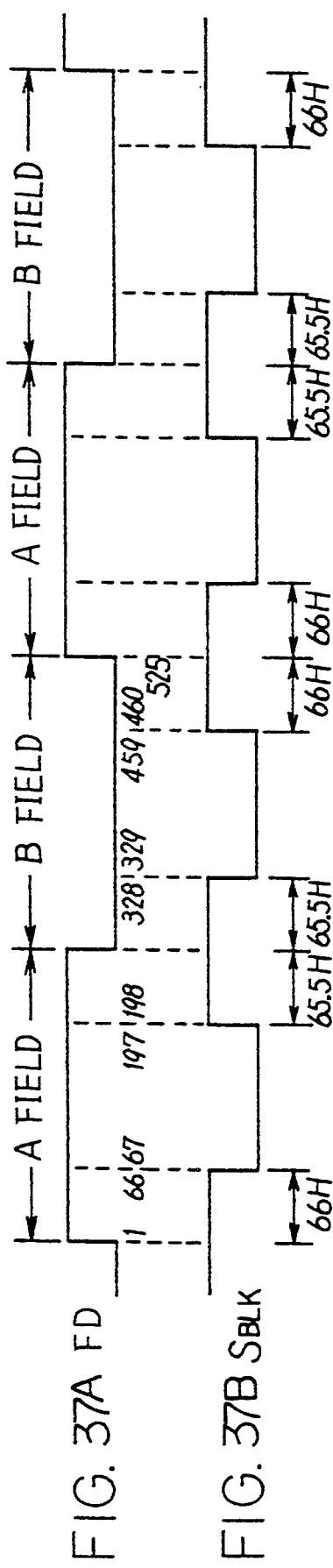
FIGS. 37A-B are a chart showing a blanking signal pattern.

FIGS. 37A-B shown an example of a pattern of the blanking signal SBLK. The blanking signal SBLK is generated in a manner timed with a field pulse FD (see FIG. 37A).

In each A (odd) field, the blanking period starts at the (66 H)th period (H denotes the horizontal period) from the beginning of the field and ends at the (65.5 H)th period from the end of same, and in a B (even) field, the blanking period starts at the (65.5 H)th period from the beginning of the field and ends at the (66 H)th period from the end of same (see the high-level period in of FIG. 37B).

Figure 38:
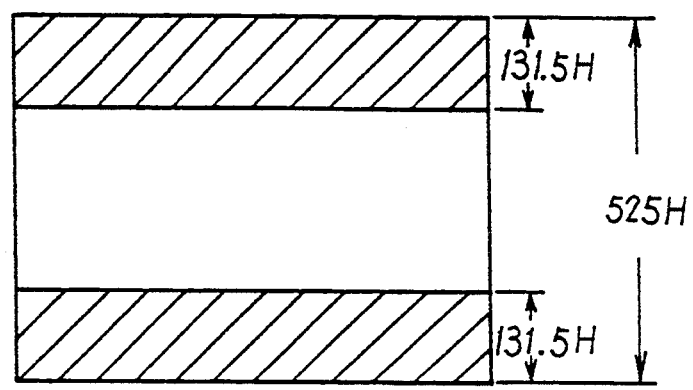
FIG. 38 is a diagram showing a blanking zone.

The blanking circuit 33 is driven during the blanking period specified by the blanking signal SBLK, during which period no color video signal SCV is supplied to the output terminal 29. Accordingly, an image derived from the color video signal SCV at the output terminal 29 is blanked by about a ¼ area from each of upper and lower edges thereof (corresponding to 131.5 lines each), as indicated by shades in FIG. 38. In the NTSC system, the height-to-width ratio is originally 3:4, and thus, the height-to-width ratio of the picked-up image after the blanking is 3/2:4, almost corresponding to the height-to-width ratio (1:3) of the image plane of the film for panoramic pictures.

In the present embodiment, when the switch 34 is turned on and thus the photographic camera mode is set, the blanking zone is set such that the height-to-width ratio of the picked-up image corresponds to that of the image plane of the film in the photographic camera, and blanking of the color video signal SCV is carried out by the blanking circuit 33. Accordingly, when comparing a photograph with the reproduced image during a reproduction of the video signal on a VTR, their compatibility is ensured because the height-to-width ratios correspond to each other.

The above embodiment is described with reference to a panoramic picture. Also when the film used has a different image plane size, size data is input through the keyboard 3 to set a suitable blanking zone by means of the controller 27, whereby the height-to-width ratio of the picked-up image derived from the video signal after the blanking can be made corresponding to that of the image plane of the film.

Although, in this embodiment, size data is input through the keyboard 35, an input operation of the size data may be omitted where the film used has a fixed image plane size. Further, instead of manually inputting size data through the keyboard 35, detecting means for detecting the image plane size of the film used may be provided so that the detected data is automatically supplied from the detecting means to the controller.

Although, in this embodiment, the video camera and the photographic camera are integrally combined, this invention can be applied to a video camera to which a separate photographic camera is firmly fixed.

Furthermore, in the above embodiment, this invention is applied to a video camera for obtaining a color video signal according to the NTSC system, but the invention can of course be applied to a video camera for obtaining a color video signal according to a different system.

Figure 39:
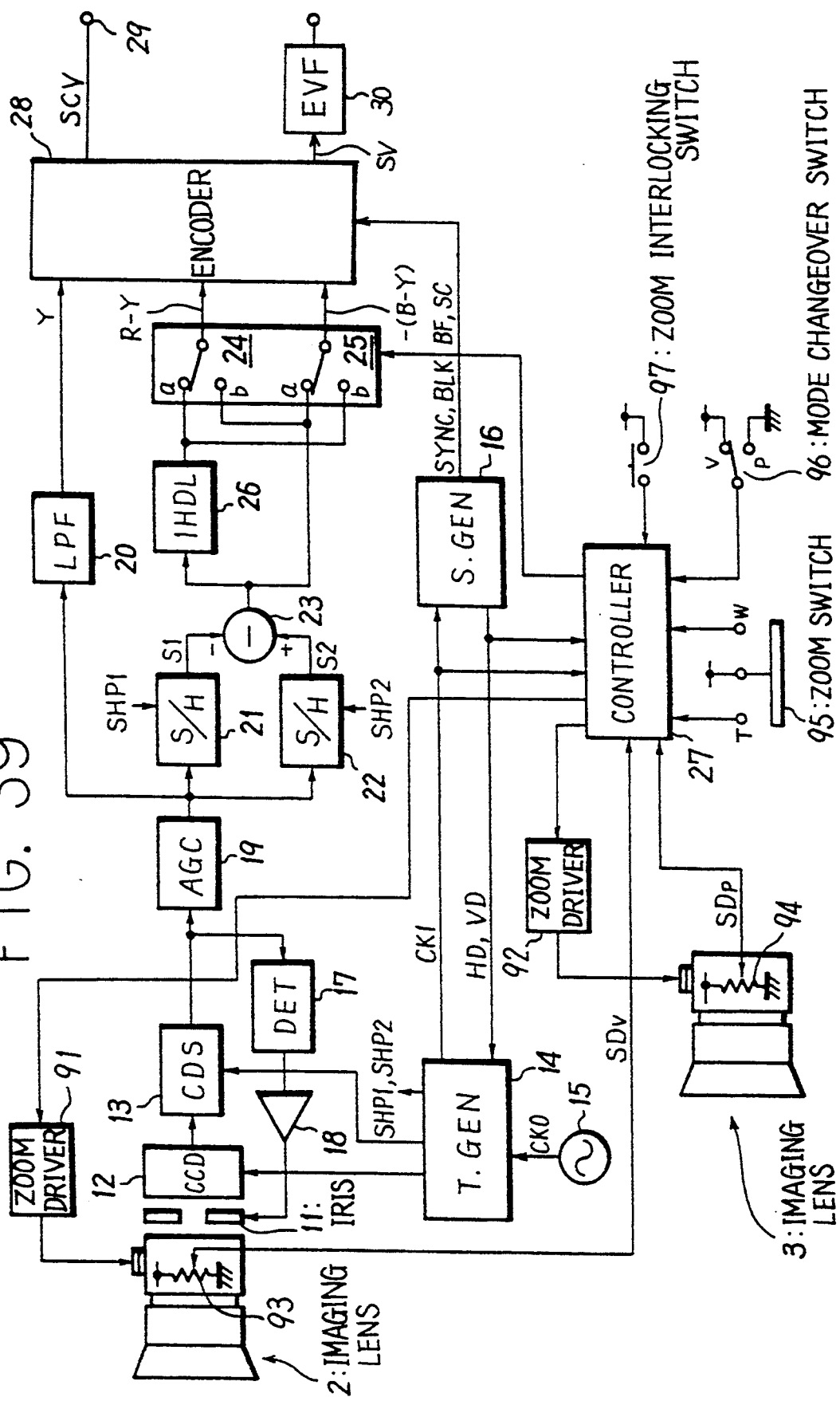
FIG. 39 is a diagram showing the arrangement of a video camera section.

Still another embodiment of this invention will be described with reference to the drawings. FIG. 39 is a block diagram showing the arrangement of a video camera section according to this embodiment. 39, the same reference numerals are used to denote corresponding parts in FIGS. 2 and 23, and a detailed description thereof is omitted.

In this embodiment, a monochromatic video signal SV output from an encoder 28 is supplied to an electronic viewfinder 30, and a picked-up image is displayed at a small-sized CRT constituting the electronic viewfinder 30.

The zooming powers of imaging lenses 2 and 3 are controlled by a controller 27 through zoom drivers 91 and 92, respectively.

A zoom switch 95 is connected to the controller 27, and when the operating button 5T or 5W of the cabinet 1 is pressed, the switch 95 is connected to a terminal T or W. The controller 27 is further connected to a mode changeover switch 96 for switching between a video mode and a photo mode, and a zoom interlocking switch 97 for interlocking zooming operations of the video camera and the photographic camera.

A potentiometer 93 is arranged at a zoom adjusting section of the imaging lens 2 in such a manner that a voltage corresponding to the zooming power appears at a movable terminal thereof, and the voltage is applied to the controller 27 as a detection signal SDv. As shown in FIG. 25, the detection signal SDv is set such that it is 1 V at tile WIDE end (f=7 mm) and 4 V at the TELE end (f=42 mm).

Another potentiometer 94 is arranged at a zoom adjusting section of the imaging lens 3 in such a manner that a voltage corresponding to the zooming power appears at a movable terminal thereof, and the voltage is applied to the controller 27 as a detection signal SDp. As shown in FIG. 27, the detection signal SDp is set such that it is 1 V at the WIDE end (f=35 mm) and 4 V at the TELE end (f=105 mm).

The controller 27 obtains view angles of the imaging lenses 2 and 3 based on the detection signals SDv and SDp and in accordance with the equation mentioned later.

When the zoom interlocking switch 97 is turned off, the zooming powers of the imaging lenses 2 and 3 are adjusted in the following manner.

In the video mode wherein the mode changeover switch 96 is connected to a terminal V, the zooming power of the imaging lens 2 is adjusted, and in the photo mode wherein the mode changeover switch 96 is connected to a terminal P, the zooming power of the imaging lens 3 is adjusted. When the zoom switch 95 is connected to the terminal T or W, the zooming power is changed in the TELE or WIDE direction.

When the zoom interlocking switch 97 is turned on, the zooming powers of the imaging lenses 2 and 3 are adjusted in an interlocked manner, with tile view angles of the video camera and photographic camera coinciding with each other.

The relationship between the view angles of the imaging lenses 2 and 3, which each comprise a zoom lens, is shown in Table 5 mentioned above.

In this embodiment, when the zoom interlocking switch 97 is turned on, first, horizontal view angles $\theta ZH$ and $\theta PH$ of the imaging lenses 2 and 3 are both brought to 38.6°: (Refer to the initial position as shown in FIG. 40A). Thereafter, when the zoom switch 95 is connected to the terminal T or W, the zooming powers are adjusted in the TELE or WIDE direction in an interlocked manner, with the horizontal view angles $\theta ZH$ and $\theta PH$ coinciding with each other. In this case, the zooming powers are adjusted in a range of the view angles θZH and θPH of from 19.5° to 38.6° (as indicated by the shaded region of FIG. 40A).

Thus, in this embodiment, when the zoom interlocking switch 97 is on, the zooming powers of the imaging lenses 2 and 3 are adjusted in an interlocked manner, with the view angles θZH and θPH coinciding with each other. Accordingly, the horizontal view field of the image picked up by the video camera and displayed at the electronic viewfinder 30 always coincides with that of the photographic camera even if the zooming power is changed, whereby the horizontal view field of the photographic camera can be accurately recognized and the shutter button can be correctly operated.

In the above example, the interlocked zoom adjustment is carried out with the horizontal view angles θZH and θPH coinciding with each other, but the zoom adjustment may be carried out in an interlocked manner with the vertical view angles θZV and θPV being made to coincide with each other. In this case, when the zoom interlocking switch 97 is turned on, zoom adjustment is first carried out such that the vertical view angles θZV and θPV of the imaging lenses 2 and 3 become equal to 29.5° (see the initial position shown in FIG. 41A). Thereafter, when the zoom switch 95 is connected to the terminal T or W, the zooming powers are adjusted in the TELE or WIDE direction in an interlocked manner, with the vertical view angles θZV and θPV coinciding with each other. In this case, the zooming powers are adjusted in a range of the view angles θZV and θPV of from 13° to 29.5° (indicated by the shaded region of FIG. 41A).

Further, in the above embodiment, the interlocked zoom adjustment is carried out with the view angles coinciding with each other, but it may be carried out with the view angle ratio maintained at a fixed value, instead of making the view angles coincide with each other.

In the case wherein the interlocked zoom adjustment is carried out based on the horizontal view angle ratio at the WIDE end, when the zoom interlocking switch 97 is turned on, the zoom adjustment is first carried out such that the horizontal view angles θZH and θPH of the imaging lenses 2 and 3 become equal to 38.6° and 54.4°, respectively. (See the initial position shown FIG. 40B). Thereafter, when the zoom switch 95 is connected to the terminal T or W, the interlocked zoom adjustment is carried out in the TELE or WIDE direction while maintaining the horizontal view angle ratio at 38.6/54.4. In this case, the zoom adjustment is effected in a range of 13.8° to 38.6° for the view angle θZH of the imaging lens 2 and in a range of 19.5° to 54.4° for the view angle θPH of the imaging lens 3 (as indicated by the shaded region of FIG. 40B).

In the case wherein the interlocked zoom adjustment is carried out based on the vertical view angle ratio at the WIDE end, when the zoom interlocking switch 97 is turned on, the zoom adjustment is first carried out such that the vertical view angles θZH and θPH of the imaging lenses 2 and 3 become equal to 29.5° and 37.8°, respectively. (See the initial position shown in in FIG. 41B). Thereafter, when the zoom switch 95 is connected to the terminal T or W, the interlocked zoom adjustment is carried out in the TELE or WIDE direction while maintaining the vertical view angle ratio at 29.5/37.8. In this case, the zoom adjustment is effected in a range of 10.1° to 29.5° for the view angle θZV of the imaging lens 2 and in a range of 13° to 37.8° for the view angle θPV of the imaging lens 3 (indicated by the shaded region of FIG. 41B).

Instead of the view angle ratio at the WIDE end, the view angle ratio at the TELE end or another view angle ratio may be set. When the view angle ratio is constant while the view angles differ from each other, the picked-up image displayed at the electronic viewfinder 30 does not coincide with the view field of the photographic camera, but the relationship therebetween is constant. Therefore, the view field of the photographic camera can be accurately recognized even if the zooming power is changed, thereby permitting a correct shutter operation.

When the view angles do not coincide as mentioned above, the picked-up image does not coincide with the view field of the photographic camera. In this case, by displaying the image frame of the photographic camera at the electronic viewfinder 30, it is possible to clearly indicate the view field of the photographic camera.

To display the image frame of the photographic camera, the ratio of the view fields of the photographic camera and picked-up image must be obtained. The horizontal and vertical view field ratios T'PH/T'ZH and T'PV/T'ZV are shown in the aforementioned Table 7.

Figure 42:
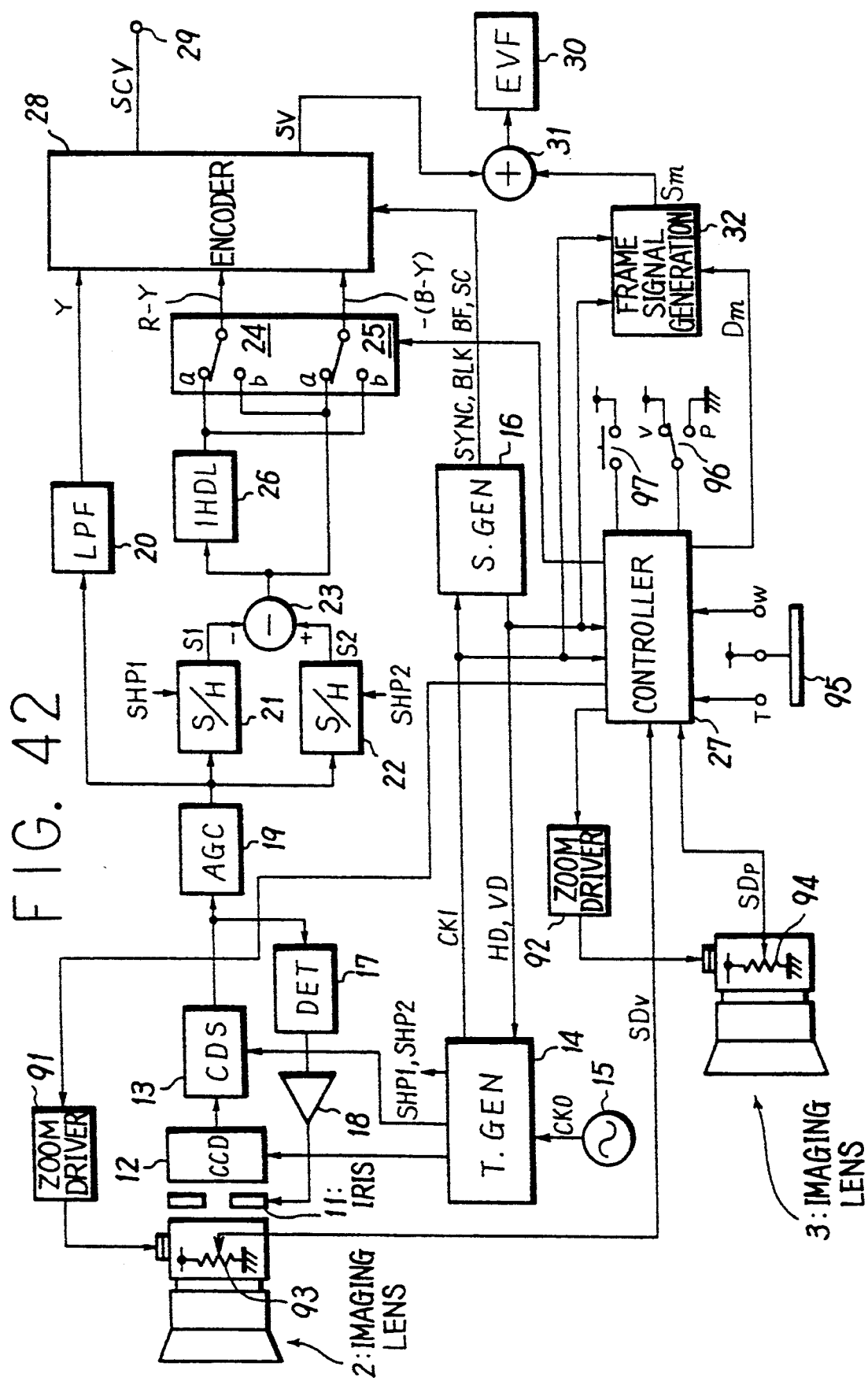
FIG. 42 is a block diagram showing the arrangement of a video camera section.

FIG. 42 shows an arrangement in which the image frame of the photographic camera is displayed at the electronic viewfinder 30. In FIG. 42, the same reference numerals are used to represent corresponding parts in FIGS. 39 and 23.

As shown in FIG. 42, the controller 27 generates image frame data Dm for displaying the image frame of the photographic camera at a location on the screen corresponding to the horizontal and vertical view field ratios T'PH/T'θZH and T'PV/T'ZV. The image frame data Dm is generated by the process shown in the flowchart of FIG. 30, as in the embodiment of FIG. 23.

The image frame data Dm output from the controller 27 is supplied to a frame signal generating circuit 32, which then outputs a signal, e.g., a white peak level signal at times corresponding to the horizontal and vertical positions specified by the image frame data Dm, and this signal is supplied to an adder 31 as a frame signal Sm to be added to a monochromatic video signal SV.

Accordingly, as in the embodiment of FIG. 23, the picked-up image and the image frame of the photographic camera are displayed on the screen of the small-sized CRT of the electronic viewfinder 30, as shown in FIG. 31.

Although, in the above example, the video camera and the photographic camera are integrally combined, this invention can be applied to a video camera to which a separate photographic camera is firmly fixed. Further, in the above example, the zoom buttons 5T and 5W (zoom switch 95) are used for changing the zooming power of both the imaging lenses 2 and 3, but separate operating buttons may be provided for the purpose.

Figure 43:
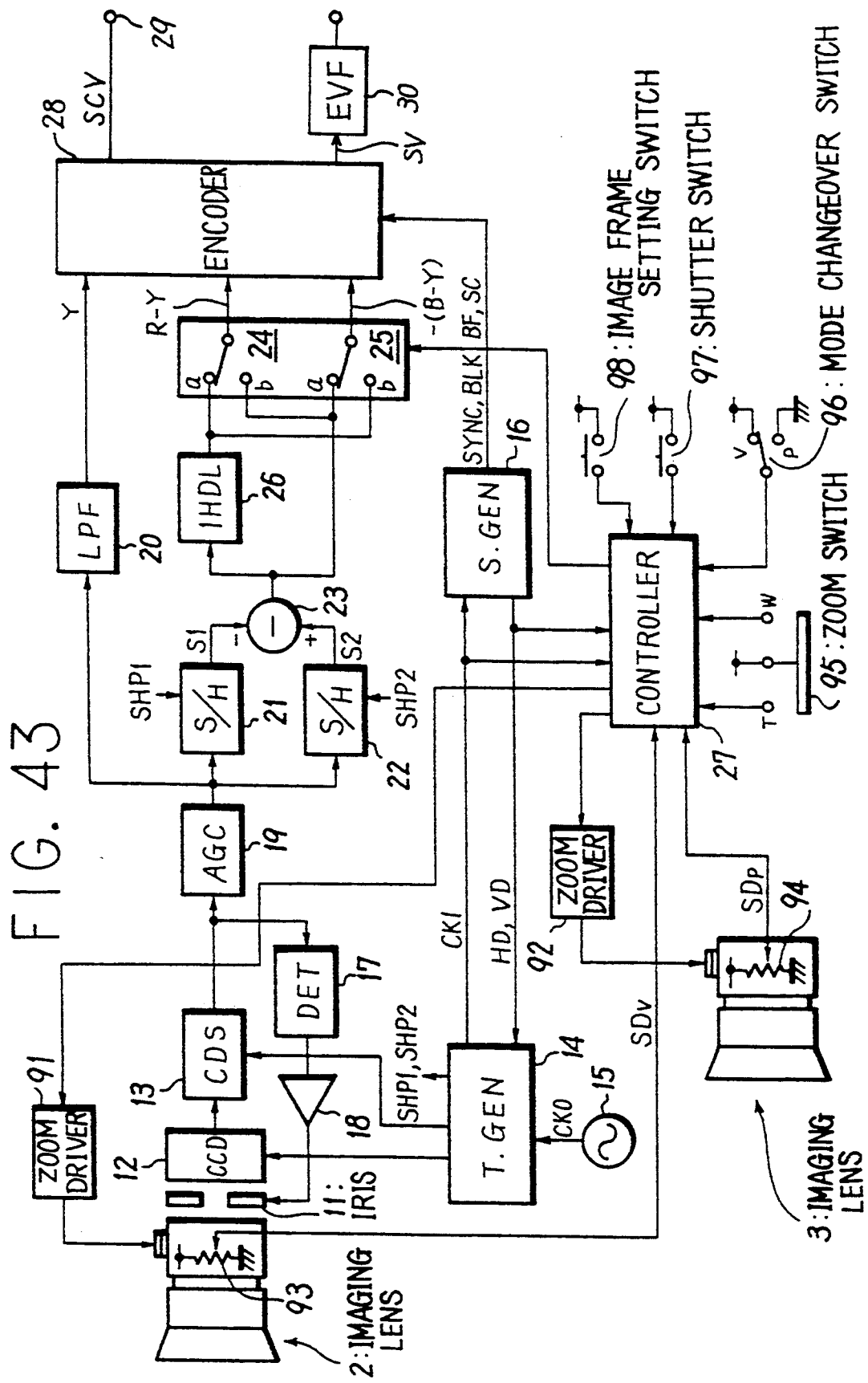
FIG. 43 is a block diagram showing the arrangement of another video camera section.

A still further embodiment of this invention will be described with reference to the drawings. FIG. 43 is a block diagram showing the arrangement of a video camera section according to this embodiment. In FIG. 43, the same reference numerals are used to denote corresponding parts in FIG. 39, and a detailed description thereof is omitted.

In this embodiment, the adjustment of the zooming powers of imaging lenses 2 and 3 is carried out by a controller 27 through zoom drivers 91 and 92, respectively, as in the embodiment of FIG. 39. The controller 27 obtains view angles from detection signals SDv and SDp supplied from potentiometers 93 and 94 for management of the view angles.

The controller 27 is connected to a zoom switch 95, a mode changeover switch 96, a shutter switch 97, and an image frame setting switch 98.

The zoom adjustment of the imaging lenses 2 and 3 is carried out in the following manner. In a video mode wherein the mode changeover switch 96 is connected to a terminal V, the zoom adjustment of the imaging lens 2 is carried out, and in a photo mode wherein the mode changeover switch 96 is connected to a terminal P, the zoom adjustment of the imaging lens 3 is carried out. When the zoom switch 95 is connected to the terminal T or W, the zooming power is adjusted in the TELE or WIDE direction.

In this embodiment, when the image frame setting switch 98 is turned on, the zoom adjustment of one of the imaging lenses 2 and 3 is carried out in accordance with the state of the mode changeover switch 96 such that the view angles of the lenses 2 and 3 coincide with each other. Namely, in the video mode wherein the mode changeover switch 96 is connected to the V side, zoom adjustment of the imaging lens 3 of the photographic camera section is carried out such that the view angle of the imaging lens 3 coincides with that of the imaging lens 2. On the other hand, in the photo mode wherein the mode changeover switch 96 is connected to the P side, zoom adjustment of the imaging lens 2 of the video camera section is carried out such that the view angle of the imaging lens 2 coincides with that of the imaging lens 3. In situations where it is not possible to make the two view angles equal to each other due to a difference in the view angle range, one view angle is brought to a value as close to the other as possible.

The relationship between the view angles of the imaging lenses 2 and 3, which each comprise a zoom lens, is shown in Table 5 mentioned above.

In this embodiment, when the mode changeover switch 96 is connected to the V side to thereby set the video mode and the image frame setting switch 98 is turned on, the horizontal view angle $\theta PH$ of the imaging lens 3 is controlled in the following manner.

When the horizontal view angle $\theta ZH$ of the imaging lens 2 falls within a range of 19.5° to 38.6°, the view angle $\theta PH$ is controlled such that it coincides with the view angle $\theta ZH$, and when the view angle $\theta ZH$ of the imaging lens 2 falls within a range of 6.7° to 19.5°, the view angle $\theta PH$ is controlled to 19.5°. (See FIG. 44A.)

Figure 44A:
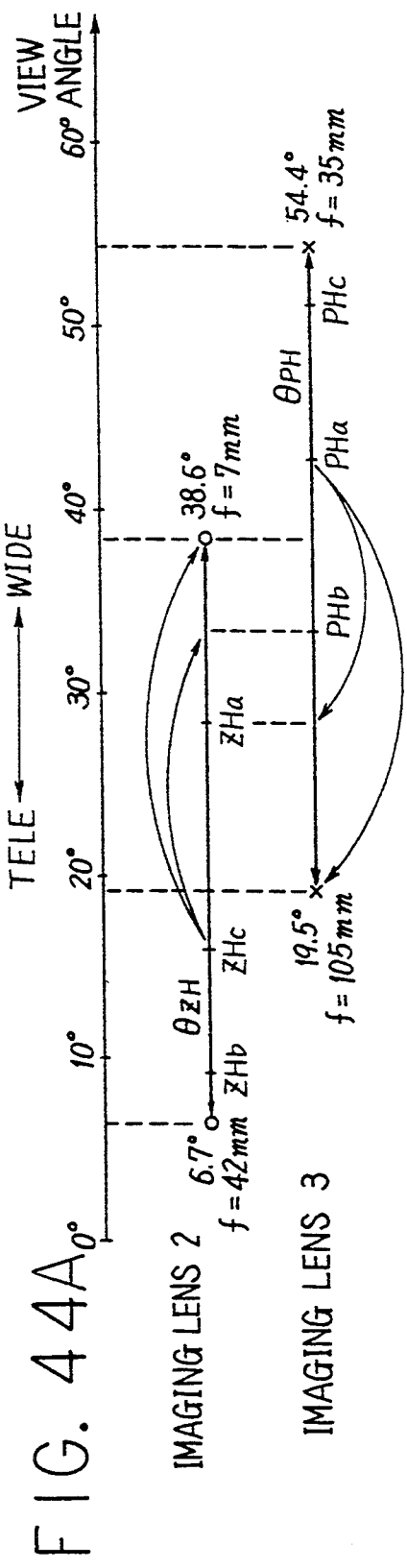
FIGS. 44A-B is a diagram illustrating an image frame setting operation.

For example, if the image frame setting switch 98 is turned on when the view angle $\theta ZH$ of the imaging lens 2 is ZHa and the view angle $\theta PH$ of the imaging lens 3 is PHa, as shown in FIG. 44A, the zooming power of the imaging lens 3 is adjusted in the TELE direction such that the view angle $\theta PH$ becomes equal to ZHa. If the image frame setting switch 98 is turned on when the view angle $\theta ZH$ of the imaging lens 2 is ZHb and the view angle $\theta PH$ of the imaging lens 3 is PHb, as shown in FIG. 44A, the zooming power of the imaging lens 3 is adjusted in the TELE direction such that the view angle $\theta PH$ becomes equal to 19.5°.

When the mode changeover switch 96 is connected to the P side to thereby set the photo mode and the image frame setting switch 98 is turned on, the horizontal view angle $\theta ZH$ of the imaging lens 2 is controlled in the following manner.

Namely, when the horizontal view angle $\theta PH$ of the imaging lens 3 falls within a range of 19.5° to 38.6°, the view angle $\theta ZH$ is controlled such that it coincides with the view angle $\theta PH$, and when the view angle $\theta PH$ of the imaging lens 3 falls within a range of 38.6° to 54.4°, the view angle $\theta ZH$ is controlled to 38.6°. (See FIG. 44A).

For example, when the image frame setting switch 98 is turned on while the view angle $\theta PH$ of the imaging lens 3 is PHb and the view angle $\theta ZH$ of the imaging lens 2 is ZHc, as shown in FIG. 44A, the zooming power of the imaging lens 2 is adjusted in the WIDE direction such that the view angle $\theta ZH$ becomes equal to PHb. When the image frame setting switch 98 is turned on while the view angle $\theta PH$ of the imaging lens 3 is PHc and the view angle $\theta ZH$ of the imaging lens 2 is ZHc, as shown in FIG. 44A, the zooming power of the imaging lens 2 is adjusted in the WIDE direction such that the view angle $\theta ZH$ becomes equal to 38.6°.

Thus, in this embodiment, when the image frame setting switch 98 is on, the zooming powers of the imaging lenses 2 and 3 are adjusted in such a way that the horizontal view angles $\theta ZH$ and $\theta PH$ of the lenses are as close to each other as possible. Accordingly, the horizontal view field of the image picked up by the video camera and displayed at the electronic viewfinder 30 coincides with or is close to that of the photographic camera, whereby the horizontal view field of the photographic camera can be accurately recognized and the shutter operation of the photographic camera can be correctly carried out through the shutter switch 97.

In the above embodiment, when the image frame setting switch 98 is on, zoom adjustment is carried out in such a manner that the horizontal view angles $\theta ZH$ and $\theta PH$ coincide with or are close to each other, but the zoom adjustment may be carried out such that the vertical view angles $\theta ZV$ and $\theta PV$ coincide with or are close to each other.

In this case, when the image frame setting switch 98 is turned on while the mode changeover switch 96 is connected to the V side and thus the video mode is set, the vertical view angle $\theta PV$ of the imaging lens 3 is controlled as follows. When the vertical view angle $\theta ZV$ of the imaging lens 2 falls within a range of 13° to 29.5°, the view angle $\theta PV$ is controlled such that it coincides with the vertical view angle $\theta ZV$, and when the view angle $\theta ZV$ of the imaging lens 2 is in the range 5° to 13°, the view angle $\theta PV$ is controlled to 13°. (See FIG. 45A.)

In the case wherein the image frame setting switch 98 is turned on while the mode changeover switch 96 is connected to the P side to thereby set the photo mode, the vertical view angle $\theta ZV$ of the imaging lens 2 is controlled in the following manner. When the vertical view angle $\theta PV$ of the imaging lens 3 falls within a range of 13° to 29.5°, the view angle $\theta ZV$ is controlled such that it coincides with the vertical view angle $\theta PV$, and when the view angle $\theta PV$ of the imaging lens 3 is in the range 29.5° to 37.8°, the view angle $\theta ZV$ is controlled to 29.5°. (See FIG. 45A.)

Although in the above embodiment, the zoom adjustment is carried out such that the view angles coincide with each other, it may be carried out such that the view angle ratio is controlled to a predetermined value.

In the following, a zoom adjustment based on the horizontal view angle ratio at the WIDE end will be described.

Figure 44B:
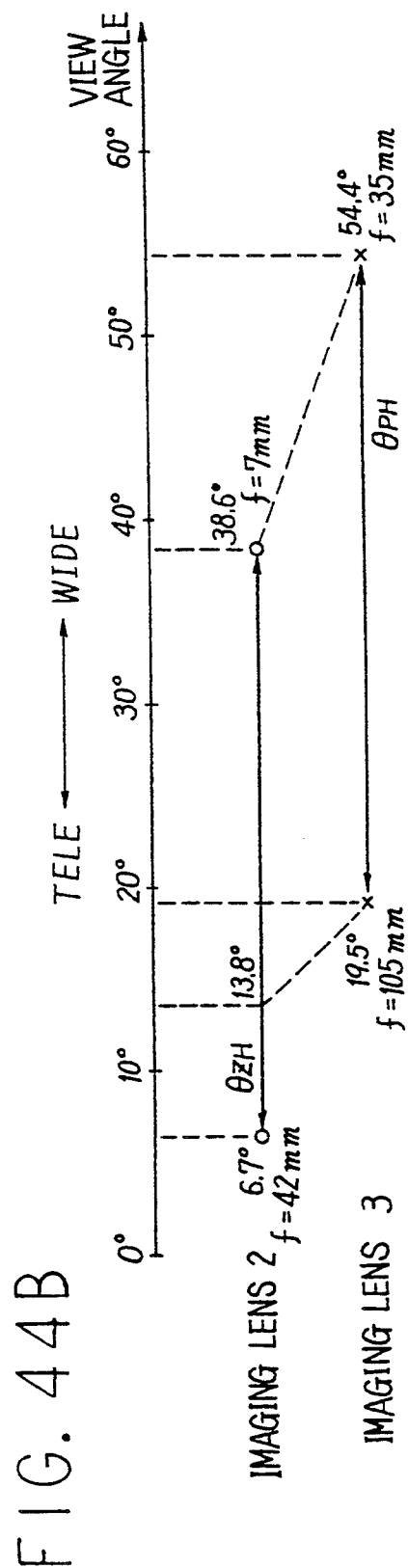

When the image frame setting switch 98 is turned on while the mode changeover switch 96 is connected to the V side and thus the video mode is set, the horizontal view angle $\theta PH$ of the imaging lens 3 is controlled as follows. When the horizontal view angle $\theta ZH$ of the imaging lens 2 falls within a range of 13.8° to 38.6°, the view angle $\theta PH$ is controlled such that it coincides with the product of the view angle $\theta ZH$ and 54.4/38.6, and when the view angle $\theta ZH$ of the imaging lens 2 is in the range 6.7° to 13.8°, the view angle $\theta PH$ is controlled to 19.5°. (See FIG. 44B.)

In the case wherein the image frame setting switch 98 is turned on while the mode changeover switch 96 is connected to the P side to set the photo mode, the horizontal view angle $\theta ZH$ of tile imaging lens 2 is controlled in the following manner. When the horizontal view angle $\theta PH$ of the imaging lens 3 falls within a range of 19.5° to 54.4°, the view angle $\theta ZH$ is controlled such that it coincides with the product of the view angle $\theta PH$ and 38.6/54.4. (See FIG. 44B.)

Next, a zoom adjustment based on the vertical view angle ratio at the WIDE end will be described.

When the image frame setting switch 98 is turned on while the mode changeover switch 96 is connected to the V side and thus the video mode is set, the vertical view angle $\theta PV$ of the imaging lens 3 is controlled as follows. When the vertical view angle $\theta ZV$ of the imaging lens 2 falls within a range of 10.1° to 29.5°, the view angle $\theta PV$ is controlled such that it coincides with the product of the view angle $\theta ZV$ and 37.8/29.5, and when the view angle $\theta ZV$ of the imaging lens 2 is in the range 5° to 10.1°, the view angle $\theta PV$ is controlled to 13°. (See FIG. 45B.)

In the case wherein the image frame setting switch 98 is turned on while the mode changeover switch 96 is connected to the P side to set the photo mode, the vertical view angle $\theta ZV$ of the imaging lens 2 is controlled in the following manner. When the vertical view angle $\theta PV$ of the imaging lens 3 falls within a range of 13° to 37.8°, the view angle $\theta ZV$ is controlled such that it coincides with the product of the view angle $\theta PV$ and 29.5/37.8. (See FIG. 45B.)

Instead of the view angle ratio at the WIDE end, the view angle ratio at the TELE end or another view angle ratio may be set. When the view angle ratio is set to a predetermined value while the view angles differ from each other, the picked-up image displayed at the electronic viewfinder 30 does not coincide with the view field of the photographic camera, but the relationship therebetween is constant. Therefore, the view field of the photographic camera can be accurately recognized, thereby permitting a correct shutter operation.

When the view angles do not coincide as mentioned above, the picked-up image is not in agreement with the view field of the photographic camera. In this case, by displaying the image frame of the photographic camera at the electronic viewfinder 30, it is possible to clearly show the view field of the photographic camera.

To display the image frame of the photographic camera, the ratio of the view fields of the photographic camera and picked-up image must be obtained. The horizontal and vertical view field ratios T'PH/T'ZH and T'PV/T'ZV are shown in the aforementioned Table 7.

Figure 46:
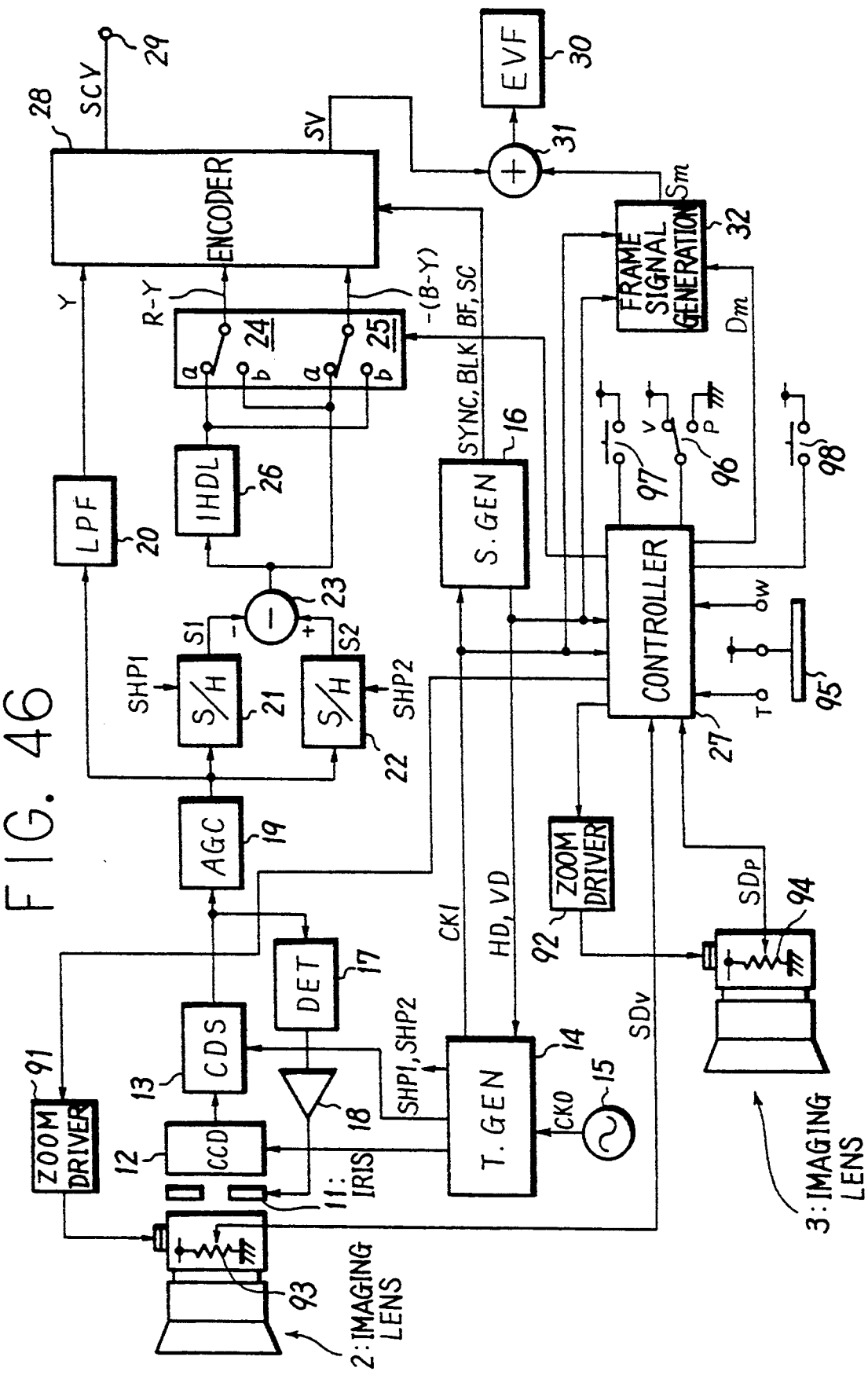
FIG. 46 is a block diagram showing the arrangement of a video camera section.

FIG. 46 shows an arrangement in which the image frame of the photographic camera is displayed at the electronic viewfinder 30. In FIG. 46, the same reference numerals are used to represent corresponding parts in FIGS. 43 and 23.

As shown in FIG. 46, the controller 27 generates image frame data Dm for displaying the image frame of the photographic camera at a location on the screen corresponding to the horizontal and vertical view field ratios T'PH/T'ZH and T'PV/T'ZV. The image frame data Dm is generated by the process shown in the flowchart of FIG. 30, as in the embodiment of FIG. 23.

The image frame data Dm output from the controller 27 is supplied to a frame signal generating circuit 32, which then outputs, e.g., a white peak level signal at times corresponding to the horizontal and vertical positions specified by the image frame data Dm, and this signal is supplied to an adder 31 as a frame signal Sm to be added to a monochromatic video signal SV.

Accordingly, as in the embodiment of FIG. 23, the picked-up image and the image frame of the photographic camera are displayed on the screen of the small-sized CRT of the electronic viewfinder 30, as shown in FIG. 31.

Although, in the above example, the video camera and the photographic camera are integrally combined, this invention can be applied to a video camera to which a separate photographic camera is firmly fixed. Further, in the above example, the zoom buttons 5T and 5W (zoom switch 95) are used for changing the zooming power of both the imaging lenses 2 and 3, but separate operating buttons may be provided for the purpose.

It will be obvious to those having ordinary skill in the art that many changes may be made in the above-described details of the preferred embodiments of the present invention without departing from the spirit and scope of the present invention.

We claim:

1. A video camera having a zoom function affecting an angle of view of said video camera in accordance with an adjustable zoom power and including an electronic view finder for providing image information of said video camera and a photographic camera, said video camera comprising:

video pickup means for picking-up a video image per a view angle determined by said zoom power;

video signal generating means for generating an image video signal representative of said picked-up video image;

image frame signal generating means for generating an image frame signal representative of an image frame per the field of view of the photographic camera;

image frame position changing means for affecting the image frame signal generating means to generate said image frame signal so as to change said represented image frame of the photographic camera in accordance with a change in said zoom power; and signal composition means for providing a composite signal for driving the electronic view finder by combining the image video signal with the image frame signal;

wherein the picked-up video image is displayed with a fixed size on the screen of the electronic viewfinder, and the image frame of the photographic camera is displayed on the screen relative the picked-up video image in accordance with said zoom power.

2. The video camera according to claim 1, wherein the image frame signal generating means generates the image frame signal in accordance with image frame data representative of a view field ratio of the photographic camera with respect to the video camera.

3. The video camera according to claim 2, wherein the view field of the video camera is calculated based on information about said zoom power of the video camera.

4. A composition apparatus for providing an electronic viewfinder of a video camera with a signal for displaying the video camera's video image and information of a photographic camera's field of view, said apparatus comprising:

means for providing a variable signal representative of a setting of the video camera's variable viewing angle;

means for providing a video signal representative of said video image of the video camera;

image frame signal generating means for generating an image frame signal, representative of an image frame per the field of view of the photographic camera, in accordance with said variable signal;

signal composition means for combining the video signal with the image frame signal into a composite signal; and means for driving the electronic viewfinder with the composite signal wherein the video image is displayed with a fixed size on the screen of the electronic viewfinder, and the image frame of the photographic camera is displayed on the screen relative, per said variable signal, the video image.

5. A composition apparatus in accordance with claim 4, wherein the image frame signal generating means generates the image frame signal in accordance with a view field ratio of the photographic camera with respect to the video camera.

6. A composition apparatus in accordance with claim 5, wherein the view field of the video camera is calculated based on information about the video camera's viewing angle.

* * * * *